United States Patent
Read et al.

(10) Patent No.: US 10,658,705 B2
(45) Date of Patent: *May 19, 2020

(54) THIN-FILM SOLID-STATE ENERGY STORAGE DEVICES

(71) Applicant: Space Charge, LLC, Aspen, CO (US)

(72) Inventors: John B. Read, San Diego, CA (US); Daniel C. Sweeney, San Diego, CA (US)

(73) Assignee: Space Charge, LLC, Aspen, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/295,983

(22) Filed: Mar. 7, 2019

(65) Prior Publication Data
US 2019/0280338 A1    Sep. 12, 2019

Related U.S. Application Data

(60) Provisional application No. 62/639,602, filed on Mar. 7, 2018.

(51) Int. Cl.
*H01M 10/0585* (2010.01)
*H01M 4/13* (2010.01)
(Continued)

(52) U.S. Cl.
CPC ......... *H01M 10/0585* (2013.01); *H01M 4/13* (2013.01); *H01M 4/366* (2013.01);
(Continued)

(58) Field of Classification Search
None
See application file for complete search history.

(56) References Cited

U.S. PATENT DOCUMENTS 3,419,487 A    12/1968   Robbins et al.
4,207,119 A    6/1980    Tyan
(Continued)

FOREIGN PATENT DOCUMENTS

CN    101941835 A        1/2011
CN    108766776 A    *  11/2018  ............. H01A 11/24
(Continued)

OTHER PUBLICATIONS

Adelkhani, et al., "Characterization of manganese dioxide electrodeposited by pulse and direct current for electrochemical capacitor," Journal of Alloys and Compounds 493 (2010), pp. 175-178; available online Dec. 16, 2009.
(Continued)

*Primary Examiner* — Rena Dye Cronin
(74) *Attorney, Agent, or Firm* — Kilpatrick Townsend & Stockton, LLP

(57) ABSTRACT

Described are solid-state energy storage devices and methods of making solid-state energy storage devices in which components of the batteries are truly solid-state and do not comprise a gel. Useful electrodes include metals and metal oxides, and useful electrolytes include amorphous ceramic thin film electrolytes that permit conduction or migration of ions across the electrolyte. Disclosed methods of making solid-state energy storage devices include multi-stage deposition processes, in which an electrode is deposited in a first stage and an electrolyte is deposited in a second stage.

22 Claims, 13 Drawing Sheets

(51) Int. Cl.

| | |
|---|---|
| *H01M 10/34* | (2006.01) |
| *H01M 4/38* | (2006.01) |
| *H01M 10/04* | (2006.01) |
| *H01M 4/62* | (2006.01) |
| *H01M 4/36* | (2006.01) |
| *H01M 12/08* | (2006.01) |
| *H01M 10/02* | (2006.01) |
| *H01M 10/46* | (2006.01) |

(52) U.S. Cl.
CPC ............. *H01M 4/383* (2013.01); *H01M 4/62* (2013.01); *H01M 10/02* (2013.01); *H01M 10/0463* (2013.01); *H01M 10/347* (2013.01); *H01M 10/465* (2013.01); *H01M 12/08* (2013.01); *H01M 2300/0068* (2013.01)

(56) References Cited

U.S. PATENT DOCUMENTS

| | | |
|---|---|---|
| 4,299,890 A | 11/1981 | Rea et al. |
| 4,328,262 A | 5/1982 | Kurahashi et al. |
| 4,333,808 A | 6/1982 | Bhattacharyya et al. |
| 4,353,160 A | 10/1982 | Armini et al. |
| 4,365,107 A | 12/1982 | Yamauchi |
| 4,435,445 A | 3/1984 | Allred et al. |
| 4,440,108 A | 4/1984 | Little et al. |
| 4,481,265 A | 11/1984 | Ezawa et al. |
| 4,520,039 A | 5/1985 | Ovshinsky |
| 4,539,660 A | 9/1985 | Miyauchi et al. |
| 4,633,129 A | 12/1986 | Cuomo et al. |
| 4,645,726 A | 2/1987 | Hiratani et al. |
| 4,684,848 A | 8/1987 | Kaufman et al. |
| 4,696,671 A | 9/1987 | Epstein et al. |
| 4,730,383 A | 3/1988 | Balkanski |
| 4,740,431 A | 4/1988 | Little |
| 4,756,984 A | 7/1988 | Descroix et al. |
| 4,832,463 A | 5/1989 | Goldner et al. |
| 4,862,032 A | 8/1989 | Kaufman et al. |
| 4,952,467 A | 8/1990 | Buchel et al. |
| 5,017,550 A | 5/1991 | Shioya et al. |
| 5,022,930 A | 6/1991 | Ackerman et al. |
| 5,051,274 A | 9/1991 | Goldner et al. |
| 5,061,581 A | 10/1991 | Narang et al. |
| 5,064,520 A | 11/1991 | Miyake et al. |
| 5,089,104 A | 2/1992 | Kanda et al. |
| 5,098,737 A | 3/1992 | Collins et al. |
| 5,115,378 A | 5/1992 | Tsuchiya et al. |
| 5,126,031 A | 6/1992 | Gordon et al. |
| 5,151,848 A | 9/1992 | Finello |
| 5,166,009 A | 11/1992 | Abraham et al. |
| 5,171,413 A | 12/1992 | Arntz et al. |
| 5,180,645 A | 1/1993 | More |
| 5,189,550 A | 2/1993 | Goldner et al. |
| 5,192,947 A | 3/1993 | Neustein |
| 5,202,196 A | 4/1993 | Wang et al. |
| 5,202,201 A | 4/1993 | Meunier et al. |
| 5,261,968 A | 11/1993 | Jordan |
| 5,273,837 A | 12/1993 | Aitken et al. |
| 5,296,122 A | 3/1994 | Katsube et al. |
| 5,314,765 A | 5/1994 | Bates |
| 5,338,625 A | 8/1994 | Bates et al. |
| 5,348,703 A | 9/1994 | Bishop et al. |
| 5,393,572 A | 2/1995 | Dearnaley |
| 5,411,592 A | 5/1995 | Ovshinsky et al. |
| 5,414,025 A | 5/1995 | Allcock et al. |
| 5,415,717 A | 5/1995 | Perneborn |
| 5,425,966 A | 6/1995 | Winter et al. |
| 5,426,005 A | 6/1995 | Eschbach |
| 5,426,561 A | 6/1995 | Yen et al. |
| 5,433,096 A | 7/1995 | Janssen et al. |
| 5,445,126 A | 8/1995 | Graves, Jr. |
| 5,445,906 A | 8/1995 | Hobson et al. |
| 5,448,110 A | 9/1995 | Tuttle et al. |
| 5,449,994 A | 9/1995 | Armand et al. |
| 5,455,126 A | 10/1995 | Bates et al. |
| 5,468,521 A | 11/1995 | Kanai et al. |
| 5,482,611 A | 1/1996 | Helmer et al. |
| 5,494,762 A | 2/1996 | Isoyama et al. |
| 5,501,175 A | 3/1996 | Tanaka et al. |
| 5,501,924 A | 3/1996 | Swierbut et al. |
| 5,503,948 A | 4/1996 | MacKay et al. |
| 5,510,209 A | 4/1996 | Abraham et al. |
| 5,512,147 A | 4/1996 | Bates et al. |
| 5,519,235 A | 5/1996 | Ramesh |
| 5,523,179 A | 6/1996 | Chu |
| 5,528,222 A | 6/1996 | Moskowitz et al. |
| 5,529,671 A | 6/1996 | Debley et al. |
| 5,536,333 A | 7/1996 | Foote et al. |
| 5,549,989 A | 8/1996 | Anani |
| 5,558,953 A | 9/1996 | Matsui et al. |
| 5,561,004 A | 10/1996 | Bates et al. |
| 5,567,210 A | 10/1996 | Bates et al. |
| 5,569,520 A | 10/1996 | Bates |
| 5,569,564 A | 10/1996 | Swierbut et al. |
| 5,571,749 A | 11/1996 | Matsuda et al. |
| 5,582,623 A | 12/1996 | Chu |
| 5,585,999 A | 12/1996 | De Long et al. |
| 5,593,551 A | 1/1997 | Lai |
| 5,597,660 A | 1/1997 | Bates et al. |
| 5,599,644 A | 2/1997 | Swierbut et al. |
| 5,601,652 A | 2/1997 | Mullin et al. |
| 5,612,152 A | 3/1997 | Bates et al. |
| 5,626,976 A | 5/1997 | Blanton et al. |
| 5,644,207 A | 7/1997 | Lew et al. |
| 5,648,187 A | 7/1997 | Skotheim |
| 5,654,084 A | 8/1997 | Egert |
| 5,654,111 A | 8/1997 | Minomiya et al. |
| 5,686,201 A | 11/1997 | Chu |
| 5,695,873 A | 12/1997 | Kumar et al. |
| 5,695,885 A | 12/1997 | Malhi |
| 5,705,293 A | 1/1998 | Hobson |
| 5,714,404 A | 2/1998 | Mitlitsky et al. |
| 5,753,934 A | 5/1998 | Yano et al. |
| 5,763,058 A | 6/1998 | Isen et al. |
| 5,768,090 A | 6/1998 | Changming et al. |
| 5,789,108 A | 8/1998 | Chu |
| 5,810,923 A | 9/1998 | Yano et al. |
| 5,814,420 A | 9/1998 | Chu |
| 5,830,331 A | 11/1998 | Kim et al. |
| 5,838,035 A | 11/1998 | Ramesh |
| 5,849,426 A | 12/1998 | Thomas et al. |
| 5,853,916 A | 12/1998 | Venugopal et al. |
| 5,863,337 A | 1/1999 | Neuman et al. |
| 5,868,914 A | 2/1999 | Landsbergen et al. |
| 5,872,080 A | 2/1999 | Arendt et al. |
| 5,914,507 A | 6/1999 | Polla et al. |
| 5,925,483 A | 7/1999 | Kejha et al. |
| 5,932,284 A | 8/1999 | Reynolds |
| 5,935,727 A | 8/1999 | Chiao |
| 5,953,677 A | 9/1999 | Sato |
| 5,978,207 A | 11/1999 | Anderson et al. |
| 5,981,107 A | 11/1999 | Hamano et al. |
| 5,982,034 A | 11/1999 | Cava et al. |
| 5,982,284 A | 11/1999 | Baldwin et al. |
| 5,985,485 A | 11/1999 | Ovshinsky et al. |
| 5,995,006 A | 11/1999 | Walsh |
| 6,001,715 A | 12/1999 | Manka et al. |
| 6,002,208 A | 12/1999 | Maishev et al. |
| 6,017,651 A | 1/2000 | Nimon et al. |
| 6,023,610 A | 2/2000 | Wood, Jr. |
| 6,025,094 A | 2/2000 | Visco et al. |
| 6,033,471 A | 3/2000 | Nakanishi et al. |
| 6,037,717 A | 3/2000 | Maishev et al. |
| 6,042,687 A | 3/2000 | Singh et al. |
| 6,056,857 A | 5/2000 | Hunt et al. |
| 6,059,847 A | 5/2000 | Farahmandi et al. |
| 6,077,621 A | 6/2000 | Allen et al. |
| 6,078,791 A | 6/2000 | Tuttle et al. |
| 6,086,962 A | 7/2000 | Mahoney et al. |
| 6,094,292 A | 7/2000 | Goldner et al. |
| 6,096,434 A | 8/2000 | Yano et al. |
| 6,103,412 A | 8/2000 | Hirano et al. |
| 6,108,191 A | 8/2000 | Bruchhaus et al. |
| 6,110,620 A | 8/2000 | Singh et al. |

(56) References Cited

U.S. PATENT DOCUMENTS

| | | |
|---|---|---|
| 6,130,507 A | 10/2000 | Maishev et al. |
| 6,133,159 A | 10/2000 | Vaartstra et al. |
| 6,136,165 A | 10/2000 | Moslehi |
| 6,139,964 A | 10/2000 | Sathrum et al. |
| 6,147,354 A | 11/2000 | Maishev et al. |
| 6,153,067 A | 11/2000 | Maishev et al. |
| 6,163,260 A | 12/2000 | Conwell et al. |
| 6,165,644 A | 12/2000 | Nimon et al. |
| 6,168,884 B1 | 1/2001 | Neudecker et al. |
| 6,181,237 B1 | 1/2001 | Gehlot |
| 6,181,545 B1 | 1/2001 | Amatucci et al. |
| 6,194,753 B1 | 2/2001 | Seon et al. |
| 6,203,944 B1 | 3/2001 | Turner et al. |
| 6,220,516 B1 | 4/2001 | Tuttle et al. |
| 6,222,117 B1 | 4/2001 | Shiozaki |
| 6,236,061 B1 | 5/2001 | Walpita |
| 6,238,813 B1 | 5/2001 | Maile et al. |
| 6,249,423 B1 | 6/2001 | O'Phelan et al. |
| 6,264,709 B1 | 7/2001 | Yoon et al. |
| 6,274,195 B1 | 8/2001 | Rhee et al. |
| 6,277,523 B1 | 8/2001 | Giron |
| 6,280,875 B1 | 8/2001 | Kwak et al. |
| 6,281,795 B1 | 8/2001 | Smith et al. |
| 6,294,722 B1 | 9/2001 | Kondo et al. |
| 6,325,294 B2 | 12/2001 | Tuttle et al. |
| 6,327,909 B1 | 12/2001 | Hung et al. |
| 6,391,664 B1 | 5/2002 | Goruganthu et al. |
| 6,399,489 B1 | 6/2002 | M'Saad et al. |
| 6,402,795 B1 | 6/2002 | Chu et al. |
| 6,402,796 B1 | 6/2002 | Johnson |
| 6,413,285 B1 | 7/2002 | Chu et al. |
| 6,413,675 B1 | 7/2002 | Harada et al. |
| 6,432,577 B1 | 8/2002 | Shul et al. |
| 6,475,854 B2 | 11/2002 | Narwankar et al. |
| 6,548,424 B2 | 4/2003 | Putkonen |
| 6,558,836 B1 | 5/2003 | Whitacre et al. |
| 6,576,365 B1 | 6/2003 | Meitav et al. |
| 6,576,369 B1 | 6/2003 | Moriguchi et al. |
| 6,576,371 B1 | 6/2003 | Yasuda |
| 6,599,580 B2 | 7/2003 | Muffoletto et al. |
| 6,608,464 B1 | 8/2003 | Lew et al. |
| 6,610,971 B1 | 8/2003 | Crabtree |
| 6,614,178 B1 | 9/2003 | Okada |
| 6,634,232 B1 | 10/2003 | Rettig et al. |
| 6,645,656 B1 | 11/2003 | Chen et al. |
| 6,723,140 B2 | 4/2004 | Chu et al. |
| 6,741,178 B1 | 5/2004 | Tuttle |
| 6,743,292 B2 | 6/2004 | Jia et al. |
| 6,749,648 B1 | 6/2004 | Kumar et al. |
| 6,770,176 B2 | 8/2004 | Benson et al. |
| 6,805,998 B2 | 10/2004 | Jenson et al. |
| 6,818,356 B1 | 11/2004 | Bates |
| 6,821,348 B2 | 11/2004 | Baude et al. |
| 6,866,901 B2 | 3/2005 | Burrows et al. |
| 6,897,164 B2 | 5/2005 | Baude et al. |
| 6,906,436 B2 | 6/2005 | Jenson et al. |
| 6,924,164 B2 | 8/2005 | Jenson |
| 6,955,866 B2 | 10/2005 | Nimon et al. |
| 6,982,132 B1 | 1/2006 | Goldner et al. |
| 6,986,965 B2 | 1/2006 | Jenson et al. |
| 6,989,750 B2 | 1/2006 | Shanks et al. |
| 6,991,662 B2 | 1/2006 | Visco et al. |
| 7,052,805 B2 | 5/2006 | Narang et al. |
| 7,169,503 B2 | 1/2007 | Laurent et al. |
| 7,220,517 B2 | 5/2007 | Park et al. |
| 7,267,897 B2 | 9/2007 | Bloch et al. |
| 7,282,296 B2 | 10/2007 | Visco et al. |
| 7,518,246 B2 | 4/2009 | Ahn et al. |
| 7,657,995 B2 | 2/2010 | Hsu et al. |
| 7,776,478 B2 | 8/2010 | Klaassen |
| 8,067,793 B2 | 11/2011 | Akimoto |
| 8,068,328 B2 | 11/2011 | Raravikar et al. |
| 9,853,325 B2 | 12/2017 | Sweeney et al. |
| 10,199,682 B2 | 2/2019 | Read et al. |
| 2001/0007335 A1 | 7/2001 | Tuttle et al. |
| 2001/0014398 A1 | 8/2001 | Veerasamy |
| 2001/0032666 A1 | 10/2001 | Jenson et al. |
| 2001/0033952 A1 | 10/2001 | Jenson et al. |
| 2001/0041294 A1 | 11/2001 | Chu et al. |
| 2001/0043569 A1 | 11/2001 | Wood, Jr. |
| 2001/0051300 A1 | 12/2001 | Moriguchi et al. |
| 2002/0000034 A1 | 1/2002 | Jenson |
| 2002/0025458 A1 | 2/2002 | Faville et al. |
| 2002/0037756 A1 | 3/2002 | Jacobs et al. |
| 2002/0076616 A1 | 6/2002 | Lee et al. |
| 2002/0110733 A1 | 8/2002 | Johnson |
| 2002/0110739 A1 | 8/2002 | McEwen et al. |
| 2002/0155667 A1 | 10/2002 | Higuchi et al. |
| 2002/0177031 A1 | 11/2002 | Doshi et al. |
| 2003/0008364 A1 | 1/2003 | Wang et al. |
| 2003/0013012 A1 | 1/2003 | Ahn et al. |
| 2003/0104590 A1 | 6/2003 | John et al. |
| 2003/0151118 A1 | 8/2003 | Baude et al. |
| 2003/0171984 A1 | 9/2003 | Wodka et al. |
| 2003/0175585 A1 | 9/2003 | Ugaji et al. |
| 2004/0023106 A1 | 2/2004 | Benson et al. |
| 2004/0043290 A1 | 3/2004 | Hatta et al. |
| 2004/0049909 A1 | 3/2004 | Salot et al. |
| 2004/0067396 A1 | 4/2004 | Bloch et al. |
| 2004/0077383 A1 | 4/2004 | Lappetelainen et al. |
| 2004/0086781 A1 | 5/2004 | Fukuzawa et al. |
| 2004/0094949 A1 | 5/2004 | Savagian et al. |
| 2004/0131760 A1 | 7/2004 | Shakespeare |
| 2004/0131761 A1 | 7/2004 | Shakespeare |
| 2004/0131897 A1 | 7/2004 | Jenson et al. |
| 2004/0151985 A1 | 8/2004 | Munshi |
| 2004/0161640 A1 | 8/2004 | Salot |
| 2004/0206952 A1 | 10/2004 | Jia et al. |
| 2004/0219434 A1 | 11/2004 | Benson et al. |
| 2005/0001214 A1 | 1/2005 | Brun et al. |
| 2005/0019594 A1 | 1/2005 | Hunt et al. |
| 2005/0019616 A1 | 1/2005 | Foltyn et al. |
| 2005/0019635 A1 | 1/2005 | Arroyo et al. |
| 2005/0019666 A1 | 1/2005 | Yasuda |
| 2005/0042499 A1 | 2/2005 | Laurent et al. |
| 2005/0079418 A1 | 4/2005 | Kelley et al. |
| 2005/0095506 A1 | 5/2005 | Klaassen |
| 2005/0105038 A1 | 5/2005 | Kondo et al. |
| 2005/0167715 A1 | 8/2005 | Higuchi et al. |
| 2005/0189139 A1 | 9/2005 | Stole |
| 2005/0199282 A1 | 9/2005 | Oleinick et al. |
| 2006/0022829 A1 | 2/2006 | Pan |
| 2006/0098389 A1 | 5/2006 | Liu et al. |
| 2006/0099474 A1 | 5/2006 | Hara et al. |
| 2006/0154141 A1 | 7/2006 | Salot et al. |
| 2006/0166378 A1 | 7/2006 | Maruyama et al. |
| 2006/0191198 A1 | 8/2006 | Rosenzweig et al. |
| 2006/0270223 A1 | 11/2006 | Millward |
| 2007/0012244 A1 | 1/2007 | Klaassen |
| 2007/0014919 A1 | 1/2007 | Hamalainen et al. |
| 2007/0015060 A1 | 1/2007 | Klaassen |
| 2007/0037059 A1 | 2/2007 | Salot et al. |
| 2007/0048604 A1 | 3/2007 | Gaillard et al. |
| 2007/0067984 A1 | 3/2007 | Gaillard et al. |
| 2007/0148350 A1 | 6/2007 | Rahtu et al. |
| 2007/0176332 A1 | 8/2007 | Swartzlander et al. |
| 2007/0178227 A1 | 8/2007 | Hunt et al. |
| 2007/0238019 A1 | 10/2007 | Laurent et al. |
| 2007/0271751 A1 | 11/2007 | Weidman |
| 2008/0030969 A1 | 2/2008 | Lee et al. |
| 2009/0039981 A1 | 2/2009 | Ito et al. |
| 2009/0085081 A1 | 4/2009 | Akimoto |
| 2009/0152550 A1 | 6/2009 | Ohnuma et al. |
| 2009/0169942 A1 | 7/2009 | Hertz et al. |
| 2010/0093547 A1 | 4/2010 | Foltyn et al. |
| 2010/0134947 A1 | 6/2010 | Goudy, Jr. |
| 2010/0136776 A1 | 6/2010 | Huotari et al. |
| 2010/0163863 A1 | 7/2010 | Yaegashi |
| 2010/0221415 A1 | 9/2010 | Yao et al. |
| 2010/0255303 A1 | 10/2010 | Wardle et al. |
| 2010/0301734 A1 | 12/2010 | Suh et al. |
| 2011/0165740 A1 | 7/2011 | Takayama et al. |
| 2011/0292574 A1 | 12/2011 | Besling et al. |
| 2011/0310530 A1 | 12/2011 | Laor |

(56) References Cited

U.S. PATENT DOCUMENTS

| | | |
|---|---|---|
| 2012/0024369 A1 | 2/2012 | Chu et al. |
| 2012/0050940 A1 | 3/2012 | Raravikar et al. |
| 2012/0270088 A1 | 10/2012 | Huang et al. |
| 2013/0170097 A1 | 7/2013 | Sweeney et al. |
| 2013/0302965 A1 | 11/2013 | Summerfelt et al. |
| 2015/0243965 A1* | 8/2015 | Ishikawa ............ H01M 4/13 427/58 |
| 2017/0069932 A1 | 3/2017 | Sweeney et al. |
| 2018/0159175 A1 | 6/2018 | Read et al. |
| 2019/0051936 A1* | 2/2019 | Meshcheryakov ... H01M 4/661 |

FOREIGN PATENT DOCUMENTS

| | | |
|---|---|---|
| DE | 19948742 C1 | 12/2000 |
| EP | 0 078 404 A2 | 5/1983 |
| EP | 0 410 627 A1 | 1/1991 |
| EP | 0 414 902 A1 | 3/1991 |
| EP | 0 643 544 A1 | 3/1995 |
| EP | 0 691 697 A1 | 1/1996 |
| EP | 0 860 888 A1 | 1/1996 |
| EP | 0867752 A1 | 9/1998 |
| EP | 1 041 657 A2 | 10/2000 |
| EP | 1 675 207 A1 | 6/2006 |
| EP | 2 793 279 A1 | 10/2014 |
| GB | 000626544 A | 7/1949 |
| GB | 2 310 318 A | 8/1997 |
| GB | 2 318 127 A | 4/1998 |
| JP | 58126679 | 7/1983 |
| JP | 59123236 | 7/1984 |
| JP | 60012679 | 1/1985 |
| JP | 62044960 | 2/1987 |
| JP | 63166151 | 1/1990 |
| JP | 04275974 | 10/1992 |
| JP | 6067018 | 3/1994 |
| JP | 6111828 | 4/1994 |
| JP | 6196178 | 7/1994 |
| JP | 6223805 | 8/1994 |
| JP | 07006933 | 1/1995 |
| JP | 07050229 | 2/1995 |
| JP | 07057739 | 3/1995 |
| JP | 0817179 | 1/1996 |
| JP | 8293310 | 5/1996 |
| JP | 8236105 | 9/1996 |
| JP | 8287901 | 11/1996 |
| JP | 8329983 A2 | 12/1996 |
| JP | 09035233 | 2/1997 |
| JP | 09211204 | 8/1997 |
| JP | 10021896 | 1/1998 |
| JP | 10021933 | 1/1998 |
| JP | 11186087 A | 7/1999 |
| JP | 2000188113 A | 7/2000 |
| JP | 3205757 B2 | 4/2001 |
| JP | 2001313237 A | 11/2001 |
| JP | 3262697 B2 | 3/2002 |
| JP | 02013145899 A | 7/2013 |
| WO | 92/15140 A1 | 9/1992 |
| WO | 92/16025 A1 | 9/1992 |
| WO | 92/19090 A1 | 10/1992 |
| WO | 93/14612 A1 | 7/1993 |
| WO | 95/14311 A1 | 5/1995 |
| WO | 96/17361 A1 | 6/1996 |
| WO | 97/38453 A1 | 10/1997 |
| WO | 97/39491 A1 | 10/1997 |
| WO | 98/13743 A1 | 4/1998 |
| WO | 98/47196 A1 | 10/1998 |
| WO | 99/25908 A1 | 5/1999 |
| WO | 99/33124 A1 | 7/1999 |
| WO | 00/07001 A1 | 2/2000 |
| WO | 00/66573 A2 | 11/2000 |
| WO | 01/29565 A1 | 4/2001 |
| WO | 02/07966 A1 | 1/2002 |
| WO | 02/19389 A2 | 3/2002 |
| WO | 02/39205 A2 | 5/2002 |
| WO | 02/47508 A2 | 6/2002 |
| WO | 02/063856 A2 | 8/2002 |
| WO | 2004/109821 A2 | 12/2004 |
| WO | 07/011898 A2 | 1/2007 |
| WO | 07/011899 A2 | 1/2007 |
| WO | 07/011900 A1 | 1/2007 |
| WO | 2013/154623 A1 | 10/2013 |
| WO | 2017/058963 A1 | 4/2017 |

OTHER PUBLICATIONS

Adler, Stuart, "Factors Governing Oxygen Reduction in Solid Oxide Fuel Cell Cathodes," Chem. Rev. Oct. 13, 2004, 104, pp. 4791-4843, Department of Chemical Engineering, University of Washington, Seattle, WA.
Azad, et al., "Nanoscale effects on ion conductance of layer-by-layer structures of gadolinia-doped ceria and zirconia," Applied Physics Letters 86, 131906 (2005); doi: 10.1063/1.1894615, 4 pages.
Beckel, et al., "Thin films for micro solid oxide fuel cells," Science Direct, Journal of Power Sources 173 (2007) pp. 325-345, Zurich, Switzerland.
Boivin, et al., "Recent Material Developments in Fast Oxide Ion Conductors," Chem. Mater. 1998, 10, pp. 2870-2888.
Chmiola, et al., "Monolithic Carbide-Derived Carbon Films for Micro-Supercapacitors," Science, vol. 328, Apr. 23, 2010, 5 pages.
Elam, et al., "Low Temperature ABC-Type Ru Atomic Layer Deposition through Consecutive Dissociative Chemisorption, Combustion, and Reduction Steps," Chem. Mater. 2015, 27, 4950-4956, (DOI: 10.1021/acs.chemmater.5b00818, 7 pages.
Fóti, G., et al., "Charge storage at the Pt/YSZ interface," Journal of Electroceramics, 2009, vol. 23, pp. 175-179.
Garcia-Barriocanal, et al., "Colossal Ionic Conductivity at Interfaces of Expitaxial ZrO2:Y2O3/SrTiO3 Heterostructures," Science 321, 676 (2008) DOI: 10.1126/science.1156393, 6 pages.
Garcia-Barriocanal, et al., "Tailoring Disorder and Dimensionality: Strategies for Improved Solid Oxide Fuel Cell Electrolytes," ChemPhysChem 2009, 10, pp. 1003-1011, DOI: 10.1002/cphc.200800691.
Guo, et al., "Comprehensive Modeling of Ion Conduction of Nanosized $CaF_2/BaF_2$ Multilayer Heterostuctures," Adv. Funct. Mater. 2009, 19, pp. 96-101.
Hendriks, et al., "Solid state supercapacitor materials: Layered structures of Yttria-stabilized zirconia sandwiched between platinum/yttria-stabilized zirconia," 2001, J. Applied Physics, 90, 5303-5307.
Hendriks, et al., "The electrochemical double-layer capacitance of yttria-stabilised zirconia," Feb. 2002, Solid State Ionics, 146, issues 3-4, 211-217.
Jaccoud, et al., "Charge storage in the $O_{2(g)}$, Pt/YSZ system," Electrochimica Acta 52 (2007) pp. 7927-7935.
Jacob, et al., Standard Gibbs energy of formation of Pb2Ru2O6.5, 2006, J. Mater.Res., vol. 22, No. 5 1174-1180.
Jalili, et al., "New Insights into the Strain Coupling to Surface Chemistry, Electronic Structure, and Reactivity of $La_{0.7}Sr_{0.3}MnO_3$," dx.doi.org/10.1 021/jz200160b, J. Phys. Chem. Lett. 2011, 2, pp. 801-807.
Kilner, John A., "Feel the strain," Nature Materials, vol. 7, Nov. 2008,2 pages.
Kimera, et al., "Preparation of RuO2—YSZ nano-composite films by MOCVD," 2003, Surface & Coatings Technology, 167 (2003), 240-244.
Kouassi, et al., "Proton exchange membrane micro fuel cells on 3D porous silicon gas diffusion layers," Journal of Power Sources 216 (2012) pp. 15-21.
Kubicek, et al., "Tensile Lattice Strain Accelerates Oxygen Surface Exchange and Diffusion in $La_{1-x}Sr_xCoO_{3-\delta}$ Thin Films," American Chemical Society, vol. 7, No. 4, pp. 3276-3286.
Kullgren, Jolla, "Oxygen Vacancy Chemistry in Ceria," Digital Comprehensive Summaries of Uppsala Dissertations from the Faculty of Science and Technology 896, 2012, 60 pages.
Lee, et al., "Carbon- and Binder-Free $NiC_{o2}O_4$ Nanoneedle Array Electrode for Sodium-Ion Batteries: Electrochemical Performance

(56) References Cited

OTHER PUBLICATIONS and Insight into Sodium Storage Reaction," Nanoscale Research Letters, (2016) 11:45, DOI 10.1186/s11671-016-1271-6, 9 pages.
Lim, et al., "Thin Film Supercapacitors Using a Sputtered $RuO_2$ Electrode," Journal of The Electrochemical Society, 148 (3) pp. A275-A278 (2001).
Nandasiri, Manjula, "Engineered Interfaces and Nano-Scale Thin Films for Solid Oxide Fuel Cell Electrolytes," (2013). Dissertations, paper 152. Western Michigan University Graduate College, 120 pages.
Osada, et al., "Robust High-K Response in Molecularly Thin Film Perovskite Nanosheets"; ACS Nano, vol. 4, No. 9, (2010), pp. 5225-5232; published online Aug. 24, 2010.
Pennycook, et al., "Origin of Colossal Ionic Conductivity in Oxide Multilayers: Interface Induced Sublattice Disorder," PRL 104, 115901 (2010), 4 pages.
Ramanathan, Shriram, "Interface-mediated ultrafast carrier conduction in oxide thin films and superlattices for energy," Journal of Vacuum Science & Technology A 27, 1126, 2009, 10 pages.
Rivera, et al., "Electrical conductivity relaxation in thin-film yttria-stabilized zirconia," Appl. Phys. Lett. 78, 610 (2001); doi: 10.1063/1.1343852, 4 pages.
Sata, et al., "Mesoscopic fast ion conduction in nanometer-scale planar heterostructures," Nature, vol. 408, Dec. 21/28, 2000, 4 pages.
Schichtel, et al., "Elastic strain at interfaces and its influence on ionic conductivity in nanoscaled solid electrolyte thin films—theoretical consideration and experimental studies," Physical Chemistry Chemical Physics 11(17), pp. 3043-3048, 2009.
Shim, et al., "Atomic layer deposition of yttria stabilized zirconia for solid oxide fuel cells," Chem. Mater. 2007, 19, pp. 3850-3854.
Sillassen, et al., "Low-Temperature Superionic Conductivity in Strained Yttria-Stabilized Zirconia," Advanced Functional Materials 20 (13) 2010, 6 pages.
Skinner, et al., "Oxygen ion conductors," Materials Today, Mar. 2003, 8 pages.
Sundberg, et al., "Oxygen chemisorption/desorption in a reversible single-crystal-to-single-crystal transformation," Chemical Science, 2014, 5, 4017-4025 (DOI:10.1039/C4SC01636J), 9 pages.
Tuller, et al., "Micro-ionics: next generation power sources," Physical Chemistry and Chemical Physics 11 (17) 2009, pp. 3023-3034.
Wang, et al., "All-Nanosheet Ultrathin Capacitors Assembled Layer-by-Layer via Solution-Based Processes," vol. 8, No. 3, 2014, pp. 2658-2666.
Zhang, et al., "Manganese oxide-carbon composite as supercapacitor electrode materials"; Microporous and Mesoporous Materials 123 (2009), pp. 260-267, available online Apr. 8, 2009.
Zhu, et al., "Dielectric properties of YSZ high-k thin films fabricated at low temperature by pulsed laser deposition," Materials Letters 57 (2003); pp. 4297-4301.
International Search Report and Written Opinion for PCT/US2016/054255 dated Jan. 26, 2017, 15 pages.
International Search Report and Written Opinion for PCT/US2019/021208 dated May 15, 2019, all pages.
Office Action for EP 16 852 523.6 dated Apr. 4, 2019, all pages.
U.S. Appl. No. 15/279,254, filed Sep. 28, 2016, Final Rejection dated Apr. 14, 2017, all pages.
U.S. Appl. No. 15/279,254, filed Sep. 28, 2016, Non-Final Rejection dated Aug. 14, 2017, all pages.
U.S. Appl. No. 15/279,254, filed Sep. 28, 2016, Notice of Allowance dated Oct. 30, 2017, all pages.
U.S. Appl. No. 13/536,029, filed Jun. 28, 2012, Non-Final Rejection dated Jun. 27, 2016, all pages.
U.S. Appl. No. 13/536,029, filed Jun. 28, 2012, Non-Final Rejection dated Oct. 28, 2013, all pages.
U.S. Appl. No. 13/536,029, filed Jun. 28, 2012, Final Rejection dated May 5, 2014, all pages.
U.S. Appl. No. 13/536,029, filed Jun. 28, 2012, Non-Final Rejection dated Oct. 30, 2014, all pages.
U.S. Appl. No. 13/536,029, filed Jun. 28, 2012, Final Rejection dated Jun. 4, 2015, all pages.
U.S. Appl. No. 15/818,494, filed Nov. 20, 2017, Non-Final Rejection dated May 23, 2018, all pages.
U.S. Appl. No. 15/818,494, filed Nov. 20, 2017, Notice of Allowance dated Sep. 21, 2018, all pages.

\* cited by examiner

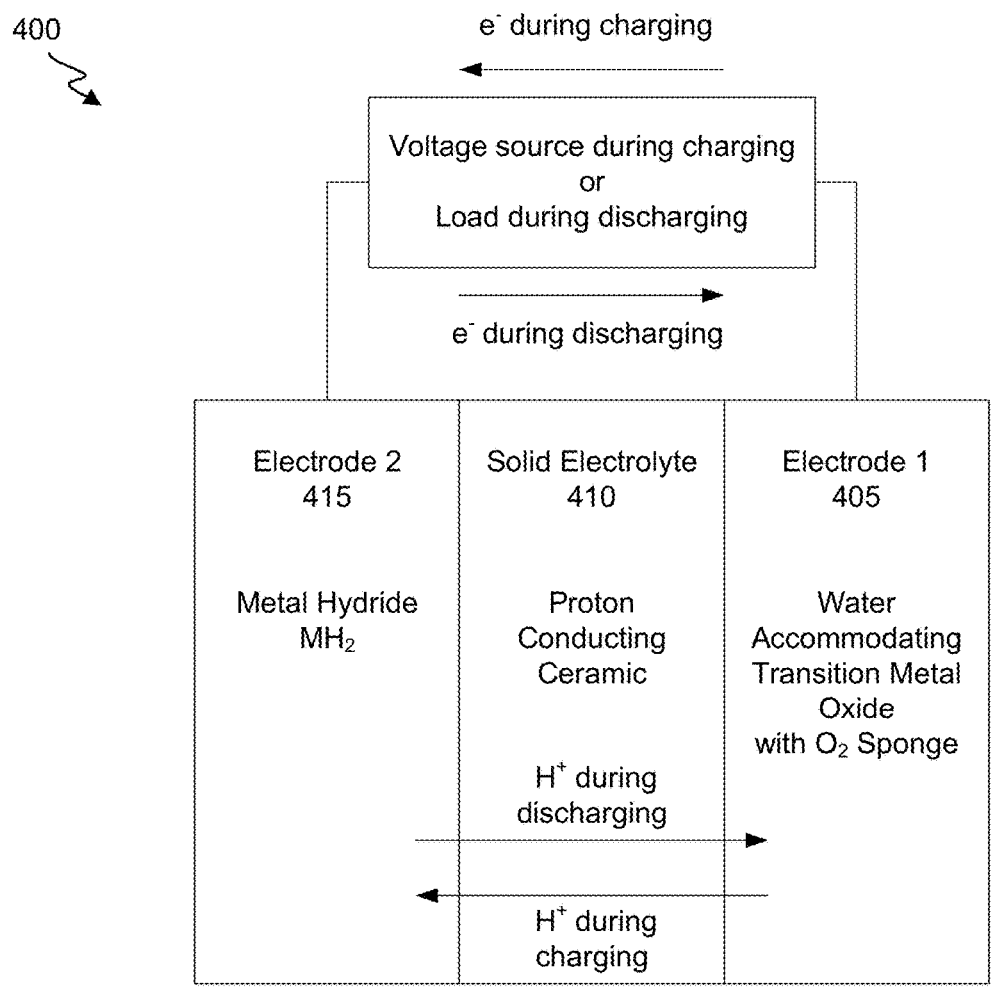

Anode Half Reaction During Discharging
$2MH_2 \longrightarrow 4H^+ + 4e^- + 2M$

Cathode Half Reaction During Discharging
$4H^+ + 4e^- + O_2 \longrightarrow 2H_2O$ Overall Reaction During Discharging
$2MH_2 + O_2 \longrightarrow 2H_2O + 2M$ Cathode Half Reaction During Charging
$4H^+ + 4e^- + 2M \longrightarrow 2MH_2$ Anode Half Reaction During Charging
$2H_2O \longrightarrow 4H^+ + 4e^- + O_2$ Overall Reaction During Charging
$2H_2O + 2M \longrightarrow 2MH_2 + O_2$

FIG. 4

FIG. 5A
Atomic Layer Deposition Process to form Electrode 1
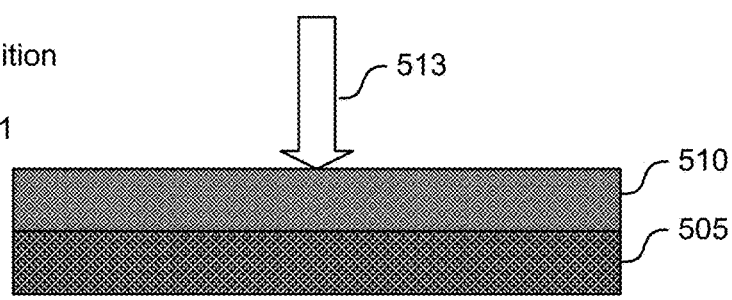
Atomic Layer Deposition Process to form Solid Electrolyte 1
Atomic Layer Deposition Process to form Electrode 2
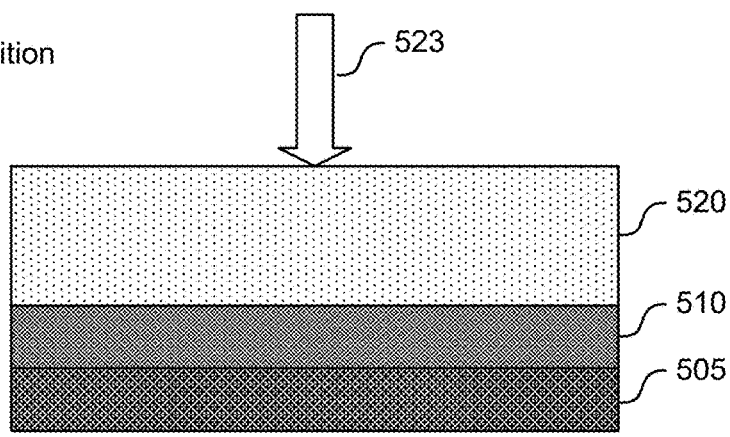
Assembled Electrochemical Energy Storage Device
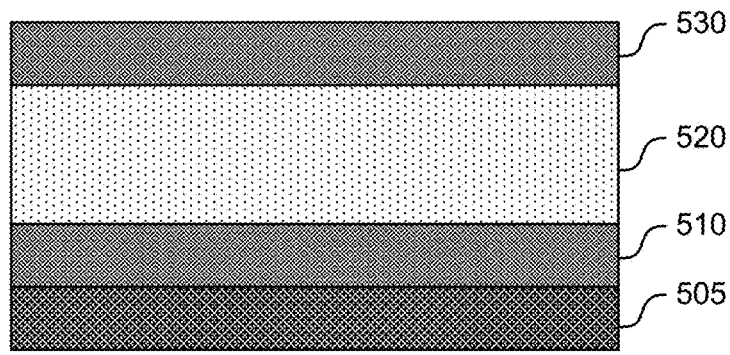

FIG. 5B
Atomic Layer Deposition Process to form Solid Electrolyte 2
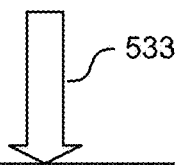
- 530
- 520
- 510
- 505
Atomic Layer Deposition Process to form Electrode 3
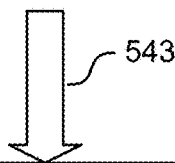
- 540
- 530
- 520
- 510
- 505
Assembled Electrochemical Energy Storage Device
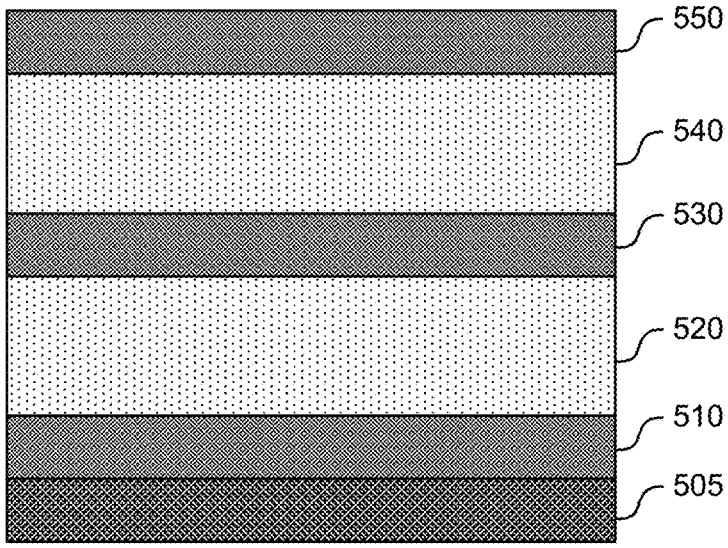
- 550
- 540
- 530
- 520
- 510
- 505

THIN-FILM SOLID-STATE ENERGY STORAGE DEVICES

CROSS-REFERENCE TO RELATED APPLICATIONS

This application claims the benefit of and priority to U.S. Provisional Application No. 62/639,602, filed on Mar. 7, 2018, which is hereby incorporated by reference in its entirety. The following applications are also hereby incorporated by reference in their entireties: U.S. application Ser. No. 16/245,657, filed on Jan. 11, 2019, U.S. application Ser. No. 15/818,494 (now U.S. Pat. No. 10,199,682), filed on Nov. 20, 2017, U.S. application Ser. No. 15/279,254 (now U.S. Pat. No. 9,853,325), filed on Sep. 28, 2016, U.S. Provisional Application No. 62/233,785, filed on Sep. 28, 2015, U.S. application Ser. No. 13/536,029, filed on Jun. 28, 2012, and U.S. Provisional Application No. 61/502,797, filed Jun. 29, 2011.

FIELD

The present invention relates to energy storage devices having no close precedent in the prior art and methods for making energy storage devices. The devices diverge from the prior art in their scale, physical construction and geometry, chemistry, electrical behaviors, and applications.

CONSTRAINTS ON THE PERFORMANCE OF THE CURRENT ART

Hundreds of developed battery chemistries and architectures exist, and there is likewise an extreme diversity in terms of cycle life, storage capacity, robustness, stability, and cost. Nevertheless, certain commonalities emerge after careful consideration of the many variants.

Conventional batteries exhibit high energy densities compared to most other methods of energy storage, but perform very poorly compared to combustible sources of energy such as fossil fuels, alcohols, and hydrogen gas, all of which exceed conventional batteries by many multiples in this regard. This has important implications with regard to powered portable devices and electric traction.

Conventional batteries have low power density compared to both capacitors and high velocity flywheels. Their ability to follow fluctuating electrical loads and complex electrical impedances is therefore limited as well.

Some secondary batteries are based upon purportedly reversible electrochemical reactions, but they are not, in fact, fully reversible in any practical sense. Secondary batteries characteristically lose storage capacity over time, and exhibit degradation of their component parts as they undergo repeated charging and discharging. For example, secondary batteries may exhibit a loss in capacity due to destruction of the electrolyte, the anode, or the cathode. Overcharging and fully discharging secondary batteries may also cause capacity loss. In extreme cases, secondary batteries, such as lithium-based secondary batteries, may also exhibit a short circuit and rapidly discharge and heat and even catch fire. Additionally, exposure of many secondary batteries to elevated temperatures may also degrade various components and result in capacity loss. Thus, secondary batteries, for the most part, cannot be fully discharged without damage, degradation, and a considerable abbreviation of their useful working lives. Conversely, they cannot tolerate overcharging.

Conventional batteries are subject to electrical leakage and charge dissipation and cannot maintain a given state of charge indefinitely or even over a span of weeks. Such dissipation can eventually lead to full discharge and damage to the battery.

Conventional batteries cannot be charged instantaneously or even particularly quickly. Presenting conventional batteries with an excessive charging current in an effort to accelerate the charging process will generally damage the device. Moreover, charging with any rapidity entails a complex charging algorithm and an intelligent interface, increasing system complexity.

Conventional batteries, for the most part, are comprised of liquids and/or gels, which do not lend themselves to precision manufacturing or extreme reductions in scale, and which may be subject to leakage and/or evaporation and require external containment vessels.

Conventional batteries do not thrive in extreme temperature environments. With the exception of the small subset of high temperature batteries, such as sodium sulfur and lithium sulfur types, almost none can endure temperatures of even a hundred degrees Celsius, while operation at zero degrees Celsius and below results in greatly diminished capacity and sluggish performance.

Conventional batteries are low voltage devices, with about 4 volts representing the maximum operating potential of any established chemistry, and 2 volts or less being more representative. Such a voltage range is impractically low for many applications, and thus battery manufacturers must resort to connecting a number of individual cells in series to achieve higher voltages. Balancing such series of cells can be difficult due to normal cell-to-cell variation in electrical output. Individual cell failure can also result in lost capacity and diminished usability.

Most of the established conventional battery chemistries appear to be approaching the ends of their respective development cycles and have been subject to diminishing returns in terms of performance improvements.

Such deficiencies are attributable both to the chemistries themselves, the design and articulation of the electrodes and their interface with the electrolyte material, and with the way that traditional fabrication techniques have tended to dictate architecture.

SUMMARY

Devices for storing energy at a high density are described. Methods of making energy storage devices are also described. In embodiments, the energy storage devices correspond to an all solid-state construction, and do not include any gels, liquids, or other materials that are incompatible with microfabrication techniques, such as may be used in the fabrication of integrated circuits and photovoltaic devices. Energy storage devices described herein include batteries and other Faradaic solid-state energy storage devices, such as devices that store (or are capable of storing upon charging) electrical energy by way of reversible electrochemical redox reactions taking place at electrodes of the devices.

In a first aspect, an energy storage device embodiment comprises a first electrode, a solid electrolyte positioned in direct contact with the first electrode, and a second electrode positioned in direct contact with the solid electrolyte. It will be appreciated that the first and second electrodes may be positioned such that the solid electrolyte is between the first and second electrodes. The electrodes may include active materials that directly take part in electrochemical or Faradaic redox reactions, such as metals and metal oxides.

Various aspects of the electrodes may take on different configurations, depending on the particular embodiments utilized. For example, in some embodiments, a variety of electrode thicknesses are useful with the energy storage devices. For example, in embodiments, the first electrode and the second electrode independently have thicknesses selected between about 1 nm and about 5 nm, between about 1 nm and about 10 nm, between about 1 nm and about 15 nm, between about 1 nm and about 20 nm, between about 1 nm and about 25 nm, between about 1 nm and about 30 nm, between about 1 nm and about 35 nm, between about 1 nm and about 40 nm, between about 1 nm and about 45 nm, between about 1 nm and about 50 nm, between about 1 nm and about 55 nm, between about 1 nm and about 60 nm, between about 1 nm and about 65 nm, between about 1 nm and about 70 nm, between about 1 nm and about 75 nm, or between about 1 nm and about 80 nm. Optionally, an electrode thickness is about 5 nm, about 10 nm, about 15 nm, about 20 nm, about 25 nm, about 30 nm, about 35 nm, about 40 nm, about 45 nm, about 50 nm, about 55 nm, about 60 nm, about 65 nm, about 70 nm, about 75 nm, about 80 nm, about 85 nm, about 95 nm, or about 100 nm. It will be appreciated, however, that electrodes of any thickness greater than or about 1 nm may be utilized for some embodiments.

In some embodiments, the electrodes may have independent chemical structures. For example, the first electrode and the second electrode independently comprise metal containing compositions. Example metal containing compositions include, but are not limited to, metal oxides, metal hydrides, metal sulfides, metal nitrides, metal halides, metal composites, intermetallic compounds, metalloid alloys, or metallic compositions, such as base metals or alloys. Example metals in metal containing compositions include transition metals and specifically one or more of Mn, Zn, Fe, Co, Ni, Cu, Mo, Tc, Ru, V, Bi, Ti, Rh, Pd, Ag, Au, W, Re, Os, La, Na, K, Rb, Cs, Ir, or Pt. In some embodiments, an electrode comprises the same metal and/or metal containing composition as another electrode. In other embodiments, an electrode comprises a different metal and/or metal containing compositions as another electrode. Optionally, an electrode comprises a metal, metal oxide, a metalloid, and/or a metalloid alloy (i.e., a composition including a metal and a metalloid). Example metalloids include boron, silicon, germanium, arsenic, antimony, carbon, aluminum, and selenium. Optionally, electrodes comprise alternating layers of active material and another material, such as amorphous carbon.

In some embodiments, using particular metal containing compositions for the electrodes may be advantageous, as certain metals and metal containing compositions may exhibit desirable properties. Various examples are contemplated, depending on the particular chemistry involved with the energy storage device. For example, in an energy storage device based on oxygen, an electrode comprising a metal oxide, such as nickel cobaltite, zinc nickel cobalt ternary oxide, tungsten oxide, tungsten trioxide, iridium oxide, rhodium oxide, palladium oxide, and other metals and metal oxide as described herein, may be capable of undergoing reversible redox reactions to gain or lose oxygen atoms during charging or discharging. As another example, in some embodiments, an electrode comprising a metal may be capable of forming sequences of metal oxides of progressively greater molecular weight at a respective electrode surface, such as by way of different redox reactions.

Working ions other than oxygen may be used. For example, in an energy storage device based on sulfur, such as where a sulfur ion is a working ion, an electrode comprising a metal sulfide, such as molybdenum disulfide, titanium disulfide, $Li_{10}GeP_2S_{12}$, $Li_6PS_5Cl$, $Li_7P_3S_{11}$, or cobalt sulfide, may be capable of undergoing reversible redox reactions to gain or lose sulfur atoms during charging or discharging. In an energy storage device based on nitrogen, such as where a nitrogen ion is a working ion, an electrode comprising a metal nitride, such as titanium nitride, cobalt nitride, nickel nitride, may be capable of undergoing reversible redox reactions to gain or lose sulfur atoms during charging or discharging. In an energy storage device based on chlorine, such as where a chloride ion is a working ion, an electrode comprising a metal chloride or metal hypochlorite, such as $CoCl_2$, $VCl_3$, $BiCl_3$, $FeOCl$, or $BiOCl$, may be capable of undergoing reversible redox reactions to gain or lose chlorine atoms during charging or discharging. In an energy storage device based on iodine, such as where an iodide ion is a working ion, an electrode comprising a metal iodide or metal hypoiodite, such as $CoI_2$, $VI_3$, $BiI_3$, $FeOI$, or $BiOI$, may be capable of undergoing reversible redox reactions to gain or lose iodine atoms during charging or discharging. In an energy storage device based on fluorine, such as where an fluoride ion is a working ion, an electrode comprising a metal fluoride, such as $LaF_3$, may be capable of undergoing reversible redox reactions to gain or lose fluorine atoms during charging or discharging. In an energy storage device based on a non-lithium alkali metal, such as where an alkali metal ion is a working ion, an electrode comprising a non-lithium alkali metal may be capable of undergoing reversible redox reactions to gain or lose alkali metal atoms during charging or discharging. In an energy storage device based on hydrogen, such as where a hydrogen ion (e.g. a proton, $H^+$) is a working ion, an electrode comprising a metal hydride may be capable of undergoing reversible redox reactions to gain or lose hydrogen atoms or may facilitate redox reactions involving hydrogen containing compounds (e.g., $H_2O$) during charging or discharging.

In some embodiments, appropriate pairing of electrodes may be advantageous. In one embodiment, a solid-state energy storage device may include the same metal containing composition in each electrode. For example, upon charging, one electrode will include a relative increase in the amount of metal in the higher oxidation state, while the opposite electrode will have a relative increase in the amount of metal in the lower oxidation state.

For example, iron may be progressively oxidized to form a range of oxides of different oxidation states. In some embodiments, iron may be present in the form of fine granules, such as in a sintered compact, which may aid in the formation of a progression of oxidation states. Metallic iron may be oxidized first to iron +2 (iron II) and then further to iron +3 (iron III). Oxidation of metallic iron to iron +2 may be associated with the formation of iron II oxide (FeO). As the iron (II) oxide is oxidized further to form iron +3, additional oxygen may be taken up and the iron may take the form of $Fe_3O_4$, corresponding to a mixture of both iron +2 and iron +3. Further oxidation may result in higher and higher amounts of iron (III), where the iron may begin to adopt the configuration of iron III oxide ($Fe_2O_3$). Further oxidation and/or reduction may occur. Since each oxidation state is associated with a different potential relative to the metallic state, charging the electrode may require different potentials to drive each oxidation/reduction reaction. Consequently, during discharging of the electrode, the opposite is true, and discharging may begin occurring at one potential and then change to a different potential as amounts of the metal change to a different oxidation state.

Optionally, an electrode undergoes oxygen adsorption during charging of the solid-state energy storage device, such as by way of an oxidation or reduction reaction. Optionally, an electrode undergoes oxygen desorption during charging of the solid-state energy storage device, such as by way of an oxidation or reduction reaction. Optionally, a metal of an electrode exhibits a work function of between about 4 eV and about 5 eV.

In some embodiments, the metal containing composition of an electrode is dispersed on an electrically conductive supporting matrix. For example, in embodiments, the electrically conductive supporting matrix may comprise carbon black, carbon nanotubes, graphite, or other materials that may provide electrical conductivity while also providing a platform for deposition of the electrode material. In embodiments, use of an electrically conductive supporting matrix may be advantageous for increasing a surface area of the metal containing composition of the electrode to increase the electrode mass that may take part in redox reactions when charging and/or discharging the energy storage devices. Optionally, the electrodes may include conductive materials, such as carbon black, carbon nanotubes, and graphite. Use of carbon nanotubes as conductive matrices or conductive materials for the electrodes may be particularly advantageous. For example, in some embodiments, packing of an active material of an electrode (such as a metal containing composition) in carbon nanotubes or a carbon nanotube matrix may result in an increased capacity for an energy storage device using the electrode, even though the volumetric amount of active material may be less than in an electrode comprising the active material in a pure form. For example, by packing nickel oxide in carbon nanotubes, a storage capacity of an electrode may be increased by up to 800 farad per gram.

Optionally, electrodes may comprise a mixture of multiple metals or metal containing compositions. Such a mixture may correspond to an alloy or a mixture of metal oxides, metal sulfides, metal nitrides, metal chlorides, metal hydrides, etc. By combining multiple metals, an increase in certain properties (e.g., capacity, conductivity) may be realized. For example, a combination of cobalt oxide and nickel oxide, such as may be referred to as nickel cobaltite, may correspond to a material that exhibits an electrical conductivity greater than either nickel oxide or cobalt oxide taken alone. Such an increase in electrical conductivity may be up to 100×-500× greater than the individual oxides.

Optionally, electrodes may be independently fabricated using controllable deposition methods. Useful deposition techniques include, but are not limited to, atomic layer deposition, magnetron sputtering, spin deposition, thermal evaporation, and chemical vapor deposition. Other fabrication techniques useful for fabricating the electrodes may include or involve other techniques, such as ultraviolet lithography, x-ray lithography, holographic lithography, laser ablation, and thermal evaporation.

Optionally, electrodes may exhibit or comprise a layered construction. For example, an electrode may include a first layer of an active material, such as a metal containing composition, a second layer of a conductive material (e.g., carbon, graphite, carbon nanotubes), and a third layer of the active material. The electrode may further include additional pairs of layers of conductive material and active material in alternating fashion. For example, in an embodiment, an electrode comprises an about 1 nm to about 20 nm layer (e.g., 10 nm) of electrode active material (e.g., metal containing composition, as described above), an about 1 nm to about 10 nm layer (e.g., 5 nm) of amorphous carbon, and another about 1 nm to about 20 nm layer (e.g., 10 nm) of the electrode active material. The electrode materials may also be patterned using conventional patterning techniques known in the art of microfabrication, including masking, lift-off, etching, etc. to generate a desired electrode layout.

Various aspects of the solid electrolyte may take on different configurations, depending on the particular embodiments utilized. For example, in some embodiments, a variety of electrolyte thicknesses are useful with the disclosed energy storage devices. For example, an electrolyte optionally has a thickness selected between about 1 nm and about 5 nm, between about 1 nm and about 10 nm, between about 1 nm and about 20 nm, between about 1 nm and about 50 nm, between about 1 nm and about 100 nm, between about 1 nm and about 150 nm, between about 1 nm and about 200 nm, between about 1 nm and about 250 nm, between about 1 nm and about 300 nm, between about 1 nm and about 350 nm, between about 1 nm and about 400 nm, between about 1 nm and about 450 nm, between about 1 nm and about 500 nm, between about 1 nm and about 550 nm, or between about 1 nm and about 600 nm. Specific example electrolyte thicknesses include 1 nm, 5 nm, 10 nm, 20 nm, 30 nm, 40 nm, 50 nm, 60 nm, 70 nm, 80 nm, 90 nm, 100 nm, 110 nm, 120 nm, 130 nm, 140 nm, 150 nm, 160 nm, 170 nm, 180 nm, 190 nm, 200 nm, 210 nm, 220 nm, 230 nm, 240 nm, 250 nm, 260 nm, 270 nm, 280 nm, 290 nm, 300 nm, 310 nm, 320 nm, 330 nm, 340 nm, 350 nm, 360 nm, 370 nm, 380 nm, 390 nm, 400 nm, 410 nm, 420 nm, 430 nm, 440 nm, 450 nm, 460 nm, 470 nm, 480 nm, 490 nm, 500 nm, 510 nm, 520 nm, 530 nm, 540 nm, 550 nm, 560 nm, 570 nm, 580 nm, 590 nm, and 600 nm. Other electrolyte thicknesses may be useful for some embodiments, though electrolyte thicknesses less than or about 250 nm or less than or about 1000 nm may be advantageous for certain embodiments.

As the electrolyte thickness is increased, embodiments may experience reduced device performance. For example, depending on the energy storage device chemistry and/or working ion, an electrolyte thickness may correlate, at least in part, with the ionic conductivity of the electrolyte. At some particular thickness, however, the electrolyte may exhibit a dramatic change in ionic conductivity, making such an electrolyte unsuitable for use in an energy storage device. For example, depending on the particular electrolyte composition used in some embodiments, the maximum useful electrolyte thickness may be about 500 nm, about 550 nm, about 600 nm, about 650 nm, or less than about 700 nm. Each particular electrolyte composition may exhibit a "cutoff" thickness value above which the electrolyte exhibits conductivity properties comparable to the bulk, such as where an ionic conductivity is unsuitable for use in an energy storage device, and below which the electrolyte exhibits conductivity properties different from the bulk, such as where the ionic conductivity is about 10-10000 times greater than the ionic conductivity of the electrolyte in the bulk, such as about 10 times greater or more, about 100 times greater or more, about 1000 times greater or more, about 10000 times greater or more, or about 100000 times greater or more than the ionic conductivity of the electrolyte in the bulk. In some embodiments, a solid electrolyte exhibits an ionic conductivity at about 25° C. that is about 1000 times greater or more than a bulk ionic conductivity for the solid electrolyte, such as at about 25° C. Optionally, the bulk ionic conductivity for the solid electrolyte corresponds to a conductivity of ions at about 25° C. for the solid electrolyte having a thickness greater than about 700 nm. To provide advantageous performance, at about 25° C., the solid electrolyte optionally exhibits an ionic conductivity selected from about 0.000001 S·cm$^{-1}$ to about 0.2 S·cm$^{-1}$, or optionally exhibits an ionic conductivity in excess of about 0.00001 S·cm$^{-1}$ at about 25° C. Optionally, the solid electrolyte exhibits, at about 25° C., an ionic conductivity from about 0.00001 S·cm$^{-1}$ to about 0.15 S·cm$^{-1}$, from about 0.0001 S·cm$^{-1}$ to about 0.1 S·cm$^{-1}$, from about 0.001 S·cm$^{-1}$ to about 0.05 S·cm$^{-1}$. It will be appreciated that the electrical conductivity of the solid electrolyte, at about 25° C. will be very small, such as from about $10^{-25}$ S·cm$^{-1}$ to about $10'$S·cm$^{-1}$, from about $10^{-25}$ S·cm$^{-1}$ to about $10'$S·cm$^{-1}$, from about $10^{-25}$ S·cm$^{-1}$ to about $10^{-8}$ S·cm$^{-1}$, from about $10^{-25}$ S·cm$^{-1}$ to about $10^{-9}$ S·cm$^{-1}$, from about $10^{-25}$ S·cm$^{-1}$ to about $10^{-10}$ S·cm$^{-1}$, from about $10^{-25}$ S·cm$^{-1}$ to about $10^{-11}$ S·cm$^{-1}$, from about $10^{-25}$ S·cm$^{-1}$ to about $10^{-12}$ S·cm$^{-1}$, or smaller still.

In embodiments, the solid electrolyte allows for migration of ions across the solid electrolyte, making the solid electrolyte suitable for use in an energy storage device. It will be appreciated that certain solid electrolyte materials may exhibit ionic conductivity properties at high temperatures, such as at temperatures of about 600° C., but the ionic conductivity decreases with temperature such that the solid electrolyte material is not practically ionically conductive at low temperatures, such as temperatures of 25° C. or even 50° C. Advantageous electrolytes for energy storage devices of the invention, however, maintain suitable ionic conductivity properties even at temperatures at which conventional batteries are useful, such between 0° C. and about 50° C., such as about 25° C. Unlike conventional batteries, the energy storage devices of the invention exhibit suitable properties at most temperatures commonly encountered by humans. For example, the solid-state electrolytes used in the energy storage devices may exhibit suitable ionic properties at temperatures as low as about −50° C., as well as at temperatures as high as about 50° C. and higher.

Useful electrolytes may be dependent on the chemistry of the energy storage device. For example, in energy storage devices based on oxygen (i.e., where a working ion is an oxygen ion), the electrolyte may be ionically conductive for oxygen ions (e.g., $O^-$, $O^+$, $O^{2-}$). Similarly, in energy storage devices based on sulfur (i.e., where a working ion is a sulfur ion), the electrolyte may be ionically conductive for sulfur ions (e.g., $S^-$, $S^{-2}$, $S^+$, etc.). As another example, in energy storage devices based on a halogen (i.e., where a working ion is a chloride ion, fluoride ion, or iodide ion), the electrolyte may be ionically conductive for halogen ions (i.e., $F^-$, $Cl^-$, $I^-$). As another example, in energy storage devices based on nitrogen (i.e., where a working ion is a nitrogen ion), the electrolyte may be ionically conductive for nitrogen ions (e.g., $N^-$, $N^+$, $N^{2-}$, etc.). As another example, in energy storage devices based on a non-lithium alkali metal (i.e., where a working ion is a non-lithium alkali metal ion), the electrolyte may be ionically conductive for alkali metal ions (e.g., $Na^+$, $K^+$, $Rb^+$, $Cs^+$). As another example, in energy storage devices based on hydrogen (i.e., where a working ion is a hydrogen ion), the electrolyte may be ionically conductive for protons or hydride ions.

Various compositions are useful for the solid electrolytes of the energy storage devices. For example, in embodiments, a solid electrolyte comprises a ceramic. Optionally, the ceramic is selected from the group including a perovskite ceramic, a ceramic having a perovskite structure, a zirconium ceramic, a zirconium-scandia ceramic, a ceria-gadolinia ceramic, an alumina ceramic, or any combination of these. Optionally, yttria stabilized zirconia (YSZ), which may be useful on its own as an electrolyte, may optionally be combined with other materials, such as lanthanum silicon oxygen compounds (e.g., lanthanum silicon oxyapatite (LSO)), which may also be used on its own as an electrolyte. Useful electrolyte compositions also include gadolinia doped cerium dioxide. Other doped cerium dioxide (ceria) compositions are useful as electrolytes. For example, ceria may be doped with one or more compositions including, but not limited to, CaO, SrO, MgO, BaO, yttria, and samarium. A variety of other compositions are useful as electrolytes, including doped lanthanum gallate ($LaGaO_3$), bismuth oxides, and strontium doped lanthanum oxides. Other lanthanum based materials are also useful as electrolytes, including $La_2Mo_2O_9$ (LAMOX).

Other examples of solid electrolytes include, doped ceria oxides, doped lanthanum gallate ($LaGaO_3$), strontium doped lanthanum oxides, barium zirconate, cerium pyrophosphate, $SrCeO_3$, $BaCeO_3$, $LaNbO_4$, $LaCrO_3$, YSZ, alkaline solid-state electrolytes, iron fluoride, copper fluoride, alkali metal doped alumina, and solid-state fast ion conducting electrolytes, such as silver iodide, or rubidium silver iodide. It will be appreciated that oxides, zirconates, pyrophosphates and related electrolytes are useful, in embodiments, for conducting oxygen ions and/or sulfur ions. Alkaline electrolytes are optionally useful for conducting nitrogen ions. Doped alumina electrolytes are optionally useful for conducting non-lithium alkali metal ions. Iron fluoride, copper fluoride, and solid-state fast ion conducting electrolytes are optionally useful for conducting halide ions. Barium zirconate, cerium pyrophosphate, $SrCeO_3$, $BaCeO_3$, $LaNbO_4$, and/or $LaCrO_3$ are optionally useful for conducting protons.

Optionally, a solid electrolyte comprises a crystalline ceramic, such as a single crystalline or polycrystalline ceramic material. Optionally, a solid electrolyte comprises an amorphous material, such as an amorphous ceramic material.

Optionally, the solid electrolyte comprises a composite solid electrolyte including a plurality of different ceramics. For example the solid electrolyte may comprise layers or regions of different ceramic materials. In embodiments, stressed or strained solid electrolytes may exhibit higher ionic conductivities than unstrained solid electrolytes and, thus, imparting stress or strain on a solid electrolyte may provide for a way to increase the ionic conductivity of the solid electrolyte to a level suitable for use in a solid-state energy storage device. In embodiments, introducing stress or strain into the electrolyte may result in the generation of voids or other defects, such as crystallographic defects. Use of composite solid electrolytes may be useful, in embodiments, to impart strain or stress on the solid electrolyte materials, as different solid electrolyte materials may exhibit different thermal expansion properties. In embodiments, the solid electrolytes may be formed at high temperatures and then allowed to relax to ambient temperature, where the different thermal expansion properties of different materials may create levels of stress or strain that allow the solid electrolyte to possess an ionic conductivity suitable for use in an energy storage device. The stress or strain placed on the electrolyte may, in embodiments, modify the ionic conductivity of the electrolyte to increase it to a level beyond that in the unstressed or unstrained condition. Other techniques may be useful for imparting stress or strain to an electrolyte, including exploiting different thermal expansion characteristics of non-electrolyte materials positioned proximal to, adjacent to, or in direct contact with the electrolyte.

Additionally, piezoelectric materials may optionally be positioned proximal to, adjacent to, or in direct contact with the electrolyte and exposed to a potential to cause expansion or contraction of the material to impart stress or strain on an electrolyte. In some embodiments, use of piezoelectric materials may be beneficial for controlling the amount of ionic conductivity permitted by the electrolyte. For example, an energy storage device may include a solid electrolyte, in some embodiments, which has a relatively low ionic conductivity and a piezoelectric material that is positioned proximal the electrolyte in order to control the ionic conductivity of the electrolyte, as desired. For example, in some embodiments, the piezoelectric material may be actuated to afford an increase in the electrolyte ionic conductivity during a charging or discharging cycle, but then be de-actuated or relaxed while not charging or discharging. Such an embodiment, for example, may provide a way to prevent or reduce self-discharge of an energy storage device while not in use or while in storage.

In some embodiments, a solid electrolyte comprises or exhibits a structure, such as a crystal structure, including voids or defects, such as crystallographic defects, that permit conduction or migration of ions through the solid electrolyte at least at temperatures between about 0° C. and about 100° C. It will be appreciated that operation at temperatures between about 0° C. and about 50° C. is especially desirable, but the electrolytes may permit operation at temperatures above these temperatures, including above 100° C. In some embodiments, the solid electrolyte comprises or exhibits a structure including voids or defects that also permit conduction or migration of ions through the solid electrolyte at temperatures outside of the previously mentioned range, such as at temperatures less than about 0° C. or greater than about 100° C. As described above, it will be appreciated that this property may be contrasted with the same material of the solid electrolyte in the bulk, where voids and defects that are present in the bulk material may still not provide for suitable ionic conductivity, since the overall thickness of the material in bulk may provide an effect that reduces ionic conductivity. Optionally, the defects correspond to one or more vacancy defects, interstitial defects, boundary defects, line defects, planar defects, bulk defects, or lattice imperfections.

Optionally, a solid electrolyte comprises a doped ceramic including one or more dopants. Useful dopants include, but are not limited to, an alkali metal dopant, an alkaline earth dopant, a group 3 dopant, a scandium dopant, an yttrium dopant, a lanthanide dopant, a titanium oxide dopant, a hydrogen dopant, a silver dopant, a lead dopant, a calcia dopant, a magnesia dopant, a dysprosia dopant, or an ytterbia dopant. Optionally, a solid electrolyte comprises a heavily doped ceramic. For example, in some embodiments a solid electrolyte comprises a ceramic alloy, such as beta alumina. Doping a ceramic may advantageously introduce defects that modify an ionic conductivity as compared to the undoped ceramic.

Optionally, the solid electrolyte comprises an amorphous structure, is in an amorphous state, or is an amorphous solid. An amorphous structure, as used herein, refers to an arrangement of component atoms that lack the long-range order present in crystalline materials. In embodiments, an amorphous structure may still exhibit some short-range order, which may arise due to the material's stoichiometry and the chemical bonding between the atoms that make up the material. In some embodiments, the material comprising a solid electrolyte may be an electrical insulator (i.e., have a low electrical conductivity for transmission of electrons) when present in one state, such as amorphous state or a single crystal state, but may be an electrical conductor (i.e., have a higher electrical conductivity for transmission of electrons) when present in another state, such as a polycrystalline state, even though the different states comprises the same stoichiometry and short-range arrangement of bonded atoms. In some cases, a polycrystalline solid electrolyte, in contrast, may have an electrical conductivity characteristic of or approaching that of a conductor. Accordingly, the crystal structure of the solid electrolyte may impact the rate of self-discharge of a device including the solid electrolyte between two electrodes, where stored energy is transported across the electrically conductive solid electrolyte by migration of electrons from one electrode to the other across the electrolyte, rather than through an external load, as is typically the case when the device is discharged. It will be appreciated that solid electrolytes in an amorphous state may be electrical insulators or otherwise exhibit a relatively low electrical conductivity and yet still exhibit significant ionic conductivity, permitting their advantageous use as an electrolyte.

Without wishing to be bound by any theory, the ionic conductivity transport mechanism may arise through defects or voids present in the amorphous structure that effectively allow migration of ions across the electrolyte. The ionic conductivity transport mechanism may also or alternatively arise through the ability of the amorphous structure to accommodate incorporation of ions from one region of the structure and a corresponding release of ions from another region of the structure. Again without wishing to be bound by any theory, the electrical conductivity transport mechanism, in contrast, may arise through transfer of electrons along crystal grain boundaries. As the number of grain boundaries are limited in a single crystal material, electron conductivity may be relatively low. In a polycrystalline material, which has many grain boundaries, the electron conductivity may be relatively high. In an amorphous material, no grain boundaries may be present because the material may not have a regular crystal structure, and thus the primary electron transport mechanism (i.e., along grain boundaries) may be suppressed. It will be appreciated that formation of amorphous solid electrolytes may be achieved through careful control of the fabrication conditions, such as deposition rate, temperature, pressure, etc.

Optionally, solid electrolytes may be fabricated using a controllable deposition method. Useful deposition techniques include, but are not limited to, atomic layer deposition, magnetron sputtering, spin deposition, thermal evaporation, and chemical vapor deposition. Other fabrication techniques useful for fabricating the electrolytes may include or involve other techniques, such as ultraviolet lithography, x-ray lithography, holographic lithography, laser ablation, and thermal evaporation. The electrolyte may also be patterned using conventional patterning techniques known in the art of microfabrication, including masking, lift-off, etching, etc. to generate a desired electrolyte layout.

Optionally, formation of the solid electrolyte in an amorphous state may occur by carefully controlling the deposition conditions, such as temperature, pressure, precursor selection, and the like. For example, the solid electrolyte may be deposited at a relatively low temperature to maintain formation of an amorphous structure. In embodiments, deposition at temperatures too high may result in formation of a polycrystalline electrolyte structure. Example deposition temperatures for deposition of the solid electrolyte in an amorphous state are at or about 100° C., 110° C., 120° C., 130° C., 140° C., 150° C., 160° C., 170° C., 180° C., 190° C., 200° C., 210° C., 220° C., 230° C., 240° C., or 250° C., between 0° C. and 300° C., between 0° C. and 250° C., between 50° C. and 250° C., between 100° C. and 250° C., between 150° C. and 250° C., or between 200° C. and 250° C.

To maintain the amorphous character of the electrolyte, an electrode that is deposited over the amorphous electrolyte optionally may occur by carefully controlling the deposition conditions, such as temperature, pressure, precursor selection, and the like. For example, the electrode may optionally be deposited at a relatively low temperature. Example deposition temperatures for the electrode are at or about 100° C., 110° C., 120° C., 130° C., 140° C., 150° C., 160° C., 170° C., 180° C., 190° C., 200° C., 210° C., 220° C., 230° C., 240° C., or 250° C., between 0° C. and 250° C., between 50° C. and 250° C., between 100° C. and 250° C., between 150° C. and 250° C., or between 200° C. and 250° C.

Optionally, deposition of an electrode over an amorphous electrolyte may take place in multiple deposition sub-steps, such as where an electrolyte is subjected consecutive exposures of metal containing organic precursors, optionally with additional oxidation and/or reduction sub-steps, to allow dissociated chemisorption, combustion, and reduction to take place. Optionally, following and/or prior to each exposure of organic precursors, the electrolyte and in-process electrode being deposited may need to be cleaned in order for further amounts of the metal to be efficiently deposited, as residual precursors and reaction products may inhibit further deposition. Example cleaning agents include water and ozone. Details of a low temperature atomic layer deposition can be found in Elam et al., Chem. Mater., 2015, 27 (14), 4950-4956, (DOI: 10.1021/acs.chemmater.5b00818), which is hereby incorporated by reference. Without wishing to be bound by any theory, it is believed that deposition of the electrode over an amorphous electrolyte may result in damage to or crystallization of the electrolyte material if not performed carefully. For example, by controlling the temperature or other conditions of the electrode deposition, the integrity of the amorphous structure of the electrolyte can be maintained.

It will be appreciated that the solid electrolytes useful with the energy storage devices disclosed herein are different from those used in conventional batteries. For example, in embodiments, the solid electrolyte is actually solid and is free from or does not include any liquids or gels. Additionally, the solid electrolytes are categorically different from those used with lithium-based batteries. For example, lithium-based batteries may rely on a lithium containing electrolyte, such as a lithium salt dissolved in a liquid electrolyte. In embodiments, the solid electrolytes used with the energy storage devices described here are free from or do not include any lithium, such as lithium atoms, lithium ions, or lithium salts. The solid electrolytes useful with the energy storage devices disclosed herein are also different from those used in other devices, such as solid oxide fuel cells. Some electrolytes, in the bulk, may be ionically conductive at high temperatures, such as temperatures in excess of 500° C., but may behave as ionically non-conductive at low temperatures, such as 0° C.-100° C. The electrolytes useful herein, however, exhibit high ionic conductivity at low temperatures, and this effect may arise by way of the size (i.e., thickness) of the electrolyte. Thicker electrolytes of the same material may not behave in the same way or exhibit the same properties.

Optionally, an energy storage device further comprises a second solid electrolyte positioned in direct contact with the second electrode, and a third electrode positioned in direct contact with the second solid electrolyte. Optionally, an energy storage device further comprises one or more solid electrolyte and metal oxide electrode bi-layers positioned in direct contact with a topmost electrode. It will be appreciated that the characteristics described above may also apply to the additional solid electrolytes and electrodes.

Other configurations for the energy storage devices described herein are contemplated, including those making use of hydrogen ions as a working ion. In a specific embodiment a solid-state energy storage device comprises an oxygen absorbing solid-state material; a first electrode in gaseous communication with the oxygen absorbing solid-state material, such as a first electrode that comprises a transition metal or transition metal alloy and has a structure that accommodates water; a solid-state electrolyte positioned adjacent to the first electrode, such as a solid-state electrolyte that comprises a ceramic material and conducts protons at least at temperatures of between about 0° C. and about 50° C., such as about 25° C.; and a second electrode positioned adjacent to the solid-state electrolyte, such as a second electrode that comprises a metal, a metal hydride, or both. Optionally, the second electrode comprises one or more of ruthenium, platinum, palladium, magnesium and/or carbon nanotubes. Optionally, the first electrode has a thickness selected from 1 nm to 100 nm. Optionally, the solid-state electrolyte has a thickness selected from 1 nm to 500 nm. Optionally, between about 0° C. and about 50° C., such as at about 25° C., the solid-state electrolyte exhibits a proton conductivity selected from about 0.000001 S·cm$^{-1}$ to about 0.2 S·cm$^{-1}$. Optionally, the first electrode comprises an oxide of the metal or metal alloy, such as nickel cobaltite. Optionally, the energy storage device is coated with or bounded by a gas impermeable material, which may be useful, for example, to prevent ingress or egress of gaseous oxygen.

In some cases, oxygen gas may be evolved at one or more electrodes during use of an energy storage device described herein. In some cases, an amount of oxygen atoms in the energy storage device, such as in one or more electrodes, may be limiting, and so it may be desirable to provide a source of oxygen to one or more electrodes. Accordingly, it may be advantageous to provide oxygen to an electrode in the form of oxygen gas. Optionally, an energy storage device may comprise an oxygen absorbing solid-state material in contact with or in gaseous communication with one or more electrodes and/or with a solid electrolyte. For example, an oxygen absorbing solid-state material may be useful for containing any evolved oxygen gas. As another example, an oxygen absorbing solid-state material may be useful as a source of oxygen. Thus by implementing one or more electrodes in contact with or in gaseous communication with oxygen absorbing solid-state material or by implementing one or more electrodes as composite electrodes including a transition metal and/or transition metal oxide and an oxygen absorbing solid-state material, the evolution or take-up of oxygen may be accommodated.

Useful oxygen absorbing solid-state materials comprises cobalt, a cobalt salt, cerium, and/or ceria. Optionally, a resistive heating element is provided in thermal communication with the oxygen absorbing solid-state material, which may be used to heat the material. Optionally, the oxygen absorbing solid-state material absorbs oxygen when a pressure of oxygen is increased. Optionally, the oxygen absorbing solid-state material releases oxygen when a pressure of oxygen is decreased. In some cases, the oxygen absorbing solid-state material may be positioned in thermal communication with a heat source or a heat sink to allow for control over a temperature of the oxygen absorbing solid-state material, which may further be useful for controlling the release or absorption of oxygen.

Optionally, a solid-state energy storage device further comprises a first current collector in electrical contact with the first electrode; and a second current collector in electrical contact with the second electrode. Optionally, the first current collector and the second current collector each independently comprise a compliant porous carbon material. Optionally, first current collector and the second current collector each independently have thicknesses selected from 1 nm to 50 nm. Optionally, the first current collector and the second current collector each independently provide electrical communication with an external circuit. Optionally, the first current collector and the second current collector each independently accommodate expansion and contraction of materials of the solid-state energy storage device, such as the electrodes, the electrolyte, and other materials of the solid-state energy storage device. Optionally, the first current collector provides active sites for ionizing oxygen.

In embodiments, the energy storage devices may be charged using any suitable voltage. For example, charging voltages may be higher than used in conventional secondary batteries. For example, in embodiments, a voltage difference between the first electrode and the second electrode may be greater than or about 0.5 V, greater than or about 1 V, greater than or about 2 V, greater than or about 4 V, greater than or about 8 V, greater than or about 16 V, or between 0.5 V and 20 V. Other voltage differences are possible, including voltages of about 0.5 V, about 1 V, about 1.5 V, about 2 V, about 2.5 V, about 3 V, about 3.5 V, about 4 V, about 4.5 V, about 5 V, about 5.5 V, about 6 V, about 6.5 V, about 7 V, about 7.5 V, about 8 V, about 8.5 V, about 9 V, about 9.5 V, about 10 V, about 10.5 V, about 11 V, about 11.5 V, about 12 V, about 12.5 V, about 13 V, about 13.5 V, about 14 V, about 14.5 V, about 15 V, about 15.5 V, about 16 V, about 16.5 V, about 17 V, about 17.5 V, about 18 V, about 18.5 V, about 19 V, about 19.5 V, about 20 V, between 0.5 V and 1 V, between 1 V and 1.5 V, between 1.5 V and 2 V, between 2 V and 2.5 V, between 2.5 V and 3 V, between 3 V and 3.5 V, between 3.5 V and 4 V, between 4 V and 4.5 V, between 4.5 V and 5 V, between 5 V and 5.5 V, between 5.5 V and 6 V, between 6 V and 6.5 V etc., between 6.5 V and 7 V, between 7 V and 7.5 V, between 7.5 V and 8 V, between 8 V and 8.5 V, between 8.5 V and 9 V, between 9 V and 9.5 V, between 9.5 V and 10 V, etc.

In embodiments, the solid-state energy storage devices may be characterized by electrical energy densities comparable to other energy storage devices, such as conventional batteries, and may even exceed the energy storage densities of conventional batteries. For example, the electrical energy density of the solid-state energy storage device may be greater than or about 10 $J/cm^3$, greater than or about 20 $J/cm^3$, greater than or about 50 $J/cm^3$, greater than or about 100 $J/cm^3$, greater than or about 150 $J/cm^3$, greater than or about 200 $J/cm^3$, greater than or about 250 $J/cm^3$, greater than or about 300 $J/cm^3$, greater than or about 350 $J/cm^3$, greater than or about 400 $J/cm^3$, greater than or about 450 $J/cm^3$, greater than or about 500 $J/cm^3$, greater than or about 1000 $J/cm^3$, greater than or about 5000 $J/cm^3$, greater than or about 10000 $J/cm^3$, greater than or about 50000 $J/cm^3$, or selected from 10 $J/cm^3$ to 50000 $J/cm^3$, such as from 10 $J/cm^3$ to 50 $J/cm^3$, from 50 $J/cm^3$ to 100 $J/cm^3$, from 100 $J/cm^3$ to 500 $J/cm^3$, from 500 $J/cm^3$ to 1000 $J/cm^3$, from 1000 $J/cm^3$ to 5000 $J/cm^3$, from 5000 $J/cm^3$ to 10000 $J/cm^3$, or from 10000 $J/cm^3$ to 50000 $J/cm^3$.

In contrast to conventional batteries, the disclosed energy storage devices may be included in an integrated circuit, microelectromechanical system, or other system assembled using microfabrication tools. For example, in embodiments, the first electrode, the solid-state electrolyte, and the second electrode are components of an integrated circuit. Optionally, one or more circuit elements of the integrated circuit are positioned in electrical communication with the first electrode or the second electrode such that the one or more circuit elements receive electrical energy stored by the solid-state energy storage device. It will be appreciated that electrical communication may be direct or indirect (e.g., with one or more intervening elements).

In addition, the disclosed energy storage devices may be included as a component of a photovoltaic system. For example, in embodiments, the first electrode, the solid-state electrolyte, and the second electrode are integrated with a photovoltaic cell or are integrated components of a photovoltaic system. For example, in some embodiments, the first electrode, the solid-state electrolyte, and the second electrode may be deposited on a substrate that comprises a component of a photovoltaic cell. It will be appreciated that various fabrication processes may be advantageously used for preparation of an energy storage device included as a component of a photovoltaic system, such as atomic layer deposition, magnetron sputtering, spin deposition, chemical vapor deposition, and thermal evaporation. The deposition of various components of energy storage device may optionally be performed at about the same time or subsequent to construction of any electrodes needed or used by the photovoltaic cell. In embodiments, electrodes of a photovoltaic cell are positioned in electrical communication with the first electrode and the second electrode such that electrical energy generated by the photovoltaic cell may be used to charge the energy storage device for storage therein or so that electrical energy stored by the solid-state energy storage device may be utilized as needed in place of photovoltaic output.

In embodiments, the energy storage device may comprise a component of a photovoltaic output management system. Advantageously, the energy storage device may optionally store electrical power generated by a photovoltaic system in excess of that consumed by a load otherwise powered by the photovoltaic system, which may occur, for example, during times of peak power production or low demand. In some embodiments, the energy stored by the energy storage devices may be useful for smoothing the output variability of a photovoltaic system over time and may for example, be useful for maintaining a substantially constant or less variable output from the photovoltaic system as energy production changes from moment to moment (e.g. due to a passing cloud). Additionally, the stored energy may optionally be provided to and used by a load connected to the photovoltaic system when the photovoltaic energy production is lower than that required by the load, such as during times of high demand, or during night or on cloudy days. In this way, the energy storage device may enhance the utility of a photovoltaic system by allowing storage of excess energy when generated, use of stored energy when insufficient generation occurs, and maintaining substantially constant output as photovoltaic power is modulated.

In another aspect, methods of making energy storage devices are disclosed. In embodiments, methods of this aspect comprise depositing a first electrode on or over a substrate, such as by using a first controllable deposition method, depositing a solid electrolyte on or over the first electrode, such as by using a second controllable deposition method, and depositing a second electrode on or over the solid electrolyte such as by using a third controllable deposition method. Optionally, additional electrolyte and electrode deposition processes may be included in the method in order to generate energy storage devices exhibiting a stacked multilayer configuration. Optionally, electrolyte and electrode layers may be prepared in an interdigitated configuration.

Useful controllable deposition methods include, but are not limited to, those involving atomic layer deposition, magnetron sputtering, chemical vapor deposition, spin deposition, ultraviolet lithography, x-ray lithography, holographic lithography, laser ablation, and thermal evaporation. As described above, deposition conditions, such as temperature, pressure, precursor selection, and the like, may be carefully controlled to achieve particular characteristics of the electrode and/or electrolyte materials. For example, the deposition may occur at a relatively low temperature, such as to form and/or maintain an amorphous structure in an electrolyte. Example deposition temperatures for deposition of the solid electrolyte include about 100° C., 110° C., 120° C., 130° C., 140° C., 150° C., 160° C., 170° C., 180° C., 190° C., 200° C., 210° C., 220° C., 230° C., 240° C., or 250° C., between 0° C. and 250° C., between 50° C. and 250° C., between 100° C. and 250° C., between 150° C. and 250° C., or between 200° C. and 250° C.

Optionally, the deposition of the electrodes generates electrodes of a desired thickness, as described above. For example, in embodiments, a deposited electrode thickness is selected from about 1 nm to about 80 nm.

Optionally, the deposited solid electrolyte comprises one or more of a perovskite ceramic, a ceramic having a perovskite structure, a zirconium ceramic, a ceria-gadolinia ceramic, an alumina ceramic, and any combination of these. Optionally, the deposited solid electrolyte comprises one or more of a perovskite ceramic, a ceramic having a perovskite structure, a zirconium-scandia ceramic, a ceria-gadolinia ceramic, an alumina ceramic, and any combination of these. Optionally, the deposition of the solid electrolyte generates an electrolyte of a desired thickness, as described above. For example, in embodiments, the solid electrolyte has a thickness selected from about 1 nm to about 1000 nm, such as from 1 nm to 2.5 nm, from 2.5 nm to 5 nm, from 5 nm to 10 nm, from 10 nm to 25 nm, from 25 nm to 50 nm, from 50 nm to 100 nm, from 100 nm to 250 nm, from 250 nm to 500 nm, or from 500 nm to 1000 nm. In embodiments, the solid electrolyte comprises or exhibits a structure including voids or defects that permit conduction or migration of oxygen ions through the solid electrolyte at least at temperatures between about 0° C. and about 100° C. Optionally, the solid electrolyte comprises or exhibits a structure including voids or defects that also permit conduction or migration of oxygen ions through the solid electrolyte at temperatures less than about 0° C. or greater than about 100° C. Other compositions for the electrolytes, as described herein, may optionally be used.

As described above, the solid-state energy storage devices may be incorporated in an integrated circuit. In embodiments, the substrate on which an electrode is deposited comprises a component of an integrated circuit.

In some embodiments, methods of this aspect may include charging and/or discharging an energy storage device. For example, a voltage difference may be applied between the first electrode and a second electrode, such as a charging voltage, in order to charge the energy storage device. It will be appreciated that, in embodiments, the charging may occur rapidly or substantially instantaneously, such as within a period of seconds or minutes or a fraction thereof, depending on the current available from the voltage source and resistive losses between the voltage source and the electrodes. This rapid charging may also occur, in embodiments, without damaging the electrodes or electrolyte. This may contrast with the charging rate of a conventional battery, which may be limited by the kinetics taking place at the battery electrodes or within the electrolyte, or may be limited because charging at a greater rate may result in damage to the structure of the battery, such as electrode damage or electrolyte damage, and accompanying capacity loss. In embodiments, the oxidation/reduction reactions that occur when charging or discharging the energy storage devices occur at or near the electrode surfaces and so the reactions may occur substantially quickly as compared to, for example, intercalation processes or electroplating processes that may occur in conventional batteries. High charge or discharge rates may also or alternatively be aided by the small size dimensions used in the energy storage devices, where only a small physical spacing between electrodes exists, allowing ionic migration between the electrodes to occur rapidly. In embodiments, discharging may occur rapidly or substantially instantaneously, such as within a period of seconds or minutes or a fraction thereof. This rapid discharging may also occur, in embodiments, without damaging the electrodes or electrolyte. In embodiments, a discharge rate may be dictated by the resistance of a load applied between the electrodes of the energy storage devices and/or resistive losses between the load and the electrodes. In embodiments, the energy storage devices may be charged and/or discharged at rates of about C/20, about C/10, about C/5, about C/2, about 1 C, about 2 C, about 5 C or about 10 C or more without inducing damage to the energy storage device, such as damage characteristic of capacity loss, electrolyte oxidation or reduction, electrode destruction, etc. Charging times may also vary depending on charging voltage, charging current, etc. Example charging times may be less than about 1 second, less than about 10 seconds, less than about 30 seconds, less than about 1 minute, less than about 5 minutes, less than about 10 minutes, less than about 30 minutes, between 1 second and 60 minutes, etc. Beneficially, energy storage device embodiments may be discharged to zero charge stored or zero voltage difference between electrodes without inducing damage to the energy storage device, such as damage characteristic of capacity loss, electrolyte oxidation or reduction, electrode destruction, etc.

Further, in some embodiments, the energy storage devices exhibit exceptional cycle lives. For example, the energy storage devices may be charged and discharged any number of times without inducing damage to the energy storage device, such as damage characteristic of capacity loss, electrolyte oxidation or reduction, electrode destruction, etc. For example, the energy storage devices of some embodiments may be charged and discharged more than or about 100 times, more than or about 1000 times, more than or about 10000 times, more than or about 100000 times, more than or about 1000000 times, or between 1 and 1000000 times, without damaging the energy storage device, such as damage characteristic of capacity loss, electrolyte oxidation or reduction, electrode destruction, etc.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

BRIEF DESCRIPTION OF THE DRAWINGS

FIG. 4 provides a schematic overview of processes taking place during charging and discharging of a solid-state energy storage device.

FIG. 5A and FIG. 5B provide overviews of processes for making solid-state energy storage devices.

DETAILED DESCRIPTION

The present application provides energy storage devices, such as Faradaic solid-state energy storage devices, and methods of making these devices. The devices are based on a unique architecture involving a pair of metal containing electrodes with a solid-state electrolyte (also referred to herein as a solid electrolyte) positioned in between the electrodes. For example, the metal containing electrodes may correspond to certain transition metals. For example, the solid-state electrolyte may correspond to certain ceramics capable of conducting ions through their structure at an appreciable rate.

Advantageously, energy storage device embodiments may be of an entirely solid-state construction. For example, all electrically active layers may also provide structural functions, such that the energy storage device is not only entirely self-supporting but capable of reinforcing other elements to which it is conjoined.

As used herein, the term "Faradaic energy storage device" refers to a device that stores energy electrochemically by way of reversible oxidation and reduction reactions that take place at and with active materials of electrodes of the device. The term "Faradaic energy storage device" may be interchangeable with the terms "battery" and "electrochemical cell" in some embodiments, and may contrast with other energy storage devices that do not involve bond-forming oxidation and reduction reactions involving the active material of the electrodes, such as supercapacitors.

Figure 1:
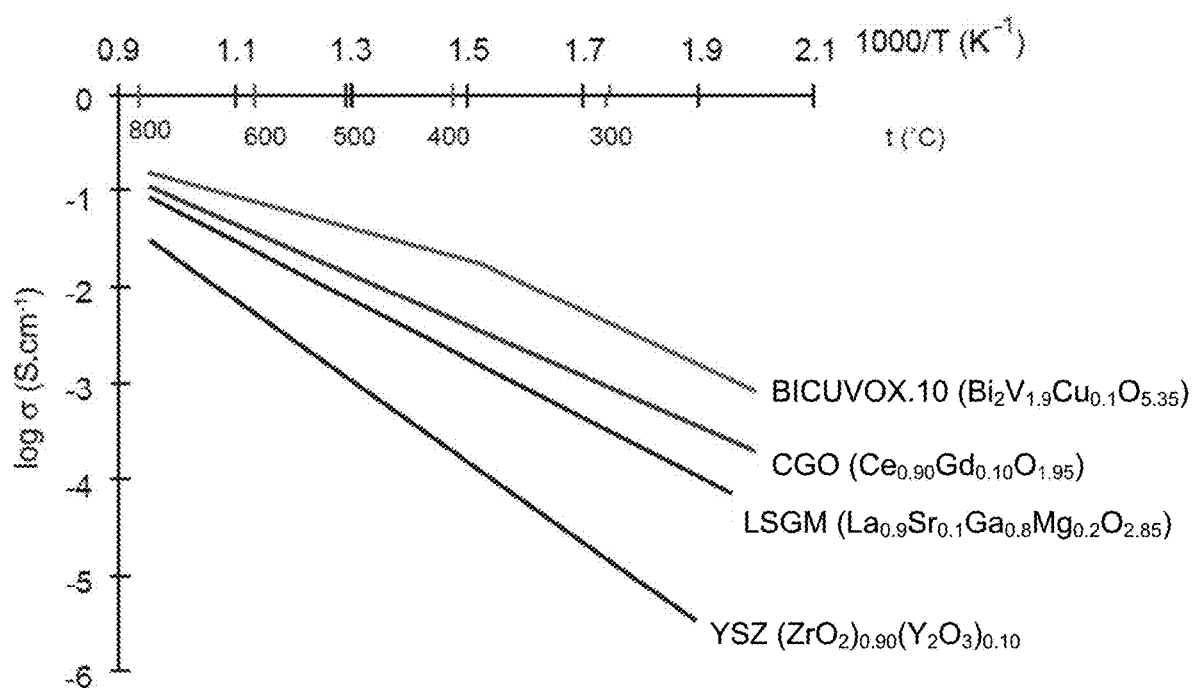
FIG. 1 provides a plot illustrating the relationship of ionic conductivity and temperature for a variety of solid-state electrolytes in the bulk.

FIG. 1 provides details of the ionic conductivity of a number of solid-state ceramic materials in the bulk. It will be appreciated that the ionic conductivity of most of these materials only reaches appreciable values at temperatures exceeding about 300° C. At room temperature, the ionic conductivity values of these ceramic materials are extremely small, making them very effective ionic insulating materials.

The inventors have discovered, however, that thin films of certain solid-state materials, such as films having thickness of less than about 700 nm, in some embodiments, may be engineered to exhibit high ionic conductivity at room temperature. This property allows the solid-state ceramics to function as electrolyte materials, which permits transmission of ions. Such observation is entirely contrary to the electrical behavior of the solid-state ceramics in the bulk described above.

Figure 2A:
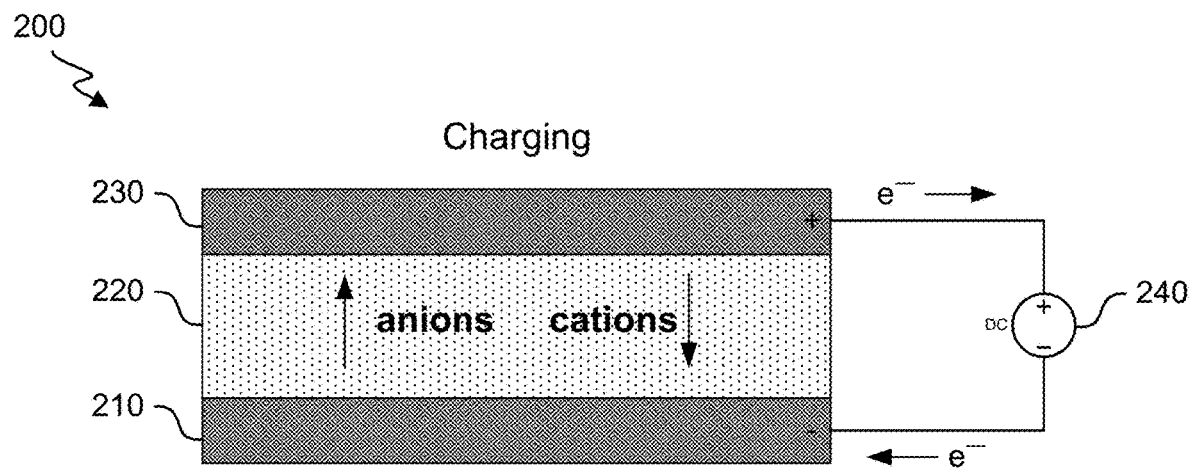
FIG. 2A provides a schematic overview of charging a solid-state energy storage device and FIG. 2B provides a schematic overview of discharging a solid-state energy storage device.
Figure 2B:
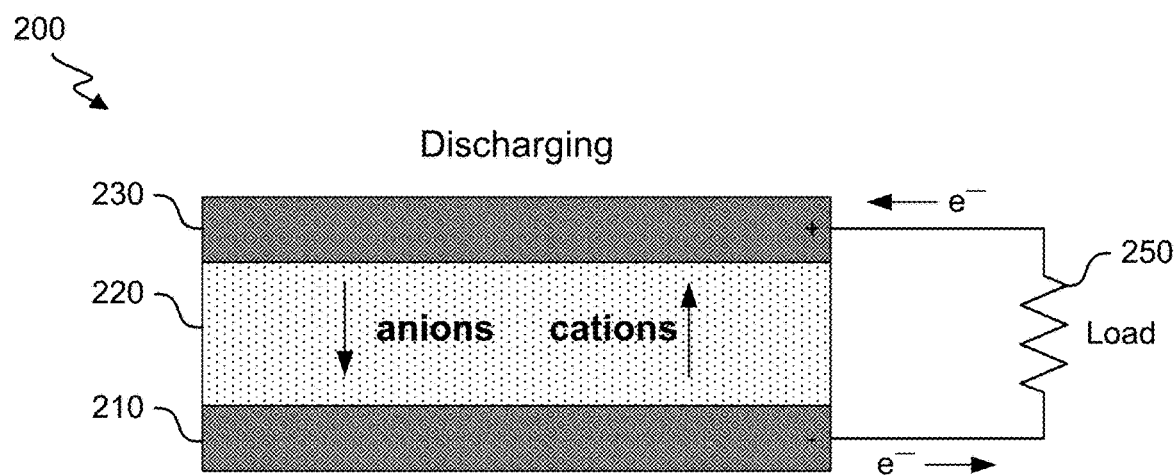

The conduction of ions through the solid-state electrolyte provides the basis for charge storage in some embodiments disclosed herein. FIG. 2A and FIG. 2B provides schematic overviews of charging (FIG. 2A) and discharging (FIG. 2B) of an example solid-state energy storage device 200. Here, solid-state energy storage device 200 includes a first electrode 210, an electrolyte 220, and a second electrode 230. As shown in FIG. 2A, during a charging operation, anions may be driven from the first electrode 210, through the electrolyte 220, to second electrode 230, while cations may be driven from the second electrode 230, through the electrolyte 220, to first electrode 210. As shown in FIG. 2B, during a discharging operation, cations may be driven from first electrode 210, through the electrolyte 220, to second electrode 230, and/or anions may be driven from the second electrode 230, through the electrolyte 220, to first electrode 210. It will be appreciated that in some embodiments only a single anionic species may correspond to the working ion, while in other embodiments only a single cationic species may correspond to the working ion. Embodiments are contemplated, however, where multiple ionic species are the working ions, such as multiple anionic species, multiple cationic species, or combinations of anionic species and cationic species. Such identities will be established by the specific chemistry utilized in a specific energy storage device. It will be appreciated that, although FIGS. 2A and 2B depict simultaneous transmission of both cations and anions, in practice ions tend to flow in one direction only during charging or discharging and that FIGS. 2A and 2B are intended to cover each of the potential configurations, i.e., where only anions or only cations are the working ions.

As depicted in FIG. 2A, during charging, electrons may be provided by a voltage source 240 to the first electrode 210. In embodiments where oxygen anions ($O^-$ or $O^{2-}$) correspond to the working ion, the electrons may be used in a reduction reaction at the first electrode where oxygen anions may be released. The oxygen anions may be conducted through the solid electrolyte 220 to the second electrode 230, where they may be taken up by the second electrode and electrons may be released to the voltage source in an oxidation reaction. It will be appreciated that the energy required for the redox reactions, provided by the voltage source, may correspond, at least in part, to the energy stored in, at, or by the electrodes. Other energy storage mechanisms may also contribute to the energy stored by the system, including capacitive energy storage and/or inductive energy storage. Physical/chemical changes to the electrodes may be observed during charging. For example, in embodiments, the first electrode 210 will undergo loss of oxygen atoms and the second electrode 230 will undergo gain of oxygen atoms during charging. As another example, the first electrode 210 and/or second electrode 230 may physically change size during charging.

FIG. 2B depicts discharging of the solid-state energy storage device 200. The stored energy may be used during discharging by a load 250. In embodiments where oxygen anions (O⁻ or $O^{2-}$) correspond to the working ion, the electrons passed through the load 250 may be used in a reduction reaction at the second electrode where oxygen anions may be released. The oxygen anions may be conducted through the solid electrolyte 220 to the second electrode 230, where they may be taken up by the second electrode and electrons may be released to the voltage source in an oxidation reaction. It will be appreciated that the energy used by the load may correspond, at least in part, to energy stored by the electrodes, but other energy storage mechanisms may also contribute, such as capacitive energy storage and/or inductive energy storage. Physical/chemical changes to the electrodes may also be observed during discharging. For example, in one embodiment, the first electrode 210 will undergo gain of oxygen atoms and the second electrode 230 will undergo loss of oxygen atoms during discharging. As another example, the first electrode 210 and/or second electrode 230 may physically change size during discharging.

Figure 3:
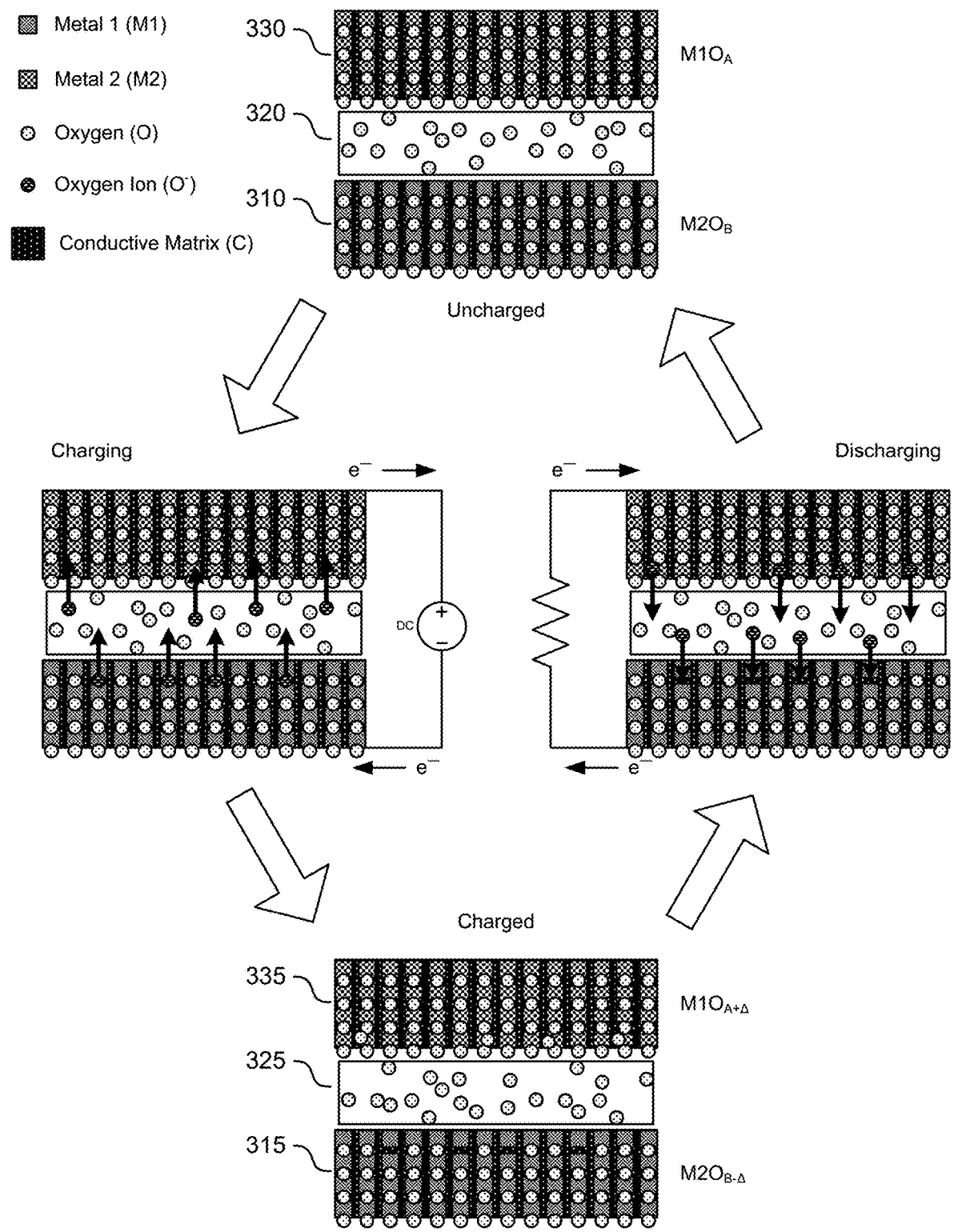
FIG. 3 provides a schematic illustration of processes taking place within a solid-state energy storage device.

FIG. 3 provides a schematic overview of charging and discharging of an energy storage device where oxygen anions correspond to the working ion. The energy storage device of FIG. 3 includes a first electrode 310, a solid electrolyte 320, and a second electrode 330. As illustrated first electrode 310 includes an oxide ($M1O_A$) of a first metal, M1, and second electrode 330 includes an oxide ($M2O_B$) of a second metal M2. It will be appreciated that the two metals may be the same or different and the levels of oxygen present in the different electrodes may also be the same or different.

Additionally, each electrode optionally includes a conductive supporting matrix, in which the metals are distributed. In some embodiments, the conductive supporting matrix may correspond to a carbonaceous material, such as carbon black, graphite, carbon nanotubes, etc., for example. Inclusion of a conductive supporting matrix may be useful for increasing a usable surface area of an electrode. In some embodiments, only a thin layer of the electrode may take part in oxidation/reduction reactions, and so increasing the surface area of the electrode may allow for an increase in the overall amount of the electrode that may take part in the reactions. In some cases, the conductive supporting matrix may allow for improved interaction between the active electrode materials and the electrolyte as compared to embodiments lacking the conductive supporting matrix. Optionally, the conductive supporting matrix may function, at least in part, as a current collector or provide electrical communication with a separate current collector In the uncharged configuration, bound oxygen atoms may be included in the first electrode 310, the solid electrolyte 320, and the second electrode 330. During charging, however, some of the oxygen atoms may become unbound, such as due to the addition of electrons to the first electrode 310, where the oxygen atoms may become free ions, such as oxygen anions (O⁻ or $O^{2-}$). These oxygen anions may move from first electrode 310 into the solid electrolyte 320. Oxygen ions added to the solid electrolyte 320 may migrate through the solid electrolyte 320 and pass to the second electrode 330. In some circumstances, the oxygen anions added to the solid electrolyte 320 may become bound in the structure of the solid electrolyte 320 and a different oxygen atom may be released from the structure of the solid electrolyte 320 as an oxygen anion, creating an effective migration of the oxygen anion through the solid electrolyte. The oxygen ions that are added to the second electrode 330 may be incorporated into the structure of the second electrode 330.

In the charged configuration, the amounts of oxygen in the first electrode 310 and the second electrode 330 may be different from that in the uncharged configuration. As illustrated, after charging the first electrode 310 may have fewer oxygen atoms included in the structure, as compared to the structure of the first electrode 310 in the uncharged state. Similarly, as illustrated, after charging the second electrode 330 may have more oxygen atoms included in the structure, as compared to the structure of the first electrode 330 in the uncharged state. Thus, the first electrode 310 is illustrated as having a formula of $M1O_{A+\Delta}$, while the second electrode is illustrated as having a formula $M2O_{A-\Delta}$.

During discharging, the opposite migration of oxygen occurs. Some of the oxygen atoms in the second electrode 330 may become unbound, such as due to the addition of electrons, and the unbound oxygen atoms may become oxygen anions. These oxygen anions may move from third electrode 330 into the solid electrolyte 320. Oxygen ions added to the solid electrolyte 320 may migrate through the solid electrolyte 320 and pass to the first electrode 310. The oxygen ions that are added to the first electrode 310 may be reincorporated into the structure of the first electrode 310.

In one example, a solid-state energy storage device comprises a first electrode including iron oxide, a solid-state oxygen ion conducting electrolyte, and a second electrode including iron oxide. For example, the device may be formed using a symmetric configuration of iron oxide in the form of mixed iron +2 and iron +3 ($Fe_3O_4$, magnetite). During charging, an amount of the iron +3 in one electrode may be reduced to iron +2, forming FeO. In the other electrode, an amount of the +2 iron may be oxidized to +3 iron, forming $Fe_2O_3$. Looking at half reactions, the first electrode undergoes the reaction $Fe_3O_4 \rightarrow FeO+O^{2-}+2e^-$, and the second electrode undergoes the reaction $2Fe_3O_4+O^{2-}+2e^- \rightarrow 3\ Fe_2O_3$. Overall the reaction is $3Fe_3O_4 \rightarrow FeO+3Fe_2O_3$.

Further oxidation may optionally occur to form higher oxides. As an example, iron +3 may be oxidized to iron +4. Such an oxidation may take place where there is excess $Fe_3O_4$ in the opposite electrode. For this case, one half reaction is $Fe_3O_4 \rightarrow FeO+O^{2-}+2e^-$. The other half reaction is $Fe_2O_3+O^{2-}+2e^- \rightarrow 2FeO_2$. Overall the reaction is $Fe_3O_4+Fe_2O_3 \rightarrow FeO+2FeO_2$. It will be appreciated that the oxidation of iron from +3 to +4 may occur at a greater potential than the oxidation of iron from +2 to +3.

Advantageously, for certain embodiments, each electrode may be used as an anode or a cathode, depending on a charging configuration used when initially charging the energy storage devices. For example, a first of the two electrodes may be connected to a negative terminal of a voltage source and a second of the two electrodes may be connected to a positive terminal of the voltage source during charging of the energy storage device. After charging, the first electrode may function as an anode and the second electrode may function as the cathode. Upon discharging, the energy storage device may be recharged in the opposite configuration, i.e., where the first electrode may be connected to the positive terminal of the voltage source and the second electrode may be connected to the negative terminal of the voltage source. After this charging cycle, the first electrode may function as the cathode and the second electrode may function as the anode.

This advantageous configuration may be achieved, in embodiments, by the charge storage mechanism and the chemistry involved. For example, in embodiments, the electrodes may comprise an oxide of the same metal, though levels of oxidation of each of the electrodes may be different and may change during charging and discharging. For example, in a specific embodiment, the electrodes may both comprise an iron oxide. Other examples are possible, including where different metals or metal oxides comprise the different electrodes.

As noted above, in some embodiments, only a small layer of the electrode proximal to the electrolyte may experience significant changes in oxidation state. For example, ions may be driven to or be obtained from shallow depths in the electrodes, in some embodiments, such as a few nm. Accordingly, it may be desirable to form the electrodes as thin as practical so as not to include excess electrode material that is incapable of taking part in oxidation/reduction reactions. Thus, in some embodiments, the electrode thickness may range from about 1 nm to about 10 nm, about 1 nm to about 15 nm, from about 1 nm to about 20 nm, about 1 nm to about 25 nm, from about 1 nm to about 30 nm, about 1 nm to about 35 nm, from about 1 nm to about 40 nm, about 1 nm to about 45 nm, from about 1 nm to about 50 nm, about 1 nm to about 55 nm, from about 1 nm to about 60 nm, about 1 nm to about 65 nm, from about 1 nm to about 70 nm, about 1 nm to about 75 nm, or about 1 nm to about 80 nm. In embodiments, the energy storage devices can operate using electrodes of any thickness, including electrodes thicker than about 75 nm or 80 nm, but as noted above, such thicknesses may not be the most efficient use of the electrode material and may contribute weight to the energy storage device while not contributing to the energy storage capacity.

Advantageously, the disclosed energy storage devices may operate under a variety of different voltage regimes. For example, an initial charging operation may correspond to a first reduction of metal in an anode such that anions are released by the anode to the solid electrolyte. The anions may take part in a reaction at the cathode where anions are adsorbed or otherwise taken up by the cathode to participate in an oxidation. The cathode will thus be in a more oxidized state after charging. If sufficient ions are available, oxidation may take on different levels as more and more of the ionic material is driven into the cathode during charging.

Use of certain metals in the cathode may benefit from this increased oxidation, as some metal species are capable of exhibiting different oxidation states. In the case of iron, for example, iron atoms exhibit oxidation states of +1, +2, +3, +4, +5, and +6, though the oxidation states of +2 and +3 may be the most common. If the electrode comprises Fe and oxygen is the working ion, a first charging stage may result in creation in the cathode of FeO at a first charging voltage. As the FeO becomes saturated with oxygen, a second charging stage may occur, where the FeO becomes further oxidized to form $Fe_2O_3$. This process may continue, with the creation of $Fe_3O_4$, $Fe_5O_6$, $Fe_6O_7$, etc., each formed at increasing charging voltages. It will be appreciated that iron is used here for illustrative purposes and that other metals, such as Mn, Zn, Fe, Co, Ni, Cu, Mo, Tc, Ru, V, Bi, Ti, Rh, Pd, Ag, Au, W, Re, Os, La, Na, K, Rb, Cs, Ir, and/or Pt, may be alternatively used in the electrodes, though the principal of the operation of the energy storage device by creation of different oxides at increasing voltages may be applicable. Table 1 and Table 2 respectively summarize different half reactions that may take place during charging and discharging in some embodiments. It will be appreciate that while Tables 1 and 2 make reference to reactions involving $O^-$ ions and single electrons (e), parallel reactions may take place involving $O^{2-}$ ions and a pairs of electrons ($O^2$) and other ionic species (nitrogen ions, sulfur ions, chloride ions, and hydrogen ions) may be substituted.

It will be appreciated that this increasing oxidation mechanism may allow the energy storage devices, in embodiments, to be charged to high voltages, such as where the charged voltage corresponds to a voltage difference between a voltage of a first electrode and a voltage of a second electrode proximal where a single solid electrolyte is positioned between the first and second electrodes. Such charging voltages may be considerably higher than allowed by previous battery chemistries. For example, in embodiments, the energy storage devices may be charged to a voltage between about 0 V and about 0.5 V, between about 0 V and about 1 V, between about 0 V and about 1.5 V, between about 0 V and about 2 V, between about 0 V and about 2.5 V, between about 0 V and about 3 V, between about 0 V and about 3.5 V, between about 0 V and about 4 V, between about 0 V and about 4.5 V, between about 0 V and about 5 V, between about 0 V and about 5.5 V, between about 0 V and about 6 V, between about 0 V and about 6.5 V, between about 0 V and about 7 V, between about 0 V and about 7.5 V, between about 0 V and about 8 V, between about 0 V and about 8.5 V, between about 0 V and about 9 V, between about 0 V and about 9.5 V, or between about 0 V and about 10 V. In some embodiments, the energy storage devices may be charged to a voltage greater than about 5 V, greater than about 10 V, greater than about 15 V, or greater than about 20 V. It will be appreciated that, in some embodiments, as higher and higher voltages are encountered, an electrical discharge may occur between electrodes and through the solid electrolyte, resulting in loss of stored charge and potential damage to the devices.

As another example, FIG. 4 provides a schematic overview of a solid-state energy storage device 400 making use of hydrogen ions (protons, $H^+$) as the working ion. The configuration depicted in FIG. 4 is not to scale and is provided as an example to facilitate description of the general structure processes taking place. A first electrode 405 is in contact with a solid electrolyte 410, which is in contact with a second electrode 415. Second electrode 415 is exemplified as including a metal hydride ($MH_2$) and solid electrolyte 410 is exemplified as a proton conducting ceramic. First electrode 405 is exemplified as a composite structure including a water accommodating transition metal oxide active material and an oxygen absorbing solid-state material, such as an $O_2$ sponge material. For example, the water accommodating transition metal oxide active material may be in gaseous communication or contact with the $O_2$ sponge material. It will be appreciated that the $O_2$ sponge material may take up oxygen gas generated during charging of the energy storage device 400 and may provide oxygen gas as needed during discharging of the energy storage device 400. Example $O_2$ sponge materials include, but are not limited to, cobalt-, cobalt salt-, cerium-, and ceria-based oxygen absorbing materials, such as strontium cobaltite, and [{(bpbp)$Co_2^{II}(NO_3)$}$_2$($NH_2$bdc)]($NO_3$)$_2 \cdot H_2O$, where "bpbp" is 2,6-bis(N,N-bis(2-pyridylmethyl)-aminomethyl)-4-tert-butylphenolato, and "$NH_2$bdc" is 2-amino-1,4-benzenedicarboxylato. See, for example, Chem. Sci., 2014, 5, 4017-4025 (DOI:10.1039/C4SC01636J), hereby incorporated by reference. Example water accommodating transition metal oxides include composite materials, such as nickel cobaltite. Optionally, a resistive heating element is provided in thermal communication with the oxygen absorbing solid-state material to drive release of stored oxygen. Optionally, the oxygen absorbing solid-state material absorbs oxygen when a pressure of oxygen is increased. Optionally, the oxygen absorbing solid-state material releases oxygen when a pressure of oxygen is decreased.

Example half reactions and overall reactions for charging and discharging are provided in FIG. 4.

TABLE 1

Overview of redox chemistry during charging

| Anode Half Reaction | Cathode Half Reaction |
|---|---|
| Stage 1 Charging | |
| $M1O_X + e^- \rightarrow M1O_{X-1} + O^-$ | $M2O_Y + O^- \rightarrow M2O_{Y+1} + e^-$ |
| Overall Reaction: $M1O_X + M2O_Y \rightarrow M1O_{X-1} + M2O_{Y+1}$ | |
| Stage 2 Charging | |
| $M1O_{X-1} + e^- \rightarrow M1O_{X-2} + O^-$ | $M2O_{Y+1} + O^- \rightarrow M2O_{Y+2} + e^-$ |
| Overall Reaction: $M1O_{X-1} + M1O_{Y+1} \rightarrow M2O_{X-2} + M2O_{Y+2}$ | |
| ... | |
| Stage N Charging | |
| $M1O_{X-(N-1)} + e^- \rightarrow M1O_{X-N} + O^-$ | $M2O_{Y+(N-1)} + O^- \rightarrow M2O_{Y+N} + e^-$ |
| Overall Reaction: $M1O_{X-(N-1)} + M2O_{Y+(N-1)} \rightarrow M1O_{X-N} + M2O_{Y+N}$ | |

TABLE 2

Overview of redox chemistry during discharging

| Anode Half Reaction | Cathode Half Reaction |
|---|---|
| Stage 1 Discharging | |
| $M1O_X + O^- \rightarrow M1O_{X+1} + e^-$ | $M2O_Y + e^- \rightarrow M2O_{Y-1} + O^-$ |
| Overall Reaction: $M1O_X + M2O_Y \rightarrow M1O_{X+1} + M2O_{Y-1}$ | |
| Stage 2 Discharging | |
| $M1O_{X+1} + O^- \rightarrow M1O_{X+2} + e^-$ | $M2O_{Y-1} + e^- \rightarrow M2O_{Y-2} + O^-$ |
| Overall Reaction: $M1O_{X+1} + M2O_{Y-1} \rightarrow M1O_{X+2} + M2O_{Y-2}$ | |
| ... | |
| Stage N Discharging | |
| $M1O_{X+(N-1)} + O^- \rightarrow M1O_{X+N} + e^-$ | $M2O_{Y-(N-1)} + e^- \rightarrow M2O_{Y-N} + O^-$ |
| Overall Reaction: $M1O_{X+(N-1)} + M2O_{Y-(N-1)} \rightarrow M1O_{X+N} + M2O_{Y-N}$ | |

Although not depicted in the figures, an energy storage device may optionally comprise further comprise a first current collector in electrical contact with the first electrode and a second current collector in electrical contact with the second electrode. Optionally, the first current collector and the second current collector each independently comprise a compliant porous carbon material, which may be useful for accommodate expansion and contraction of materials of the solid-state energy storage device, such as the electrodes, the electrolyte, and other materials of the solid-state energy storage device.

Optionally, a solid-state energy storage device is fabricated by means of atomic layer deposition, a form of chemical vapor deposition involving precursor chemicals and a two stage deposition process, such as where the deposition chamber must be purged between processing stages. Atomic layer deposition (ALD) permits the formation of layers having a thickness of several nanometers or less and intricate surface features of similar dimensions. Advanced magnetron sputtering may also correspond to a useful deposition technique. Multiple deposition chambers may be useful for performing sequential deposition operations.

It will be appreciated that the above reference to ALD does not preclude the use of other nanofabrication techniques applicable to micro-circuitry either extant or in development, including CVD, thermal evaporation, epitaxial techniques, ultraviolet or X-ray lithography, holographic lithography, thermal evaporation, laser ablation or deposition.

In exemplary embodiments, individual "sandwiches" or cells comprise electrolytic layers alternating with metal containing electrodes. Actual charge storage occurs within the electrodes, such as by a process in which ions are oxidized/reduced on or within the electrodes.

The benefits of the ALD and advanced magnetron sputtering fabrication technique useful with embodiments described herein are several. For example, they permit a high degree of consistency and repeatability and thus a low defect rate. In addition, because they support the formation of three-dimensional, high radius features at very small scales, these techniques permit the designer to increase interfacial surface area by many multiples over that afforded by featureless flat surfaces within the same volume. For example, surfaces having contoured topologies that provide increased surface area are useful with various embodiments. Certain fabrication techniques, if properly controlled, may also allow for precise control over the crystal structure of materials and may allow formation of single crystal, polycrystal, or amorphous materials.

In addition, energy storage devices of various embodiments may be built up incrementally, layer by layer. Capacity within a given footprint may be optionally controlled by varying the number of layers and the dimension of depth. The disclosed solid-state energy storage devices further lend themselves to the construction of power distribution networks where the energy storage devices are made modular and modules are interspersed with active circuitry or transducers. It will be appreciated that strategic depositions performed according to the ALD process or advanced magnetron sputtering can support such architectures. Optionally, the number of modules within such overall architectures may be arbitrarily small or large in number, such as 2 or 3 or as many as about 10 or more than about 10. Modules residing within such architectures may collectively assume the form of star and hub networks, redundant rings, or meshes, for example.

It will be appreciated that, in embodiments, the term "gel" refers to a non-fluid colloidal network or polymer network that is expanded throughout its whole volume by a fluid. As used herein, gels are expressly excluded from consideration as solid materials. Example electrolytes that comprise a gel include, but are not limited to, Nafion, LiPON, etc., which may be used, for example, in thin film lithium batteries. In some embodiments, electrolytes that comprise a gel cannot be prepared by high temperature deposition methods. It will be appreciated that solid-state electrolytes that comprise a gel cannot be prepared by atomic layer deposition. In addition, electrolytes that comprise a gel cannot withstand exposure to temperatures exceeding, for example 100° C., 200° C., 300° C., etc., without undergoing substantial damage to the electrolyte structure and/or without resulting in a substantial decrease in the ionic conductivity of the electrolyte structure.

FIG. 5A provides an overview of a process for making an energy storage device, in accordance with some embodiments. Initially, a substrate 505 is subjected to a deposition process 508, such as an atomic layer deposition process, where material of a first electrode 510 is deposited onto substrate 505. Use of atomic layer deposition processes is advantageous for controlling the thickness of first electrode 510. Substrate 505 may correspond to any suitable substrate. As an example, substrate 505 may correspond to a portion of an integrated circuit, for example. Substrate 505 may alternatively correspond to a topmost layer of another energy storage device.

Next, first electrode 510 is subjected to a second deposition process 513, in order to form a solid electrolyte 520 over the first electrode 510. For example, second deposition process 513 may correspond to an atomic layer deposition process to form a ceramic solid electrolyte. Use of atomic layer deposition processes is advantageous for controlling the thickness of solid electrolyte 520, as is advanced commercial sputtering.

Next, solid electrolyte 520 is subjected to a third deposition process 523, such as an atomic layer deposition process, where material of a second electrode 530 is deposited onto the solid electrolyte 520. Use of atomic layer deposition processes is advantageous for controlling the thickness of second electrode 530, as is advanced commercial sputtering.

Certain properties of the energy storage systems and devices described herein are strongly interrelated. For example, the highest level of performance may be achieved through system synergies in which the physical disposition of the active materials supports the most complete oxidation/reduction reactions. As noted above, in some embodiments, higher performance may correspond to using electrodes that are particularly thin or that exhibit high surface area. In some embodiments, higher performance may be achieved by using both sides of one or more electrodes in an energy storage device, which may be obtained using a stacked geometry in which a first surface of an electrode is positioned proximal to a first solid electrolyte and a second surface of the electrode is positioned proximal to a second solid electrolyte.

In some embodiments, an energy storage device may thus comprise several or hundreds of cells, or more, stacked together in a multi-layer arrangement. In some embodiments, a multi-layer arrangement may comprise a series of stacked energy storage cells in which the anode of one cell serves as the cathode of the cell stacked adjacent to it. In some embodiments, a multi-layer arrangement may comprise a plurality of stacked energy storage cells in which the anode of one cell also serves as the anode of an adjacent cell and/or in which the cathode of one cell also serves as the cathode of an adjacent cell.

FIG. 5B provides an overview of a process for making a stacked energy storage device, in accordance with some embodiments, and continues the process depicted in FIG. 5A. Second electrode 530 is subjected to a fourth deposition process 533, in order to form a second solid electrolyte 540 over the second electrode 530. For example, fourth deposition process 533 may correspond to an atomic layer deposition process to form a ceramic solid electrolyte. Use of atomic layer deposition processes is advantageous for controlling the thickness of second solid electrolyte 540.

Next, second solid electrolyte 540 is subjected to a fifth deposition process 543, such as an atomic layer deposition process, where material of a third electrode 550 is deposited onto second solid electrolyte 540. Use of atomic layer deposition processes is advantageous for controlling the thickness of third electrode 550.

It will be appreciated that additional electrolyte/electrode bilayers may be deposited over an uppermost electrode, similar to the processing depicted in FIG. 5B, in order to form stacked energy storage devices of any desired thickness and number of layers.

Figure 6:
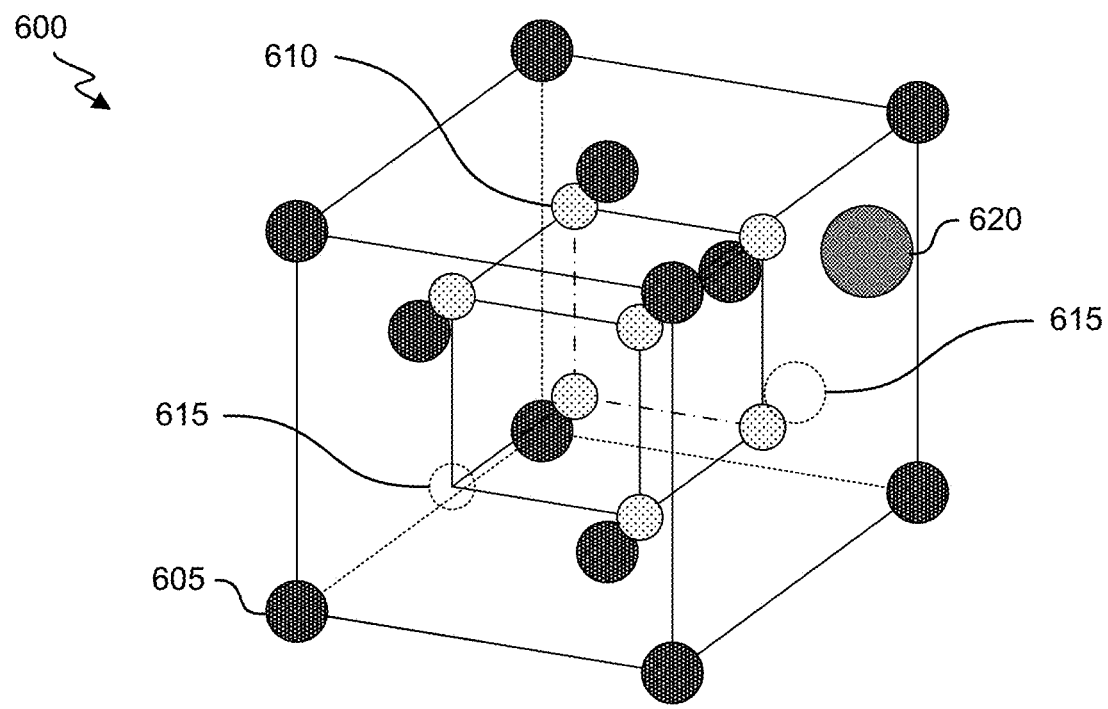
FIG. 6 provides a schematic illustration of the crystal structure of a solid electrolyte, in accordance with some embodiments.

In some embodiments, a solid electrolyte may exhibit a crystalline structure. The solid electrolyte may exhibit a variety of crystal forms, including single crystal and polycrystal. In embodiments where the solid electrolyte includes crystalline material, the solid electrolyte may take on different crystal forms, depending on the specific material configuration of the solid electrolyte. FIG. 6 provides a schematic illustration of a first example crystal structure 600 of a solid electrolyte. It will be appreciated that the crystal structure 600 illustrated may correspond to a ceria or zirconium crystal structure, which is provided here as an example only, and that other crystal structures are possible. For example, in embodiments, the solid electrolyte may comprise a perovskite ceramic, a ceramic having a perovskite structure, a zirconium ceramic, a ceria-gadolinia ceramic, an alumina ceramic, any variant of these, including any doped variant, and any combination of these.

In FIG. 6, various chemical elements make up the crystal structure 600. For example, first atoms 605, such as metal atoms, may comprise a portion of the crystal structure 600, and second atoms 610, such as oxygen atoms, may comprise a portion of the crystal structure 600. Various defects may be included in the crystal structure 600, which may be naturally occurring or intentionally introduced. As illustrated, crystal structure 600 includes voids or crystallographic defects 615, which may correspond to vacancy defects, for example, where atoms of the crystal structure are missing. Voids and crystallographic defects 615 may be useful for allowing transmission of oxygen anions through the crystal structure 600, and provide for the ability of oxygen anions to efficiently migrate through the solid electrolyte. It will be appreciated that other crystal structure features beyond voids or crystallographic defects such as vacancy defects may also exist in the solid electrolyte, such as crystallographic defects including interstitial defects, line defects, planar defects, bulk defects, and lattice imperfections. An interstitial defect 620 is illustrated. Each of the voids or crystallographic defects may, in some embodiments, contribute to the ability of ions to efficiently migrate through a solid electrolyte.

Figure 7:
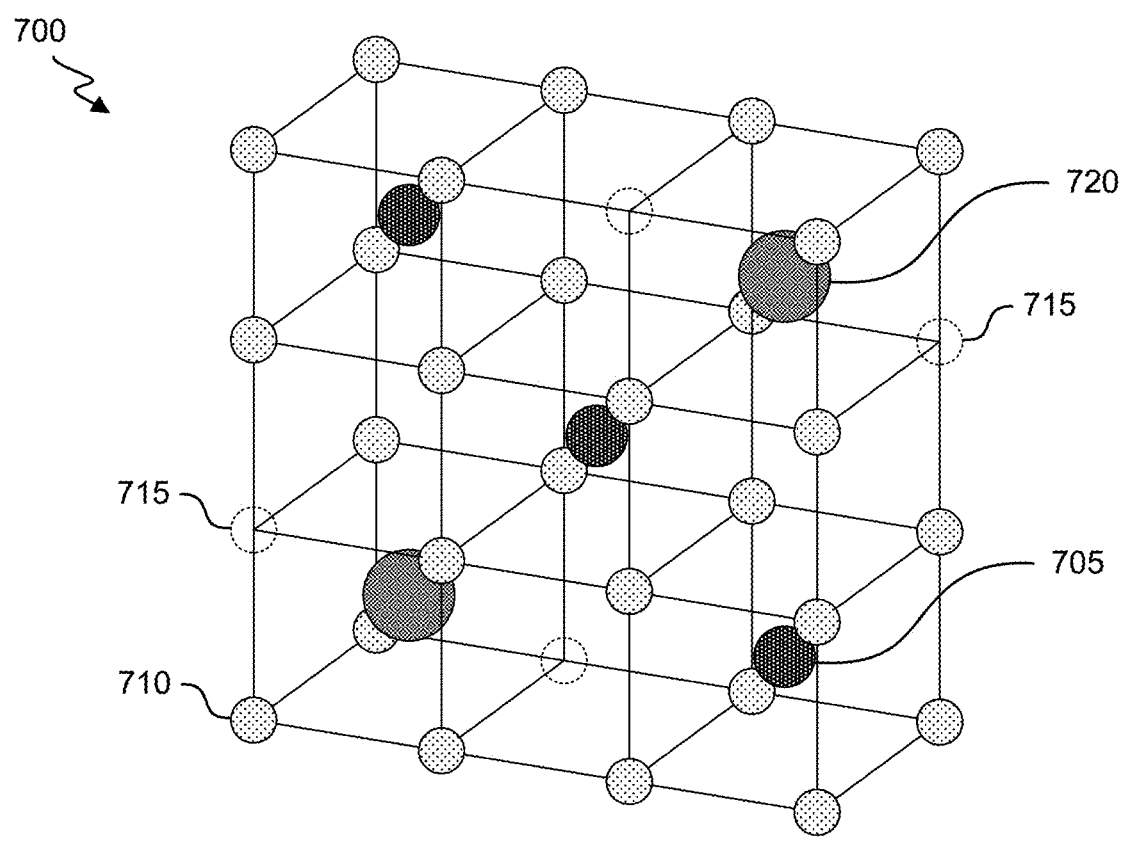
FIG. 7 provides a schematic illustration of the crystal structure of a solid electrolyte, in accordance with some embodiments.

FIG. 7 provides a schematic illustration of another crystal structure 700, which includes a first metal 705, oxygen atoms 710, and crystallographic defects 715. Here, crystallographic defects 715 may correspond to vacancy defects. The crystallographic defects 715 may be generated, for example, by introduction of one or more dopants 720 into the crystal structure 700. In some embodiments, the dopants 720 and crystallographic defects 715 may be introduced, for example, during the formation of the crystal structure, such as during an atomic layer deposition process. In some embodiments, the dopants 720 and crystallographic defects 715 may be introduced after the crystal structure 700 is formed, such as by an ion implantation or doping process. Useful dopants include, but are not limited to, alkali metal dopants, alkaline earth dopants, group 3 dopants, lanthanide dopants, titanium oxide dopants, hydrogen dopants, silver dopants, and/or lead dopants.

In embodiments, when an oxygen anion is added to the crystal structure 700 at a crystallographic defect 715, the electronic configuration of the crystal structure may change, such as due to the extra electrons carried by the oxygen anion. This configuration may create an unstable structure, and so the oxygen atoms may rearrange to accommodate the extra material added to the crystal structure and in this way allow oxygen anions to migrate through the crystal structure.

In other embodiments, the solid electrolyte does not comprise a crystalline material. For example, the solid electrolyte may comprise an amorphous material or an amorphous solid or be present in an amorphous state. Without wishing to be bound by any theory, some solid electrolytes may exhibit different electrical conductivities in crystalline and amorphous forms. In a crystalline or polycrystalline form, for example, some solid electrolytes behave as electrical conductors, which diminishes their utility in some devices described herein. For example, using electrolytes having a relatively high electrical conductivity may result in a self-discharge of any stored energy at a rate beyond which charge may be stored for an appreciable amount of time. In some cases, the self-discharge rate may be so large as to simply correspond to a short circuit between the electrodes. For some embodiments, use of an electrolyte having an amorphous structure is advantageous, as such an amorphous structure may exhibit a very low electrical conductivity, minimizing the self-discharge rate and allowing storage of large amounts of charge for long periods of time.

It will be appreciated that, in some embodiments, the energy storage devices described herein may comprise extremely small devices, as the electrodes and electrolyte may comprise layers having thicknesses as small as about 1 nm. For example, total thicknesses of a unit cell may be as small as about 3 nm, for example, or as large as about 1 μm. Some unit cell embodiments may comprise larger thicknesses, however, and multi-cell devices may take on any suitable thickness, as the number of unit cells is virtually without limit. These small unit cell dimensions may provide for a number of the advantageous properties of the devices. For example, in embodiments, the devices may exhibit extremely large electrical energy densities when charged, such as greater than or about 10 $J/cm^3$, greater than or about 50 $J/cm^3$, greater than or about 200 $J/cm^3$, greater than or about 500 $J/cm^3$, greater than or about 1000 $J/cm^3$, greater than or about 5000 $J/cm^3$, greater than or about 10000 $J/cm^3$, greater than or about 50000 $J/cm^3$, or selected from 10 $J/cm^3$ to 50000 $J/cm^3$. Although the amount of energy stored by a single cell may be small, the dimensionality of the cells may allow many hundreds or thousands or more cells to be included within a small volume, magnifying the overall energy storage capacity greatly.

Lateral dimensions for the devices, may also take on any suitable value, and may (at least) linearly contribute to the amount of energy stored by the devices. For example, in some embodiments, the lateral dimensions of the electrodes and the solid electrolyte may be as small as or about 20 nm or less, and may be limited by the deposition abilities used during fabrication. Various masking and lithographic processes may be used, for example, to achieve lateral dimensions as small as or about 10 nm. In other embodiments, the lateral dimensions may take on larger values, such as greater than or about 1 μm, greater than or about 10 μm, greater than or about 100 μm, greater than or about 1 mm, greater than or about 1 cm, or greater than or about 10 cm. Again, the maximum lateral dimensions achievable may be limited by the deposition abilities used, but are virtually without limit.

One advantage of such miniaturized energy storage devices is that multiple individual devices may be attached to one another to form an energy distribution network. Energy distribution networks of this nature may be useful for providing power at the point of load, minimizing power transmission distances and associated resistive losses and heat generation. Energy distribution networks may also be useful for sequestering attached devices from fluctuating electrical loads engendered by other components. For example, when included in an integrated circuit, such as in combination with inductive coupling, an energy distribution network may protect circuits from electrical fluctuations generated by circuit blocks elsewhere on the wafer.

Another advantage is that backup power may be provided in the event of the failure of any one of the storage devices in the distribution network, and a portfolio of energy resources may be provided within the confines of a single system on a chip, for example. Networking of the devices in an energy distribution may optionally be achieved using one or more addressable switching transistors, which can be used to isolate individual blocks or energy storage cells/stacks and/or to route current/voltage to components that have had a failure of their primary power source.

Optionally, the individual cells may in an energy distribution network be connected in series or in parallel and any combinations of series and parallel connections may be made. Such connections may be made highly configurable by the inclusion of switching transistors to set up and dismantle temporary circuit paths.

Figure 8:
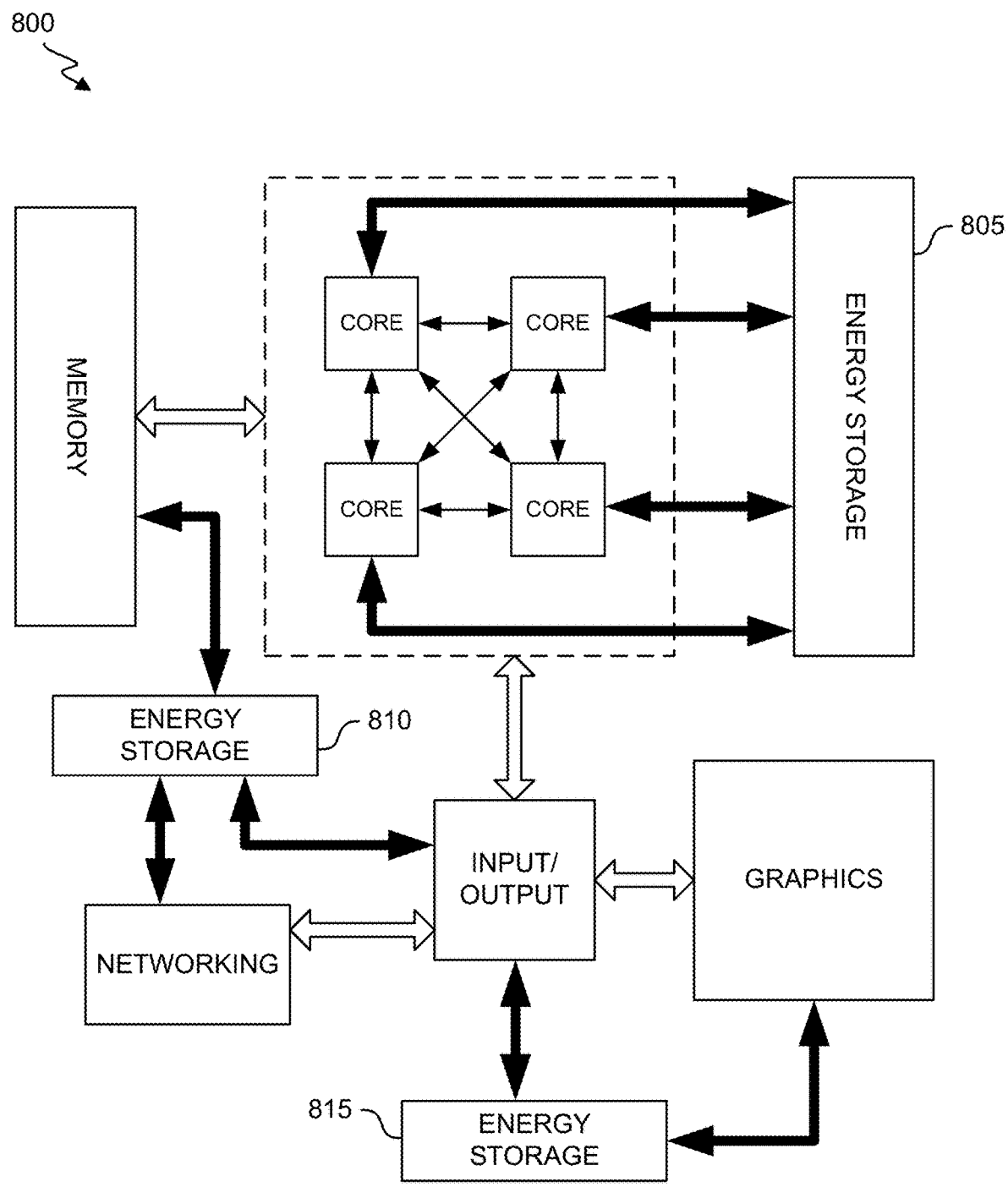
FIG. 8 provides a schematic illustration of a system including energy storage devices distributed throughout an integrated circuit.

FIG. 8 provides a schematic overview of a system 800 including a variety of energy storage devices 805, 810, 815. System 800 may correspond to a single integrated circuit configured as a system-on-chip, or may correspond to individual or integrated components, in any configuration. The energy storage devices 805, 810, 815 may be used individually as energy sources for one or more other components of system 800, but may also be used in an energy distribution network, as described above, to provide power to any one or more components. In such a configuration, a transistor network may be included, for example, to allow for individually switching the flow of electrical current from any individual energy storage device 805, 810, 815 to any individual component.

As illustrated, however, energy storage devices 805, 810, 815 are shown as separate energy storage devices, providing power to only one or a subset of components of system 800. For example, energy storage device 805 is illustrated as providing power to a central processing unit comprising four individual processing cores. Energy storage device 810 is illustrated as providing power to a memory unit, a network unit, and an input/output unit. Energy storage device 815 is illustrated as providing power to the input/output and a graphics processor. It will be appreciated that the electrical connection providing power from the energy storage devices to another component may be switchably achieved, such as by using one or more transistors, relays, or other controllable switching circuits.

Figure 9A:
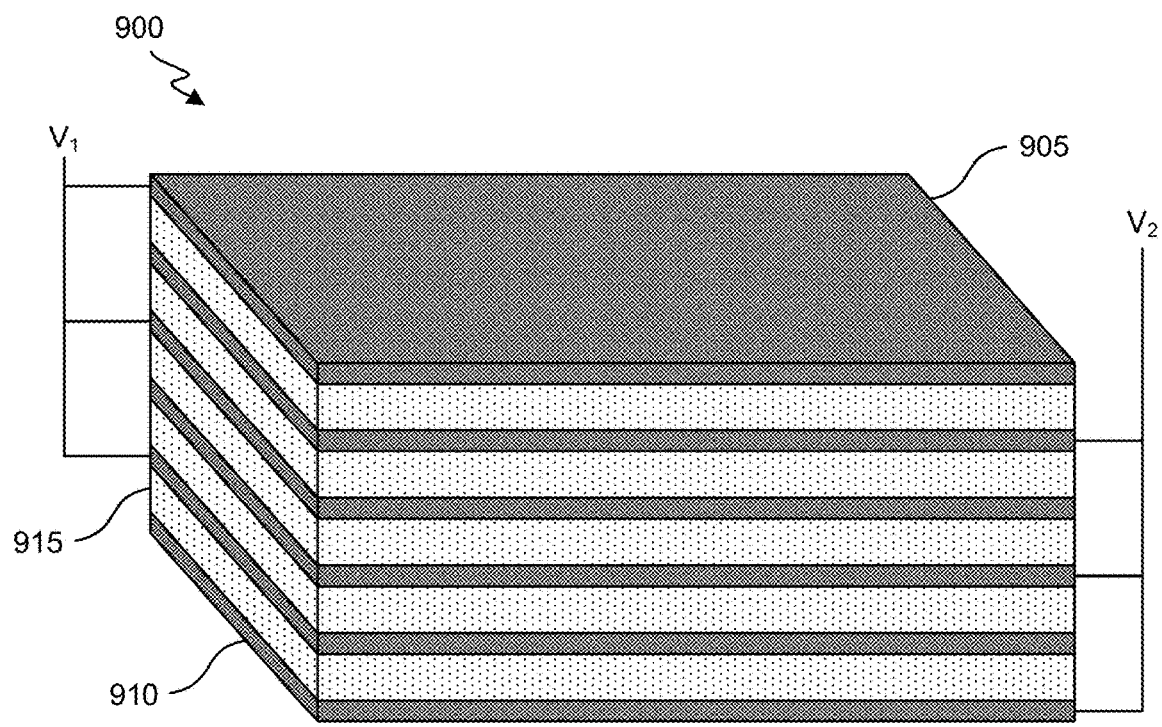
FIG. 9A, FIG. 9B, and FIG. 9C provide schematic illustrations of example energy storage devices.

FIG. 9A provides a schematic illustration of a section of a multilayer energy storage device 900. Here, alternating electrodes 905 and 910 are connected in a parallel configuration, such that the device comprises a single parallelized energy storage device. For example, every other electrode is electrically connected on a first end, while the remaining electrodes are electrically connected on the opposite end. Other configurations are possible, including series configuration, combined series and parallel configuration, and electrical connections to the electrodes may be made at any suitable position. As illustrated, a first set of electrodes exhibit a first potential ($V_1$), while a second set of the electrodes, interspersed between the first set of electrodes, exhibit a second potential ($V_2$), such that a potential difference between the electrodes is $V_1-V_2$. Solid electrolytes 915 are positioned between each adjacent electrode in FIG. 9A.

Figure 9B:
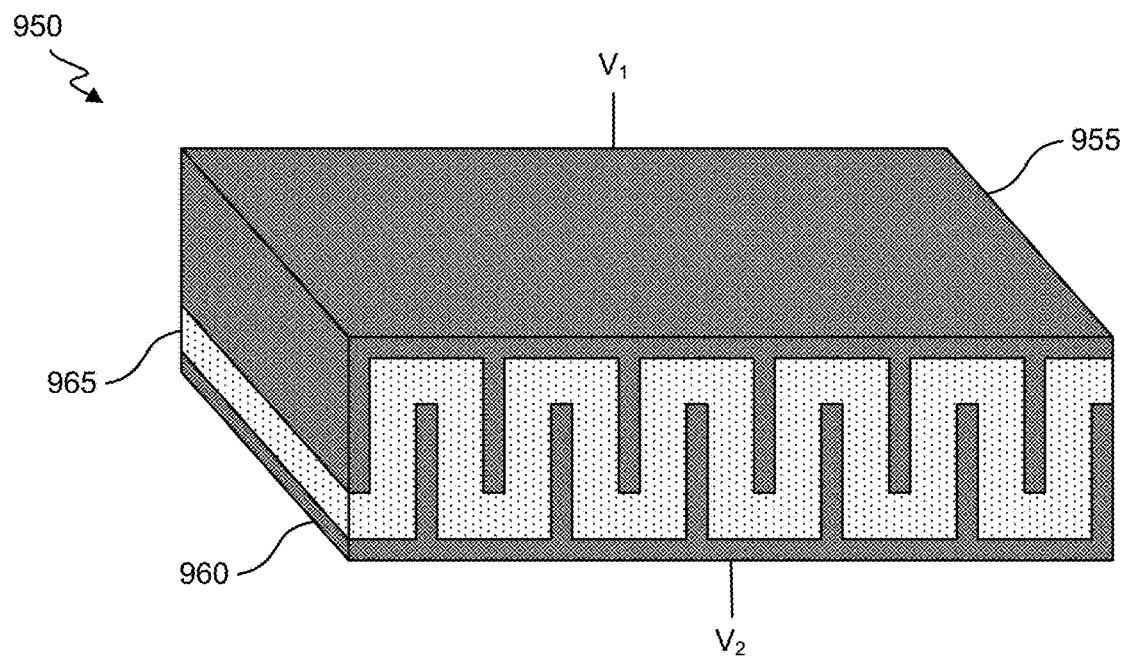
Figure 9C:
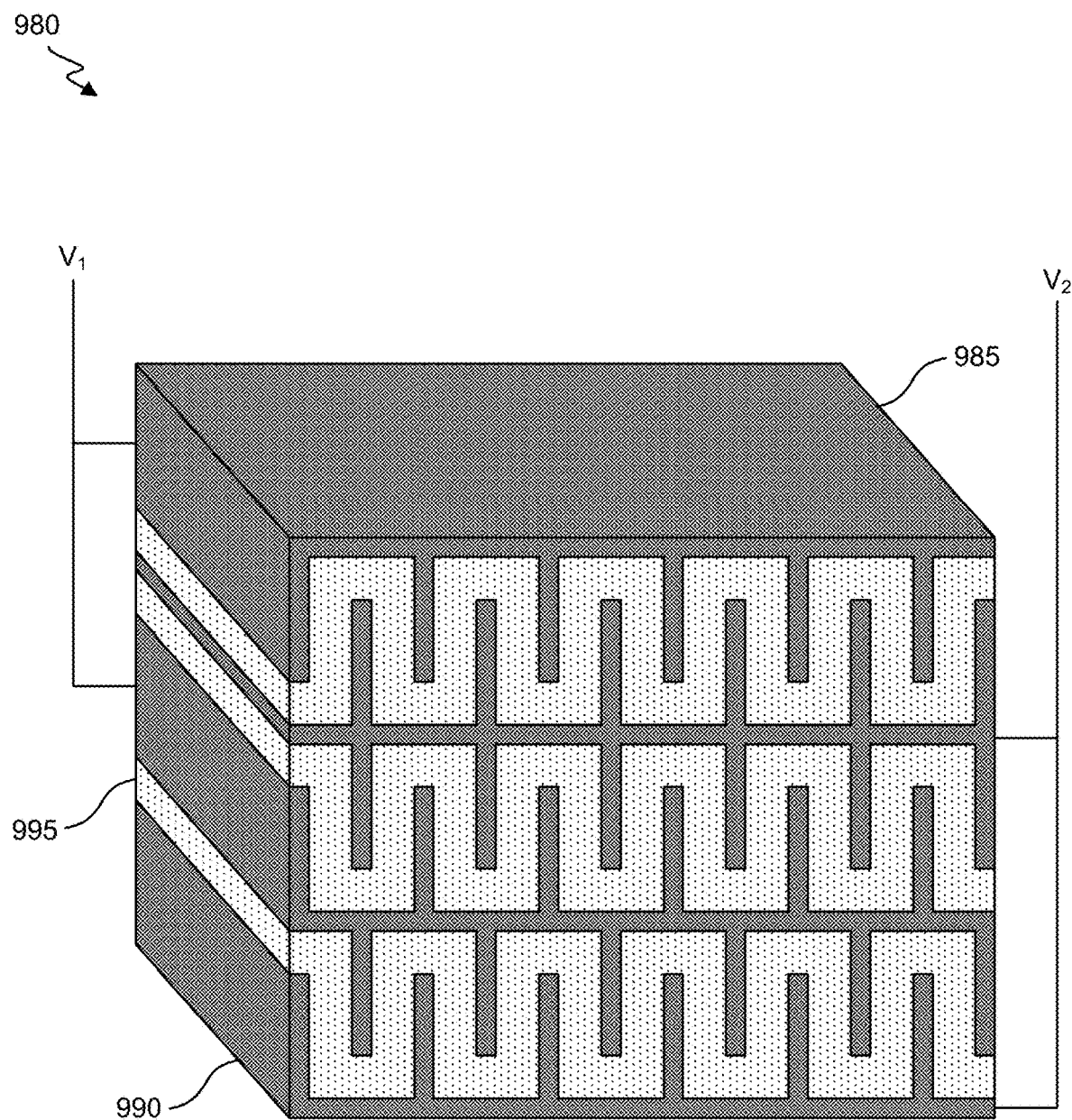

FIGS. 9B and 9C provide schematic illustrations of sections of energy storage devices 950 and 980. Here, electrodes 955, 960, 985, and 990 and electrolytes 965 and 995 are provided in interdigitated configurations, such that the devices exhibit large surface area. Such a configuration may provide an effective multilayer-type structure. It will be appreciated that combinations of structures corresponding to FIG. 9A and FIG. 9B may be used, such as illustrated in FIG. 9C, where an energy storage device comprises stacks of interdigitated electrode elements, separated by an electrolyte. When provided in such a stacked configuration, interdigitated electrode elements may be interdigitated on both sides (similar to shown in FIG. 9B), or interdigitated on one side. When provided in stacked interdigitated configurations, interdigitations extending opposite directions on an electrode may be lined up (top stack configuration in FIG. 9C), or displaced from one another (bottom stack configuration in FIG. 9C), or combinations may be used.

Figure 10A:
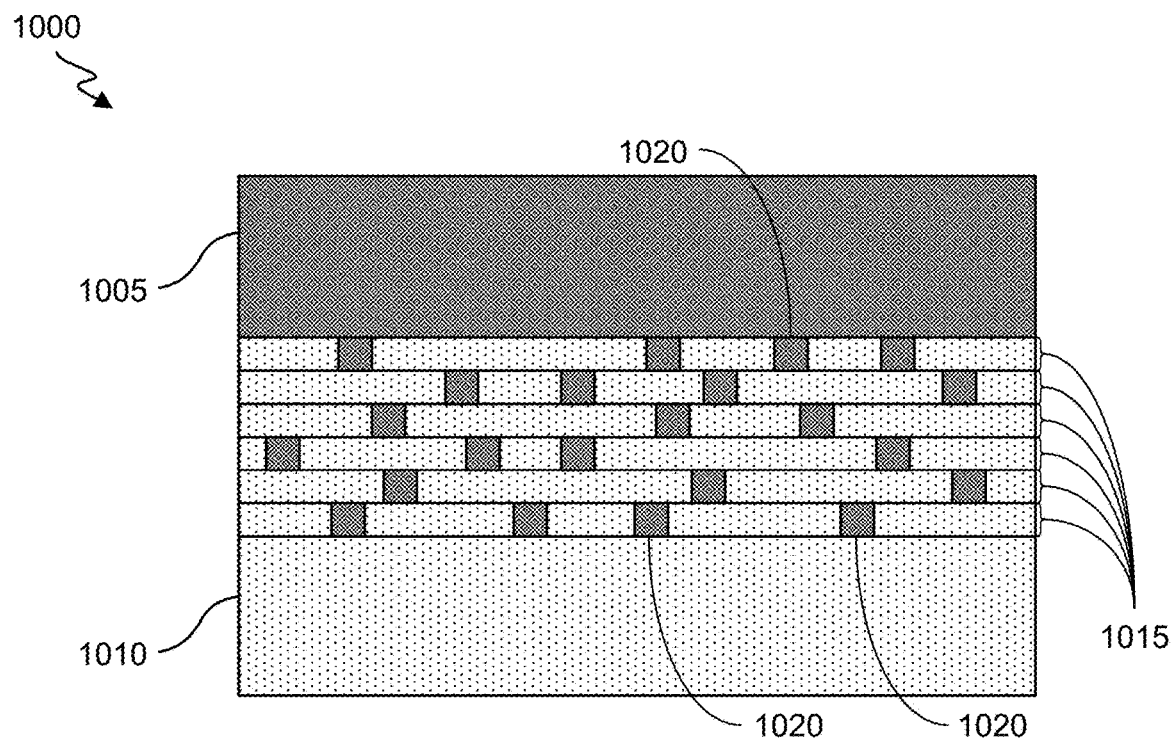
FIG. 10A and FIG. 10B provide schematic cross-sectional illustrations of components of example energy storage devices.
Figure 10B:
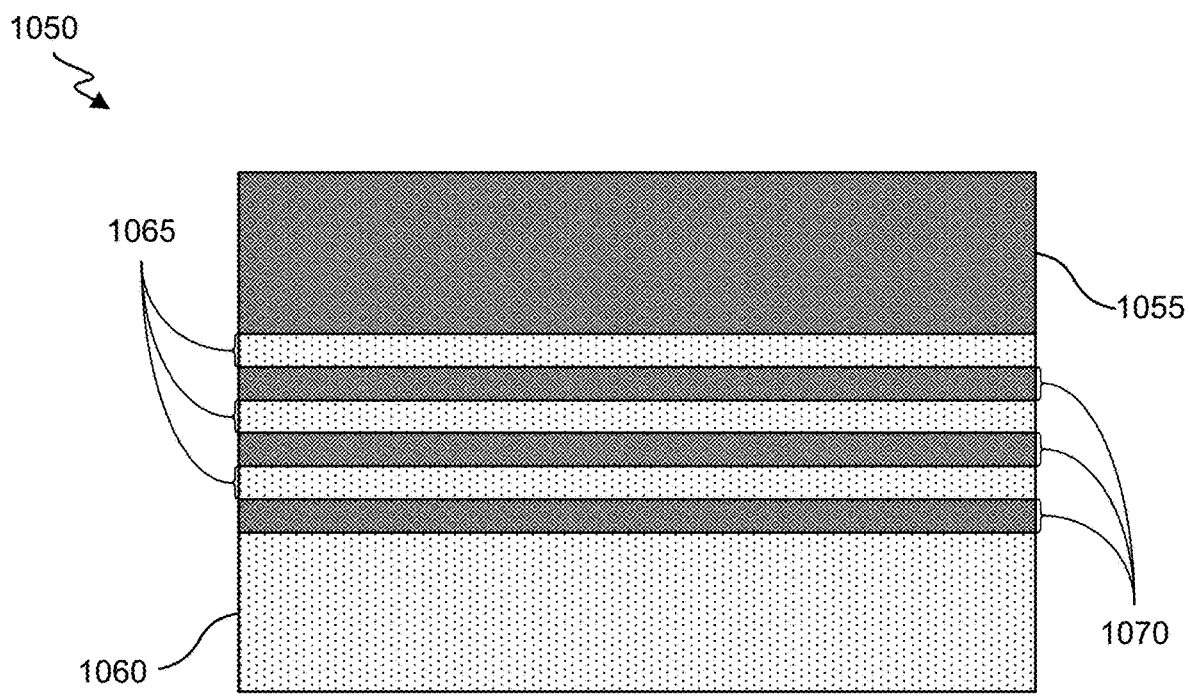

In addition to stacked energy storage devices and interdigitated electrodes, other techniques may be useful for increasing the surface area of an energy storage device. For example, FIG. 10A and FIG. 10B provide cross-sectional schematic illustrations of a portion of energy storage devices 1000 and 1050. In energy storage device 1000, an interface between an electrode 1005 and a solid electrolyte 1010 is shown; in energy storage device 1050, an interface between an electrode 1055 and a solid electrolyte 1060 is shown. Here, the interface between the electrode and the solid electrolyte is not simply a single abrupt change of one material to the other, but instead represents a transition between the electrode and the solid electrolyte materials.

In FIG. 10A, the transition may be achieved by multiple separate solid electrolyte interlayers 1015 over a larger structure corresponding to solid electrolyte 1010 (if fabricated from bottom-up as shown) or over a larger structure corresponding to electrode 1005 (if fabricated from top-down as shown). As illustrated, energy storage device 1000 includes six (6) interlayers 1015, but it will be appreciated that more or fewer interlayers may be used, such as from 1 to 30, or more. Each interlayer 1015 may include electrode components 1020, which may occupy at least a portion of the interlayer 1015. Optionally, some interlayers 1015 may not include an electrode component 1020, but may simply comprise or correspond to a layer of solid electrolyte material. While the electrode components 1020 may be physically separated from electrode 1005, the small size dimensions of the interlayers 1015 and close proximity between interlayers 1015 and electrode 1005 may result in sufficient electrical conductivity between electrode components 1020 and electrode 1005 such that the electrode components 1020 function as if they are electrically connected to electrode 1005. For example, each interlayer 1015 may independently have a thickness of from 0.5 nm to 5 nm, such as about 0.5 nm, about 1 nm, about 1.5 nm, about 2 nm, about 2.5 nm, about 3 nm, about 3.5 nm, about 4 nm, about 4.5 nm, or about 5 nm. Similarly, each electrode component 1020 may independently have a cross-sectional dimension (e.g. a thickness and/or a lateral dimension) of from 0.5 nm to 5 nm, such as about 0.5 nm, about 1 nm, about 1.5 nm, about 2 nm, about 2.5 nm, about 3 nm, about 3.5 nm, about 4 nm, about 4.5 nm, or about 5 nm. Such interlayers comprising both solid electrolyte material and electrode material may be fabricated by a co-deposition or simultaneous deposition of both the solid electrolyte material and electrode material and/or suitable precursors or components thereof.

In FIG. 10B, the transition may be achieved by multiple separate alternating depositions of solid electrolyte interlayers 1065 and electrode interlayers 1070 over a larger structure corresponding to solid electrolyte 1060 (if fabricated from bottom-up as shown) or over a larger structure corresponding to electrode 1055 (if fabricated from top-down as shown). As illustrated, energy storage device 1050 includes three (3) solid electrolyte interlayers 1065 and three (3) electrode interlayers 1070, but it will be appreciated that more or fewer interlayers may be used, such as from 1 to 30, or more. While the electrode interlayers 1070 may be physically separated from electrode 1055, the small size dimensions of the solid electrolyte interlayers 1065 and the electrode interlayers 1070 and their close proximity to electrode 1055 and one another may result in sufficient electrical conductivity between electrode interlayers 1070 and electrode 1055 such that the electrode interlayers 1070 function as if they are electrically connected to electrode 1055. For example, each solid electrolyte interlayer 1065 and each electrode interlayer 1070 may independently have a thickness of from 0.5 nm to 5 nm, such as about 0.5 nm, about 1 nm, about 1.5 nm, about 2 nm, about 2.5 nm, about 3 nm, about 3.5 nm, about 4 nm, about 4.5 nm, or about 5 nm. Such alternating interlayers of solid electrolyte material and electrode material may be fabricated by alternating deposition of the solid electrolyte material and the electrode material, and/or suitable precursors or components thereof, at a suitable deposition time/rate to allow for the small interlayer dimensions to be created.

Advantageously, by depositing interlayers 1015 including electrode components 1020 or alternating interlayers 1065 and 1070, a surface area of the electrode active material may be increased beyond just the surface area of the electrode 1005 to also include the surface area of electrode components 1020 or interlayers 1070. In some cases, the electrode material that may participate in redox reactions may correspond to a surface layer and or sub-layer (such as within 0-3 nm of the surface), and so such a configuration may be particularly advantageous for some energy storage devices as a means for increasing an active surface area useful for participating in redox reactions.

As another example of a high-surface area electrode, nanoneedle structures or nanoneedle-assembled microflowers, such as comprising $NiCo_2O_4$ or $MnCo_2O_{4.5}$ materials, may be used. The mesoporous nanoneedle structures may be used directly as an electrode or may serve as a scaffold or geometric substrate for a conformal coating of another transition metal or transition metal oxide, which may be or correspond to an active material of the electrode, while the nanoneedle structure may serve, for example, as a current collector, due to its high electrical conductivity. Such a nanoneedle-based structure may also provide other advantages in addition to high surface area. Since an energy storage device comprising the nanoneedle-based electrode also may include a solid electrolyte, the physical geometry of the nanoneedle-based electrode may provide a large and interdigitated contact area between the electrode and the solid electrolyte, providing strong adhesion between the electrode and the solid electrolyte, limiting delamination of the solid electrolyte from the electrode. A variety of techniques for generating nanoneedle structures are known. For example, Lee et al. Nanoscale Research Letters (2016) 11:45, hereby incorporated by reference, describes use of $NiCo_2O_4$ nanoneedle arrays as electrodes in sodium ion batteries. To generate a full energy storage device, a layer of solid electrolyte may be deposited over the nanoneedle-based electrode followed by subsequent generation of an additional electrode. As noted above, a layer of a transition metal or transition metal oxide (e.g., of thickness 1-50 nm) may be deposited over a nanoneedle structure to generate a nanoneedle-based electrode of the transition metal or transition metal oxide as the active material.

Figure 11:
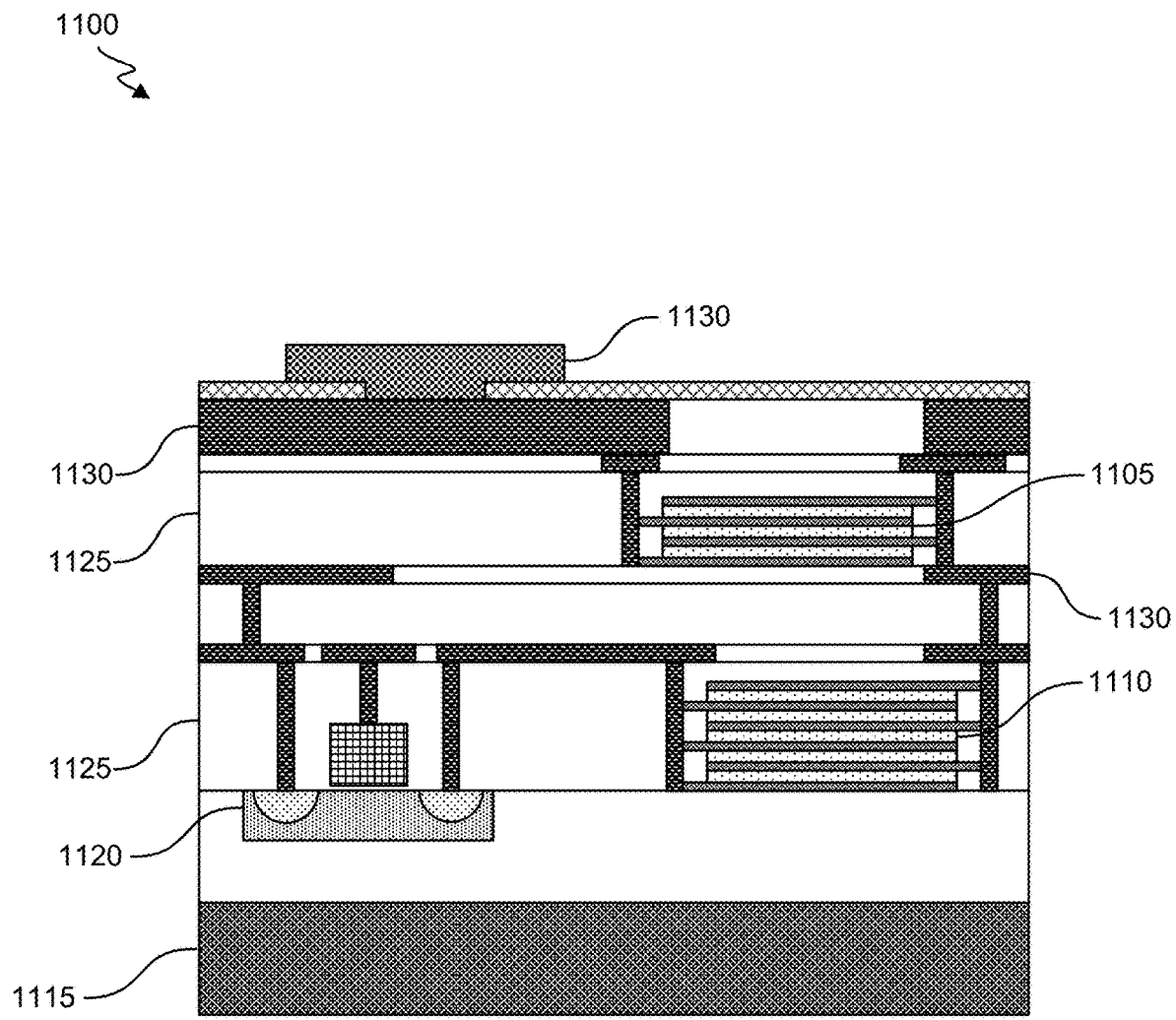
FIG. 11 provides a schematic cross-sectional illustration of an integrated circuit including multilayer energy storage devices.

FIG. 11 provides a cross-sectional schematic illustration of an integrated circuit 1100 including energy storage devices 1105 and 1110, positioned over a substrate 1115. Each of the energy storage devices 1105 and 1110 are illustrated as including multiple stacked unit cells, and interdigitated configurations may alternatively or additionally be implemented. A transistor 1120 is included in the circuit 1100, including source, drain, and gate elements. Various insulating/dielectric layers 1125 are included, as well as conductive traces 1130 between various layers and device components. It will be appreciated that the energy storage devices may be distributed and/or networked throughout the integrated circuit as described above.

Inclusion of one or more energy storage devices in an integrated circuit, as illustrated in FIG. 11, may be achieved, in embodiments, because the component materials and characteristics may be compatible with the semiconductor fabrication processes used to manufacture the integrated circuit. Further, the techniques used to make the energy storage devices, such as atomic layer deposition, magnetron sputtering, masking, lithography, etc., may be already utilized in the fabrication of the semiconductor devices, so additional processing systems and techniques may not have to be developed.

Figure 12A:
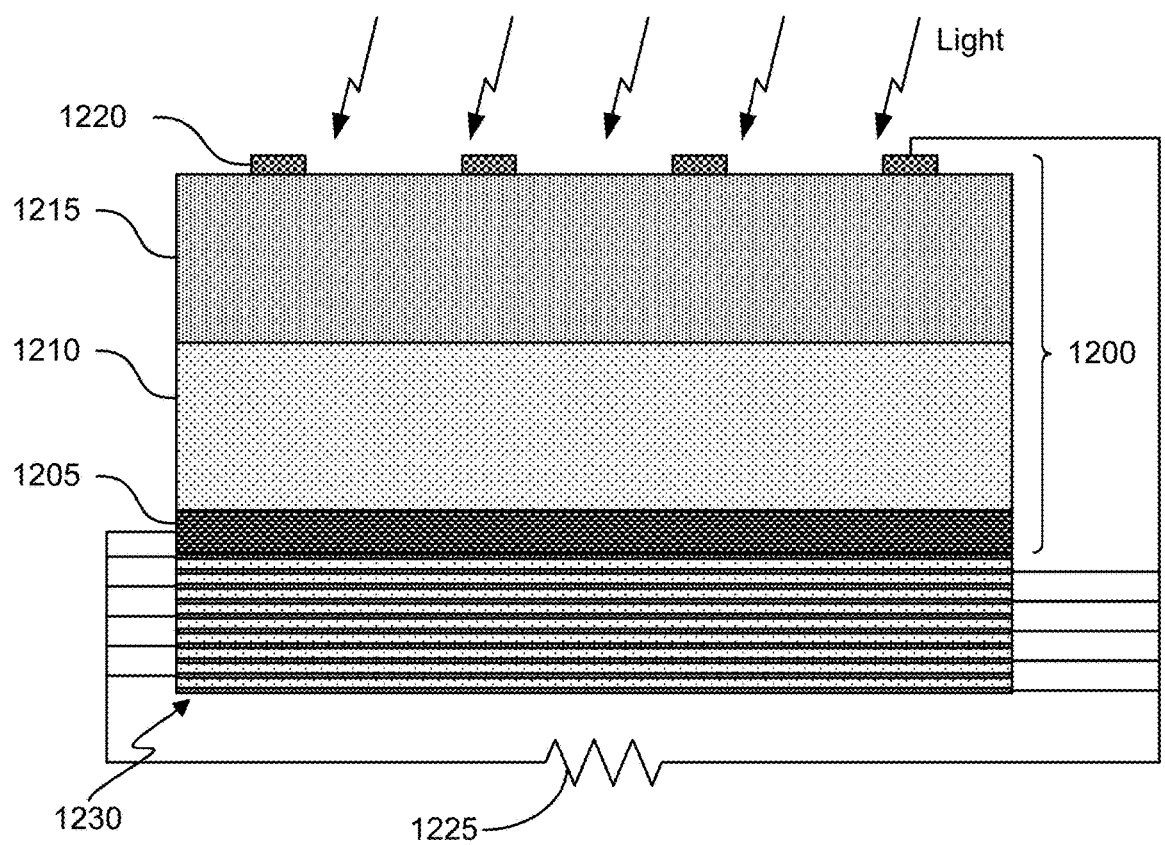
FIG. 12A and FIG. 12B provides schematic cross-sectional illustrations of an photovoltaic device including multilayer energy storage devices.
Figure 12B:
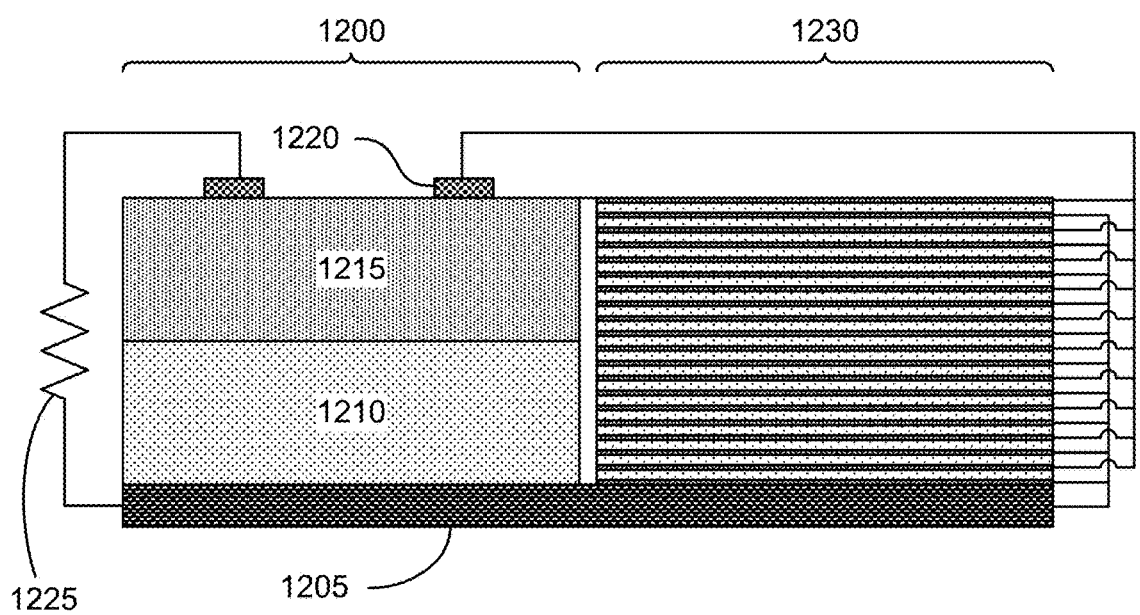

FIG. 12A and FIG. 12B provide cross-sectional schematic illustrations of a photovoltaic cell 1200 integrated with a stacked configuration energy storage device 1230. Interdigitated configuration energy storage devices may alternatively or additionally be implemented. Photovoltaic cell 1200 may optionally comprise any suitable photovoltaic material that is compatible with energy storage device 1230 and the fabrication processes for making energy storage device 1230. For example, in the embodiments illustrated in FIGS. 12A and 12B, photovoltaic cell 1200 comprises a bottom electrode 1205, a p-type silicon layer 1210, an n-type silicon layer 1215 and a top electrode 1220. Energy storage device 1230 comprises multiple layers of electrodes and electrolytes, for example similar to multilayer energy storage device 900 described above. A first set of electrodes of energy storage device 1230 is illustrated as in electrical communication with top electrode 1220 and a second set of electrodes of energy storage device 1230 is illustrated as in electrical communication with bottom electrode 1205. A load 1225 is also illustrated as electrically connected between bottom electrode 1205 and top electrode 1220.

In FIG. 12A, the energy storage device 1230 is positioned directly below and optionally in contact with bottom electrode 1205. Such a configuration may be desirable for example, to allow the first electrode of energy storage device 1230 to be deposited directly on bottom electrode 1205 during the manufacturing process. Other examples are possible, such as where an interleaving material, such as an insulator, semiconductor, or other conducting material is positioned between bottom electrode 1205 and energy storage device 1230. Additionally, different physical arrangements of the photovoltaic cell 1200 and energy storage device 1230 are contemplated. As an example, in FIG. 12B, the photovoltaic cell 1200 and energy storage device 1230 are positioned side-by-side. Such a configuration may be desirable to allow energy storage device 1230 to be positioned within the spaces between adjacent photovoltaic cells, for example. Further arrangements are contemplated, including where the energy storage device 1230 and photovoltaic cell 1200 are independent components and where the energy storage device 1230 is used as a standalone energy storage backup module.

It will be appreciated that providing energy storage devices in electrical communication with photovoltaic cells may be useful, in embodiments, for modulating the output of the photovoltaic cell and minimizing variability in cell output. Additionally, when exposed to light, the excess electrical energy generated by the photovoltaic cell may be used to charge the energy storage device to store the excess energy. The stored energy may then be provided by the energy storage device as voltage output during non-peak times, such as during the night or on cloudy days, for example. Including the energy storage devices directly on the same structure as the photovoltaic cell is further advantageous for simplifying construction, integration, shipping, etc. Additionally, the use of the energy storage devices described herein may be beneficial, for example, as the energy storage devices may have large power densities and can receive and provide large current densities as needed, without damaging the energy storage devices or degrading their storage capacities. Further, the energy storage devices may exhibit large cycle lives without resulting in component degradation or capacity loss, making them beneficial for use in these photovoltaic applications as well as other energy storage applications.

Additional related description may be found in U.S. patent application Ser. No. 13/536,029, filed on Jun. 28, 2012, and U.S. Provisional Application 61/502,797, filed on Jun. 29, 2011, which are hereby incorporated by reference in their entireties.

The present invention may be further understood by reference to the following non-limiting examples.

A. Architecture

Like batteries, the solid-state energy storage devices and systems described herein make use of conduction of ions through an electrolyte. For example, the disclosed energy storage devices and make use of reversible redox reactions that take place at the electrodes with ions that pass through the electrolyte. In the disclosed energy storage devices, these reversible redox reactions can occur without limit, and permit full discharge without damage. In some embodiments, an energy storage device comprises a simple construction, where two electrodes are separated by a solid-state electrolyte.

B. Temperature

Unlike battery chemistries such as lead/acid and lithium-ion, energy storage devices described herein are not restricted by temperature and remain capable of operating within a wide range of temperatures, such as, for example between about −100° C. and about 700° C., although some embodiments may exhibit a certain amount of temperature sensitivity. It will be appreciated that the energy storage devices of some embodiments can withstand this temperature range due to the use of ceramic electrolytes instead of liquid, gel, or polymer electrolytes. It will be appreciated that the ceramic materials used as electrolytes herein are not commonly seen to represent electrolytes at ambient temperatures when in bulk, but rather as dielectrics through which neither electrons nor positive ions can move.

C. Electrolyte Materials & Scale

In some embodiments, the disclosed energy storage devices use specially doped and extremely thin ceramic films, where the ceramic presents a structure with vacancies through which ions can flow to interface with the electrodes. The length scales used to achieve the conductivity of ions vary somewhat from material to material. In some embodiments, the thickness of the ceramic solid-state electrolyte is between about 30 nm and about 100 nm. If the electrolyte exceeds its limits, it reverts to a dielectric rather than an electrolyte, and thus will not function for energy storage, and so in no case does the thickness equal or exceed 1 μm. Conversely, if the electrolyte is too thin, opportunities exist for catastrophic failure by shorting out, such as due to surface roughage or electrostatic discharge from one electrode to the other through the electrolyte. Further, if the material of the electrolyte is or is rendered electrically conductive, the electrolyte may not be particularly useful in an energy storage device, as it may allow excessive self-discharge.

D. Doping

Basic ceramic materials such as alumina and zirconium in pure form may present monolithic and nonconductive surfaces to the electrodes if used in an energy storage device. In order to present a structure that contains the vacancies useful for ionic conductivity, some pure ceramic materials may require doping. The doping may, for example, create structural imperfections, defects, or ion carrier sites that the extremely small thickness scale can exploit. In some cases, this amounts to creating an alloy, such as where the dopant is as much as 50% of the material. $Na^+$ doped alumina (ß-alumina), is an example.

E. Energy Density & Charge

Due to the small amounts of material incorporated into the energy storage devices at the scales used in various embodiments, only small amounts of charge will be stored, even with a relatively high energy density. In certain embodiments, however, such as integrated into electronic circuitry in semiconductor chip fabrication, this small amount of charge can provide power at the point of load on an instantaneous basis. In addition, inductive coupling from a nearby source can be used in some embodiments to continuously recharge the energy storage devices.

In more general applications, such as replacement batteries for a consumer electronic device, such as a smart phone or laptop battery, embodiments may require multiple layers or cells to provide the needed current. For example, multiple layers of energy storage devices may be constructed on top of one another to achieve larger amounts of charge storage. Given the small thicknesses, many thousands of layers of electrodes and solid-state electrolytes can, in embodiments, be constructed within common battery pack sizes, such as on the order of about 1 cm to about 10 cm. Techniques, such as advanced commercial magnetron sputtering, atomic layer deposition, and other nanoscale deposition techniques allow economical fabrication of such multi-celled devices.

In a specific embodiment, a combination of two electrodes and one electrolyte layer constitutes a single cell. Optionally, the energy storage device may include a single cell or less than about 50 cells, such as in a continuous stacking configuration. The energy storage device may optionally be reduced to a depth that is commensurate with complete integration into a wafer based microcircuit where the energy storage device shares the same wafer as the active circuitry.

F. Field Specifics

In some embodiments, multi-celled energy storage devices comprising multiple layers of electrodes in between electrolytes may deliver even more energy storage/unit size than lithium-ion can attain. In embodiments, replacement devices can use drop-in replacement form factors, where the energy storage device may measure a few microns to a few mm in thickness or larger, with the remaining form consisting essentially of a case enabling direct replacement in existing devices. Using inductive charging, some embodiments may store enough charge that electronic devices would never need direct, wired charging beyond the first time.

G. Chip Integration

As described in more detail below, many batteries identified as "solid-state" batteries are not truly solid-state. For example, the electrolyte in these batteries typically comprises a gel or a powder or a colloidal suspension. It will be appreciated that these materials cannot withstand large temperature variations used in common semiconductor fabrication process, and thus are incompatible with integrated circuits, for example. Gel electrolytes behave analogously to aqueous electrolytes where crystallinity is not present and ions are not bound but are free to pass across the fluid or semifluid medium, impelled by electrical forces. Other devices may have a crystalline electrolyte, but use a liquid electrode.

In contrast, the energy storage devices described herein make use of rigid crystalline lattice structures and amorphous structures. For example, defects may be deliberately and artfully introduced to a crystal lattice in order to provide transient pathways for the movement of ions. Similarly, defects or other irregularities may be present in an amorphous structure, providing ion transmission pathways. These pathways may be engineered and organized by various techniques involving the introduction of chemical dopants or by the imposition of strain or by the application of outside forces, either transient or persisting. Such forces tend to deform the crystal lattice or solid structure such that paths for ionic migration become present, for example. These design strategies executed on the molecular and supramolecular level may be used to regulate the volume of ionic flow, and the process may involve beneficial nonlinearities with respect to ionic volume that may be exploited.

H. Energy Storage Device Architecture

In a solid electrolyte, such as a thin ceria stabilized zirconia layer situated between two metal or metal oxide electrodes, oxygen ions may shuttle between the electrodes bearing opposing charges. Without wishing to be bound by any theory, the inventors believe that the positive ions move by traversing through the interstices of a fairly rigid crystalline lattice of extremely limited depth (thin-film), but rich in oxygen vacancies, and it is the oxygen vacancies that permit the free movement of positive ions. A trade-off exists between high ionic conductivity and multiple-layer requirements. The movement of ions through the solid-state electrolyte may also be further tuned by the imposition of external stresses, such as those caused by a bi- or multi-layer electrolyte, that deform the lattice and widen the passageways for ionic movement. In either stressed or unstressed cases, the ions participating in energy storage act as replacements for atoms distributed within the electrolyte, and these ions hop from site to site.

I. Temperature Range and Integrated Circuit Integration

The completely solid, gel-free energy storage devices disclosed herein are capable of withstanding very large temperature variations. For example, some embodiments may be useful between about −100° C. and about 800° C., and, more practically, at temperatures of between 0° C. and 50° C. In addition, the devices, due to the lack of liquid or gel materials, may be rugged and capable of integration into active semiconductor circuitry. In terms of size reduction, this can reduce, for example, the size of an integrated circuit, such as a central processing unit, by about 70%, due to the elimination of pin connectors and attendant circuitry, in some embodiments, which may be accompanied by a corresponding reduction of heat generation. In addition, the energy storage devices, such as when coupled inductively, permit redundant instantaneous power at point of load.

Additionally, the energy storage device can take the form, in some embodiments, of a network of cells. Printed conductive traces may convey the stored energy to its destination and switching matrices may allow for powering any of the circuit components by any of the cells, in any combination. For example, some cells may power logic circuits, while other cells may power mixed signal circuits.

Switching between and among energy storage cells may take the form of star and hub architectures, redundant rings, or mesh networks with or without intelligence. Such architectures may serve to support power at the point of load design strategies or islanding of defective cells or adjustments in voltage and current by making cell to cell connection switchable.

It will be appreciated that, because of the flexibility afforded by the materials and architectures used in the energy storage devices, an array of cells may be planar, three dimensional, or may comprise a succession of stacked planes, for example. In addition, planar inductors may, optionally, be incorporated along with the storage cells such that islands of energy storage may be inductively coupled with one another, reducing the number of conductive pathways and the mass and volume of an integrated circuit incorporating energy storage.

In some embodiments, the materials that comprise an energy storage device may be rendered rigid and unyielding or flexible, depending upon the thickness of the material and the presence or absence of porosity within it. Energy storage may thus be incorporated in flexible thin films such as displays or thin film photovoltaic cells or in energy harvesting devices dependent upon the movement of membranes to generate electrical power, for example. In addition, caseless batteries may be constructed in which the electrodes and electrolytes provide structural integrity to the batteries. In some embodiments, the energy storage devices may also be integrated with planar energy harvesting radio frequency antennas or with generator and actuator MEMS elements, so that microelectromechanical energy storage, power electronics, and signal processing may be incorporated into a single wafer with a high degree of synergy and integration among the separate elements.

J. Gel-Free

Embodiments of the present invention relate to solid-state energy storage devices and methods of making solid-state energy storage device in which components of the devices are truly solid-state (i.e., they do not comprise a gel). The solid-state battery nomenclature is not new but it has always been misleading in the prior art. Many "solid-state batteries" utilize either gels or in some case powders for the electrolyte layers and never homogenous, consolidated solid materials that can integrate into semiconductor chips directly, for example. Gel materials prohibit both incorporation within VLSI/ULSI chips, and restrict temperature ranges to approximately ambient.

Solid-state electrolyte layers have been utilized in some solid oxide fuel cells. When used in a solid oxide fuel cell, solid-state electrolyte layers normally conduct ions at a practical rate only at extremely elevated temperature, such as exceeding 600° C. However, the solid electrolyte layers described herein exhibit high ionic conductivity, which may approximate or exceed that of liquid or gel electrolytes, even at ambient or near ambient temperatures. The ambient temperature ionic conduction exploited herein also offers further advantages of preserving high electrical resistance and dielectric strength, which are commonly sacrificed in solid-state superionic conductors at high temperatures.

In exemplary embodiments, gaseous oxygen ($O_2$) and/or oxygen ions (e.g., $O^+$, $O^-$, or $O^{2-}$) are responsible for charge transport and formation of the electrochemical bonds (redox) by which electrical charge is stored and conserved. Other ionic species may also be useful, depending on the particular construction and chemistry employed, such as nitrogen ions, sulfur ions, chloride ions, protons, etc. A number of transport mechanisms may invoke the passage of ions through the structure of the solid electrolyte layer. For example, vacancies within the structure may be an important source of ion transport.

It will be appreciated that vacancies may represent defects, and may be present when a ceramic has been doped with another chemical which results in a departure from the regularity of the local crystal structure present in the pure ceramic. Such defects may be analogous to "holes" in P type semiconductors, for example. It may be advantageous if the ceramic and/or the dopant contains the element that will be ionized, and some of that element may be dislodged from the crystal structure. Additional ions may be drawn from the anode or the cathode, or from the atmospheric air if oxygen ions participate in the redox reactions.

The ionic conduction modes in ceramic electrolytes are very different from those present in aqueous or polymer electrolytes where no local crystal structure is present and where ions are released by means of electrolysis or simply pass through the fluid medium from the electrodes. In true solid electrolytes, as opposed to gels, both chemistry and mechanical forces play a role in ionic migration as does the phase of the local crystal structure.

The addition of dopants alone may not provide a high degree of ionic conductivity under ordinary circumstances, and some solid electrolyte materials will not conduct ions at all at macro scale thicknesses and at ambient temperatures, for example. In some embodiments, violent flexures and dislocations of the lattice structure are required to support interstitial movements of ions.

Such flexures may take the form of phonons, that is, thermally induced periodic oscillations at audio frequencies or more enduring surface strains imposed by the fabrication process or by the presence of micro-actuators such as piezoelectric elements that exert shear forces. Either mechanism may provide spaces through which positive ions may be transported.

It will be appreciated that zirconia and other ceramics may be suitable as solid electrolytes. In some embodiments, useful ceramics include doped ceramics. For example, calcium, magnesium, dysprosium, yttrium, aluminum, cerium, and ytterbium, stabilized zirconias may also be useful solid electrolytes.

K. Fabrication

In embodiments, a solid-state electrolyte layer, which may be a consolidated structural layer, offers many performance advantages. For example, the structural integrity conferred by a solid electrolyte combined with solid electrodes may eliminate the need for an external case, in some embodiments. For example, in one embodiment, the energy storage device can be naked, i.e., not associated with any other structural materials. In some embodiments, the energy storage device may be built up as an integral circuit element within a larger microcircuit with wafer fabrication techniques. These examples may not possible with conventional battery technologies. The solid-state energy storage devices described herein also may possess inherent physical robustness and a high immunity to shock, vibration, and temperature extremes. In addition, the solid-state energy storage devices described herein are highly scalable such that they may be closely coupled to such entities as MEMS devices and microfluidic systems.

In exemplary embodiments, a solid-state energy storage device becomes, in essence, another circuit element in an integrated circuit and facilitates the realization of optimal circuit paths and grounding schemes because it lends itself to strategic placement within the overall circuit. In some embodiments, this can eliminate as much as 70% of the circuitry (e.g., the portion served by power pins) in existing VLSI/ULSI chips, greatly reducing size and heat generation.

L. Point of Load Power and Inductive Charging

Solid-state construction has implications that are as potentially as revolutionary with respect to electrical charge storage as they have been to active circuitry when transistors largely replaced vacuum tubes (thermionic valves) more than a half-century ago. For example, just as transistors invoke different mechanisms for controlling the passage of current through a circuit and realization of voltage and current gain, solid-state energy storage devices may utilize unique mechanisms for storing and releasing electrical charge at the point of load. Also importantly, solid-state energy storage devices exhibit an ability to charge rapidly by inductive coupling (rapidity due to the ability to resist overcharging), permitting wireless charging and potentially eliminating need for nearby power sources entirely.

It should be understood that, in various embodiments, the solid-state energy storage devices described herein categorically reference redox reactions. In exemplary embodiments, charge storage may be achieved through truly reversible redox reactions occurring some little distance into the depths of the electrode layer. That depth may be in the angstroms or into the low nanometers, and, to be more specific, less than 10 nanometers. Oxygen ions may form the basis of or otherwise take part in the redox reactions. In this text, oxygen may stand in for any other useful ion.

Without wishing to be bound by any theory, ions may enter and leave the electrodes during the charge/discharge cycles, and may reach depths of about 0.2 nm to about 10 nm, such as about 0.5 nm, about 1 nm, about 2 nm, about 3 nm, about 4 nm, about 5 nm, about 6 nm, about 7 nm, about 8 nm, about 9 nm, about 10 nm, or any combination of ranges between any of these specific values. In exemplary embodiments, the electrodes themselves range in overall depth/thickness from between about 7 nm to about 50 nm.

Uniquely, multiple redox reactions may be invoked, and successively higher oxidations may be formed at successively higher input voltages. For example, in some embodiments, exemplary electrode materials comprise, consist of, or consist essentially of elemental metals or capable of forming a sequence of oxidized forms of progressively greater molecular weight that incorporate additional amounts of the ionic species. For oxygen, these may include, for example, monoxides, dioxides, trioxides, tetroxides, pentoxides, hexoxides, heptoxides, and so on. In some embodiments, hydrides, nitrides, sulfides, chlorides, etc., may be substituted for oxides. Work functions for candidate materials may, for example, range between about 4 electron volts and about 5 electron volts and may also include values between these limits.

In exemplary embodiments, electrolyte layers comprise ceramic compositions supporting expeditious transfer of positive ions from the anode to the cathode or from the cathode to the anode at ambient or near ambient temperatures. Transfer rates optionally range from about 10 to about 50 Siemens per centimeter, and these rates may be greater in architectures where the electrolyte thickness is less than about 58 nm. Useful ceramic compositions include a number of perovskites and perovskite-related oxides, as well as many zirconium ceramics, such as zirconia-scandia, $Zr_{1-x}Sc_xO_{2-\delta}$ and the cheaper zirconium stabilized by yttria, and ceria-gadolinia, $Ce_{1-x}Gd_xO_{2-\delta}$ (CGO), alumina and β-alumina formulated with a number of dopants such as ceramic forms of $Na^+$, $K^+$, $Li^+$, $Ag^+$, $Pb_2^+$, $Sr_2^+$ or $Ba_2$, TiO, $TiO_2$, $Ti_2O_3$, etc.

M. Enhanced Ionic Conductivity Dependencies

Thin-film scale and temperatures. Invoking high ionic conductivity for purposes of fabricating energy storage devices via thin-film deposition of the solid-state electrolytes may involve two aspects. The first, thickness of the film, may dominate at all enhanced ionic conductivity temperatures. Temperature itself plays a significant role, especially at thicker (but still thin) films.

Enhanced ionic conductivity in the sense of orders of magnitude greater than bulk ionic conduction for the above mentioned solid-state electrolytes is exhibited below a particular thickness, which may vary from material to material. As an example, the enhancement for electrolytes in the zirconium family begins at below or about 700 nm. Thicker than that, bulk material characteristics dominate and the well-known Arrhenius formula apply. In smaller thickness electrolytes, the enhanced ionic migration is observed and embodiments described herein may make use of this advantageous property.

Temperature-dependent enhanced ionic conductivity is observed, in embodiments, when the interface conductance is greater than that of the bulk—that is, thinner than a threshold of about 700 nm. Invoking ambient temperature performance requires films with acceptable ranges, for example, lower than about 62 nm, in some embodiments. The range from 30 nm to 1 nm may provide exceptional performance, with 1 nm providing negligible resistance to ionic flow while still continuing electron holdoff.

Strained interfaces. Another technique for invoking enhanced ionic migration involves a strained membrane or film. This may be achieved via deposition of heterogeneous electrolyte materials in sandwiched form, such as perovskites/zirconium compounds/perovskites, or the reverse order. Films of substantially less than 1 μm may be useful for achieving the enhanced ionic migration in this way.

Advantageous aspects of the described energy storage devices include, but are not limited to:

A true, gel-free, solid-state energy storage device with solid metal containing electrodes and solid electrolyte layers having structural as well as electrical properties. The electrolyte layers include glass or ceramic compositions capable of supporting massive ionic migrations at the dimensions specified, and at ambient or near ambient temperature.

Bi-layer electrodes capable of forming oxides and successions of higher oxides in the presence of an electrical charge.

An elementary unit including a single cell comprised of two electrodes and an electrolyte layer all of solid, consolidated construction.

A structural energy storage device that is self-supporting and requires no external case.

Methods of construction such as atomic layer deposition and advanced commercial sputtering that permit full integration of storage into integrated circuits.

A cell thickness of less than about 200 nanometers and as little as about 30 nanometers and any intermediate value.

An electrode thickness of less than about 50 nanometers and more than about 5 nanometers.

An electrolyte layer thickness of less than about 150 nanometers and no less than about 20 nanometers.

A multi-layer construction ranging from 2 cells up to thousands of cells and any number in between.

A multi-layer construction having any combination of series and parallel connections between and among cells.

A modular design incorporating dispersed energy storage units.

A switching network for addressing dispersed energy storage units.

A capability of undergoing full discharge without incurring damage or degradation.

A formula that enables selection of appropriate electrode materials based on a variety of factors including work function, oxidation number, performance under various temperatures, and availability.

A formula that enables the selection of appropriate solid electrolyte materials based on factors including voids and/or band gaps and membrane stress that permit ion migration through the electrolyte, and performance under various temperatures.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A Faradaic solid-state energy storage device comprising:
    a first electrode,
        wherein the first electrode has a first thickness, wherein the first thickness is greater than 1 nm and less than or equal to 80 nm, and
        wherein the first electrode comprises a first metal containing composition;
    a solid electrolyte positioned in direct contact with the first electrode,
        wherein the solid electrolyte has a second thickness, wherein the second thickness is greater than 1 nm and less than or equal to 500 nm,
        wherein the solid electrolyte has an amorphous structure, and
        wherein the solid electrolyte comprises a solid-state material that selectively conducts ions at least at temperatures of between about 0° C. and about 100° C.; and
    a second electrode positioned in direct contact with the solid electrolyte,
        wherein the second electrode has a third thickness, wherein the third thickness is greater than 1 nm and less than or equal to 80 nm, and
        wherein the second electrode comprises a second metal containing composition.

2. The Faradaic solid-state energy storage device of claim 1, wherein each metal containing composition independently comprises one or more of Mn, Zn, Fe, Co, Ni, Cu, Mo, Tc, Ru, V, Bi, Ti, Rh, Pd, Ag, Au, W, Re, Os, La, Na, K, Rb, Cs, Ir, or Pt.

3. The Faradaic solid-state energy storage device of claim 1, wherein the first metal containing composition or the second metal containing composition independently comprises a metalloid including one or more of boron, silicon, germanium, arsenic, antimony, carbon, aluminum, or selenium.

4. The Faradaic solid-state energy storage device of claim 1, wherein the first metal containing composition and/or the second metal containing composition comprises a metal and oxygen, hydrogen, nitrogen, sulfur, a non-lithium alkali metal, or a halogen.

5. The Faradaic solid-state energy storage device of claim 1, wherein
    the ions comprise oxygen ions, nitrogen ions, sulfur ions, halogen ions, non-lithium alkali metal ions, or hydrogen ions; and/or
    the solid electrolyte comprises an oxygen ion conducting material, a nitrogen ion conducting material, a sulfur ion conducting material, a halide ion conducting material, a non-lithium alkali metal ion conducting material, and/or a hydrogen ion conducting material.

6. The Faradaic solid-state energy storage device of claim 1, wherein, at about 25° C., the solid electrolyte exhibits an ion conductivity selected from about 0.000001 S·cm$^{-1}$ to about 0.2 S·cm$^{-1}$.

7. The Faradaic solid-state energy storage device of claim 1, wherein, at about 25° C., the solid electrolyte exhibits an electrical conductivity selected from about $10^{-25}$ S·cm$^{-1}$ to about $10^{-6}$ S·cm$^{-1}$.

8. The Faradaic solid-state energy storage device of claim 1, wherein the first electrode, the second electrode, and the solid electrolyte are independently fabricated using a controllable deposition method including one or more techniques selected from atomic layer deposition, magnetron sputtering, spin deposition, chemical vapor deposition, ultraviolet lithography, x-ray lithography, holographic lithography, laser ablation, or thermal evaporation.

9. The Faradaic solid-state energy storage device of claim 1, wherein the solid electrolyte is formed using a controllable deposition method using a temperature of between 0° C. and 250° C.

10. The Faradaic solid-state energy storage device of claim 1, wherein the first electrode, the solid electrolyte, and the second electrode correspond to an interdigitated structure.

11. The Faradaic solid-state energy storage device of claim 1, further comprising:
    one or more solid electrolyte and electrode bi-layers positioned over or in direct contact with a topmost electrode.

12. The Faradaic solid-state energy storage device of claim 1, wherein the Faradaic solid-state energy storage device is free of or does not include any liquids or gels.

13. The Faradaic solid-state energy storage device of claim 1, further comprising an oxygen absorbing solid-state material in gaseous communication or physical contact with the first electrode and/or the second electrode.

14. The Faradaic solid-state energy storage device of claim 1, wherein one or more electrodes comprise or are coated over a nickel-cobaltite ($NiCo_2O_4$) structure, a manganese-cobaltite ($MnCo_2O_{4.5}$) structure, or a conductive nanoneedle structure.

15. The Faradaic solid-state energy storage device of claim 1,
    wherein the solid electrolyte comprises a solid electrolyte layer and a portion of a first transition structure, wherein the first electrode comprises a first electrode layer and a portion of the first transition structure, wherein the first transition structure comprises a plurality of interlayers, and wherein each interlayer comprises an electrode interlayer, an electrolyte interlayer, or a mixed electrode/electrolyte interlayer; and/or
    wherein the solid electrolyte comprises the solid electrolyte layer and a portion of a second transition structure, wherein the second electrode comprises a second electrode layer and a portion of the second transition structure, wherein the second transition structure comprises a plurality of interlayers, and wherein each interlayer comprises an electrode interlayer, an electrolyte interlayer, or a mixed electrode/electrolyte interlayer.

16. A method of making a Faradaic solid-state energy storage device, the method comprising:
depositing a first electrode on a substrate,
wherein the first electrode is deposited to a first thickness, wherein the first thickness is selected from about 1 nm to about 80 nm,
wherein the first electrode comprises a first metal containing composition, and
wherein depositing the first electrode includes depositing using a first controllable deposition method;
depositing a solid electrolyte on the first electrode,
wherein the solid electrolyte is deposited to a second thickness, wherein the second thickness is selected from about 1 nm to about 250 nm,
wherein the solid electrolyte has an amorphous structure, and
wherein the solid electrolyte comprises a solid-state material that selectively conducts ions at least at temperatures of between about 0° C. and about 100° C., and
wherein depositing the solid electrolyte includes depositing using a second controllable deposition method; and
depositing a second electrode on the solid electrolyte,
wherein the second electrode is deposited to a third thickness, wherein the third thickness is selected from about 1 nm to about 80 nm,
wherein the second electrode comprises a second metal containing composition, and
wherein depositing the second electrode includes depositing using a third controllable deposition method.

17. The method of claim 16, wherein depositing an electrode does not result in changing an adjacent solid electrolyte to a crystalline or a polycrystalline structure.

18. The method of claim 16, wherein depositing the first electrode, the solid electrolyte, and the second electrode forms an interdigitated structure.

19. The method of claim 16, wherein the first controllable deposition method, the second controllable deposition method, and the third controllable deposition method each independently includes one or more techniques selected from the group consisting of: atomic layer deposition, magnetron sputtering, spin deposition, chemical vapor deposition, ultraviolet lithography, x-ray lithography, holographic lithography, laser ablation, and thermal evaporation.

20. The method of claim 16, wherein the first controllable deposition method, the second controllable deposition method, and the third controllable deposition method each independently include a controllable deposition method using temperatures of between 0° C. and 250° C.

21. The method of claim 16, wherein depositing the solid electrolyte and the first electrode or the second electrode comprises a cloud or co-deposition process where electrolyte and electrode material are both deposited to form a transition structure between a solid electrolyte layer and an electrode layer, wherein the transition structure comprises a plurality of interlayers, and wherein each interlayer comprises an electrode interlayer, an electrolyte interlayer, or a mixed electrode/electrolyte interlayer.

22. The method of claim 16, wherein depositing the first electrode or the second electrode comprises generating a nanoneedle structure or depositing an electrode material over a nanoneedle structure.

* * * * *